(12) United States Patent
Maehara et al.

(10) Patent No.: US 9,301,199 B2
(45) Date of Patent: Mar. 29, 2016

(54) NETWORK SYSTEM, OFFLOAD APPARATUS AND TRAFFIC CONTROL METHOD FOR NETWORK SYSTEM

(71) Applicant: FUJITSU LIMITED, Kawasaki-shi, Kanagawa (JP)

(72) Inventors: Satoshi Maehara, Yokohama (JP); Masaharu Kako, Tokai (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 14/083,918

(22) Filed: Nov. 19, 2013

(65) Prior Publication Data
US 2014/0160940 A1 Jun. 12, 2014

(30) Foreign Application Priority Data
Dec. 7, 2012 (JP) .................................. 2012-268018

(51) Int. Cl.
*G01R 31/08* (2006.01)
*H04W 28/08* (2009.01)
*H04W 8/26* (2009.01)
*H04W 36/22* (2009.01)

(52) U.S. Cl.
CPC ................ *H04W 28/08* (2013.01); *H04W 8/26* (2013.01); *H04W 36/22* (2013.01)

(58) Field of Classification Search
CPC ...................................................... H04W 28/08
USPC ........................................................ 370/237
See application file for complete search history.

(56) References Cited

U.S. PATENT DOCUMENTS

| 2003/0002503 A1* | 1/2003 | Brewer et al. ................. 370/392 |
| 2010/0088751 A1* | 4/2010 | Ando et al. ........................ 726/5 |
| 2012/0044949 A1* | 2/2012 | Velev et al. .................... 370/401 |
| 2012/0190386 A1* | 7/2012 | Anderson .............. G01C 15/04 455/456.3 |
| 2012/0314608 A1* | 12/2012 | Okuno et al. .................. 370/252 |
| 2013/0080612 A1* | 3/2013 | Armstrong ............ H04L 45/302 709/223 |
| 2013/0188481 A1* | 7/2013 | Maehara ............... H04W 28/14 370/230 |

FOREIGN PATENT DOCUMENTS

| JP | 10-243440 | 9/1998 |
| JP | 2013-153316 | 8/2013 |

* cited by examiner

*Primary Examiner* — Gerald Smarth
(74) *Attorney, Agent, or Firm* — Fujitsu Patent Center

(57) ABSTRACT

A network system including: a first and second radio base station apparatuses which are connectable with a mobile station apparatus; a first network which accommodates the first and second radio base station apparatuses; a first offload apparatus which relays packet data, and transmits to a second network a portion of packet data transmitted from the first radio base station apparatus after rewriting a first address of the mobile station apparatus with a second address, or transmits to the first radio base station apparatus packet data received from the second network after rewriting the second address with the first address; and a second offload apparatus, wherein the first offload apparatus includes a first control unit which transmits the second address to the second offload apparatus, and the second offload apparatus includes a second control unit which receives the second address.

15 Claims, 66 Drawing Sheets

EXAMPLE OF SEQUENCE FROM INITIATION OF MOBILE STATION
TO EXECUTION OF OFFLOAD PROCESSING

EXAMPLE OF SEQUENCE IN S1-BASED HANDOVER PROCESSING
(DURING OFFLOAD TRANSMISSION)

EXAMPLE OF SEQUENCE IN X2-BASED HANDOVER PROCESSING
(DURING OFFLOAD TRANSMISSION)

EXAMPLE OF CONFIGURATION OF OFFLOAD CONDITION APPLICATION STATE TABLES ~177A

FIG. 7A  User Channel-By-Channel Home Address Registration Table ~177A1

| in-oGW UE Identifier | User Channel Identifier (E RAB ID) | Home Address Information |
|---|---|---|
| 8000 | 2 | UE#x-Home-Addr |
| 8001 | 2 | UE#z-Home-Addr |
| | | |
| | | |
| | | |

FIG. 7B  User Channel-By-Channel Communication Destination Registration Table ~177A2

| in-oGW UE Identifier | User Channel Identifier (E RAB ID) | Communication Destination Information |
|---|---|---|
| 8000 | 2 | Web#1000-Addr |
| 8001 | 2 | Web#1000-Addr |
| 8000 | 2 | Web#1001-Addr |
| 8000 | 2 | Web#1002-Addr |
| | | |
| | | |

FIG. 7C  User Channel-By-Channel Address-Port Conversion Table ~177A3

| in-oGW UE Identifier | User Channel Identifier (E RAB ID) | Real UE Connection Information | Session State | Virtual UE Connection Information |
|---|---|---|---|---|
| 8000 | 2 | UE#x-IP-Addr,port#10000 | in Connection | UE#x-Home-Addr,port#2000 |
| 8001 | 2 | UE#z-IP-Addr,port#10000 | Waiting for UL Disconnection | UE#y-Home-Addr,port#2001 |
| 8000 | 2 | UE#x-IP-Addr,port#10001 | Waiting for DL Disconnection | UE#x-Home-Addr,port#2010 |
| 8000 | 2 | UE#x-IP-Addr,port#10002 | in Connection | UE#x-Home-Addr,port#2015 |
| | | | | |
| | | | | |

FIG. 8

Example of uplink GTP-u Packet (to S-GW)

| User Data | get http://www.fujitsu.com... |
|---|---|
| TCP | flags=syn/fin, src port=10005, dst port=80 |
| IP | SA : UE IP Address, DA : Web IP Address |
| GTP-u | TEID=TEID#SGW-u2(for S-GW) |
| UDP_G | UDP Header |
| IP_G | SA : eNB#1 IP Address, DA : S-GW#1 IP Address |
| L2 | L2 Header |
| L1 | L1 Header |

FIG. 9

Example of downlink GTP-u Packet (to eNB)

| User Data | Http/1.0 200 ok content-type... |
|---|---|
| TCP | flags= syn / fin , src port=80,dst port=10005 |
| IP | SA : Web IP Address , DA : UE IP Address |
| GTP-u | TEID=eNB-TEID#2 (for eNB) |
| UDP_G | UDP Header |
| IP_G | SA : S-GW#1 IP Address , DA : eNB#1 IP Address |
| L2 | L2 Header |
| L1 | L1 Header |

EXAMPLES OF OFFLOAD PACKETS BETWEEN WEBSITE AND
VIRTUAL UE THROUGH OFFLOAD NETWORK (HOME-LINK)

Example of Offload Packet which is transmitted from oGW to Website

FIG. 10A

| User Data | get http://www.fujitsu.com... |
|---|---|
| TCP | flags=syn/fin, src port=20021, dst port=80 |
| IP | SA : UE#x-Home Addr, DA : Web IP Address |
| L2 | L2 Header |
| L1 | L1 Header |

Example of Offload Packet which is transmitted from Website to oGW

FIG. 10B

| User Data | Http/1.0 200 ok content-type... |
|---|---|
| TCP | flags=syn/fin, src port=80, dst port=20021 |
| IP | SA : Web IP Address, DA : UE#x-Home Addr |
| L2 | L2 Header |
| L1 | L1 Header |

EXAMPLES OF OFFLOAD PACKETS BETWEEN WEBSITE AND
VIRTUAL UE THROUGH OFFLOAD NETWORK (FOREIGN-LINK)

Example of Offload Packet which is transmitted from oGW to Website

FIG. 11A

| User Data | get http://www.fujitsu.com... |
|---|---|
| TCP | flags=syn/fin, src port=20021, dst port=80 |
| IP | Home Address option : UE#x-Home Addr |
|  | SA : UE#x-care of Addr, DA : Web IP Address |
| L2 | L2 Header |
| L1 | L1 Header |

Example of Offload Packet which is transmitted from Website to oGW

FIG. 11B

| User Data | Http/1.0 200 ok content-type... |
|---|---|
| TCP | flags=syn/in, src port=80, dst port=20021 |
| IP | Routing_Type=2,<br>Home Address=UE#x-Home Addr |
|  | SA : Web IP Address, DA : UE#x-care of Addr |
| L2 | L2 Header |
| L1 | L1 Header |

EXAMPLES OF BINDING UPDATE MESSAGES

Example of Binding Update Message to Home Agent

FIG. 12A

| IP | Mobility Header | Home Address : UE#x-Home Addr |
| | | Care of Address : UE#x-care of Addr |
| | | MH type : Binding Update |
| | SA : UE#x-care of Addr, DA : UE#x-Home Addr | |
| L2 | L2 Header | |
| L1 | L1 Header | |

Example of Binding Update Message to Website

FIG. 12B

| IP | Mobility Header | Home Address : UE#x-Home Addr |
| | | Care of Address : UE#x-care of Addr |
| | | MH type : Binding Update |
| | SA : UE#x-care of Addr, DA : Web IP Address | |
| L2 | L2 Header | |
| L1 | L1 Header | |

EXAMPLES OF OFFLOAD PACKETS TO BE RELAYED BY
HOME AGENT (WHEN VIRTUAL UE IS APART FROM HOME-LINK)

FIG. 13A

From Home Agent To Virtual UE

| User Data | Http/1.0 200 ok content-type... |
|---|---|
| TCP | flags=syn/fin, src port=80, dst port=10005 |
| IP | SA : Web IP Address, DA : UE#x-Home Addr |
| IP_IPinIP | SA : UE#x-Home Addr, DA : UE#x-care of Addr |
| L2 | L2 Heade |
| L1 | L1 Heade |

FIG. 13B

From Virtual UE to Home Agent

| User Data | get http//www.fujitsu.com... |
|---|---|
| TCP | flags=syn/fin, src port=80, dst port=10005 |
| IP | SA : UE#x-Home Addr, DA : Web IP Address |
| IP_IPinIP | SA : UE#x-cera of Addr, DA : UE#x-Home Addr |
| L2 | L2 Heade |
| L1 | L1 Heade |

EXAMPLE OF CONFIGURATION OF BEARER STATE
MANAGEMENT DATA AT DISTRIBUTION POINT

FIG. 14A

Bearer Use Subscriber Identification Table

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| 8000 | MME UE S1AP ID#x | MME#1 | eNB UE S1AP ID#x | | eNB#1 |
| 8001 | MME UE S1AP ID#z | MME#1 | eNB UE S1AP ID#z | | eNB#1 |
| | | | | | |
| | | | | | |
| | | | | | |

FIG. 14B

Bearer Use Subscriber Identification Table

| in-oGW UE Identifier | T-Target Cell Identification Information | | in-T-C-Cell UE Identification Information | S-Target Cell Identification Information | in-S-C-Cell UE Identification Information |
|---|---|---|---|---|---|
| | T-Target CellID inf | T-C-RNTI inf | Target ID | S-Target CellID inf | S-C-RNTI inf |
| 8000 | | | | | |
| 8001 | | | | | |
| | | | | | |
| | | | | | |
| | | | | | |

FIG. 14C

Bearer Table

| in-oGW UE Identifier | User Channel Identifier | Uplink Channel Allocation Information | | Downlink Channel Allocation Information | | Offload Communication Address |
|---|---|---|---|---|---|---|
| 8000 | 1 | TEID#SGW-u_1 | SGW#1 | eNB-TEID#1 | eNB#1 | (Non-Application of Offload) |
| 8000 | 2 | TEID#SGW-u_2 | SGW#1 | eNB-TEID#2 | eNB#1 | UE#x-Home Addr |
| 8000 | 3 | TEID#SGW-u_3 | SGW#1 | eNB-TEID#3 | eNB#1 | (Non-Application of Offload) |
| 8001 | 2 | TEID#SGW-u_6 | SGW#1 | eNB-TEID#4 | eNB#1 | UE#z-care of Addr |
| | | | | | | |
| | | | | | | |
| | | | | | | |

FIG. 15

EXAMPLE OF CONFIGURATION OF HOME AGENT STATE MANAGEMENT DATA AT HOME SERVE (SOURCE oGW)

Home Agent State Management Table  179A

| Home Address | care of Address |
|---|---|
| UE#x-Home Addr | UE#x-care of Addr |
| UE#y-Home Addr | UE#y-care of Addr |
|  |  |
|  |  |
|  |  |

FIG. 16

EXAMPLE OF CONFIGURATION OF INITIAL CONTEX SETUP REQUEST MESSAGE

| | | |
|---|---|---|
| S1AP | Message type=Initial Context Setup Request | |
| | MME UE S1AP ID=MME#1 UE S1AP ID#x | |
| | eNB UE S1AP ID=eNB#1 UE S1AP ID#x | |
| | E-RAB to Be Setup list | |
| | E-RAB ID=1 | GTP-TEID=TEID#SGW-u1 |
| | E-RAB ID=2 | GTP-TEID=TEID#SGW-u2 |
| SCTP | SCTP Header | |
| IP | SA : MME#1 IP Address, DA : eNB#1 IP Address | |
| L2 | L2 Header | |
| L1 | L1 Header | |

FIG. 17

EXAMPLE OF CONFIGURATION OF INITIAL CONTEXT SETUP RESPONSE MESSAGE

| | | |
|---|---|---|
| S1AP | Message type=Initial Context Setup Response | |
| | MME UE S1AP ID=MME#1 UE S1AP ID#x | |
| | eNB UE S1AP ID=eNB#1 UE S1AP ID#x | |
| | E-RAB to Be Setup list | |
| | E-RAB ID=1 | GTP-TEID=eNB-TEID#1 |
| | E-RAB ID=2 | GTP-TEID=eNB-TEID#2 |
| SCTP | SCTP Header | |
| IP | SA : eNB#1 IP Address, DA : MME#1 IP Address | |
| L2 | L2 Header | |
| L1 | L1 Header | |

FIG. 18

EXAMPLE OF CONFIGURATION OF HANDOVER REQUIRED MESSAGE

| | |
|---|---|
| S1AP | Message type=Handover Required |
| | MME UE S1AP ID=MME#1 UE S1AP ID#x |
| | eNB UE S1AP ID=eNB#1 UE S1AP ID#x |
| | Target ID=eNB#2 |
| | Source to Target Transparent Container =CellID#x |
| SCTP | SCTP Header |
| IP | SA : eNB#1 IP Address, DA : MME#1 IP Address |
| L2 | L2 Header |
| L1 | L1 Header |

FIG. 19

EXAMPLE OF CONFIGURATION OF HANDOVER REQUEST MESSAGE

| | |
|---|---|
| S1AP | Message type=Handover Request |
| | MME UE S1AP ID=MME#2 UE S1AP ID#x |
| | E-RAB to Be Setup list |
| | E-RAB ID=1 / GTP-TEID=TEID#SGW-u21 |
| | E-RAB ID=2 / GTP-TEID=TEID#SGW-u22 |
| | Source to Target Transparent Container =CellID#x |
| SCTP | SCTP Header |
| IP | SA : MME#2 IP Address, DA : eNB#2 IP Address |
| L2 | L2 Header |
| L1 | L1 Header |

FIG. 20

EXAMPLE OF CONFIGURATION OF HANDOVER REQUEST ACK. MESSAGE

| | |
|---|---|
| S1AP | Message type=Handover Request Ack. |
| | MME UE S1AP ID=MME#2 UE S1AP ID#x |
| | eNB UE S1AP ID=eNB#2 UE S1AP ID#x |
| | E-RAB to Be Setup list |
| | E-RAB ID=1 / GTP-TEID=eNB-TEID#21 |
| | E-RAB ID=2 / GTP-TEID=eNB-TEID#22 |
| | Target to Source Transparent Container =C-RNTI#x |
| SCTP | SCTP Header |
| IP | SA : eNB#2 IP Address, DA : MME#2 IP Address |
| L2 | L2 Header |
| L1 | L1 Header |

FIG. 21

EXAMPLE OF CONFIGURATION OF HANDOVER COMMAND MESSAGE

| | |
|---|---|
| S1AP | Message type=Handover Command |
| | MME UE S1AP ID=MME#1 UE S1AP ID#x |
| | eNB UE S1AP ID=eNB#1 UE S1AP ID#x |
| | Target to Source Transparent Container =C-RNTI#x |
| SCTP | SCTP Header |
| IP | SA : MME#1 IP Address, DA : eNB#1 IP Address |
| L2 | L2 Header |
| L1 | L1 Header |

FIG. 22

EXAMPLE OF CONFIGURATION OF UE CONTEXT RELEASE COMMAND MESSAGE

| | |
|---|---|
| S1AP | Message type=UE Context Release Command |
| | MME UE S1AP ID=MME#1 UE S1AP ID#x |
| | eNB UE S1AP ID=eNB#1 UE S1AP ID#x |
| SCTP | SCTP Header |
| IP | SA : MME#1 IP Address, DA : eNB#1 IP Address |
| L2 | L2 Header |
| L1 | L1 Header |

FIG. 23

EXAMPLE OF CONFIGURATION OF X2AP: HANDOVER REQUEST MESSAGE

| | |
|---|---|
| X2AP | Message type=Handover Request |
| | Old eNB UE X2AP ID=eNB#1 UE X2AP ID#x |
| | UE Context Information |
| | MME UE S1AP ID=MME#1 UE S1AP ID#x |
| | E-RAB to Be Setup list |
| | E-RAB ID=1 : UL GTP Tunnel Endpoint=TEID#SGW-u1 |
| | E-RAB ID=2 : UL GTP Tunnel Endpoint=TEID#SGW-u2 |
| SCTP | SCTP Header |
| IP | SA : eNB#1 IP Address, DA : eNB#2 IP Address |
| L2 | L2 Header |
| L1 | L1 Header |

FIG. 24

EXAMPLE OF CONFIGURATION OF X2AP: HANDOVER REQUEST ACK. MESSAGE

| | |
|---|---|
| X2AP | Message type=Handover Request Ack. |
| | Old eNB UE X2AP ID=eNB#1 UE X2AP ID#x |
| | New eNB UE X2AP ID=eNB#2 UE X2AP ID#x |
| SCTP | SCTP Header |
| IP | SA : eNB#2 IP Address, DA : eNB#1 IP Address |
| L2 | L2 Header |
| L1 | L1 Header |

FIG. 25

EXAMPLE OF CONFIGURATION OF X2AP: UE CONTEXT RELEASE MESSAGE

| | |
|---|---|
| X2AP | Message type= : UE Context Release |
| | Old eNB UE S1AP ID=eNB#1 UE X2AP ID#x |
| | New eNB UE S1AP ID=eNB#2 UE X2AP ID#x |
| SCTP | SCTP Header |
| IP | SA : eNB#2 IP Address, DA : eNB#1 IP Address |
| L2 | L2 Header |
| L1 | L1 Header |

FIG. 26

EXAMPLE OF CONFIGURATION OF PATH SWITCH REQUEST MESSAGE

| | |
|---|---|
| S1AP | Message type=Path Switch Request |
| | Source MME UE S1AP ID=MME#1 UE S1AP ID#x |
| | eNB UE S1AP ID=eNB#2 UE S1AP ID#x |
| | E-RAB to Be Switched in Downlink list |
| | E-RAB ID=1 \| GTP-TEID=eNB-TEID#21 |
| | E-RAB ID=2 \| GTP-TEID=eNB-TEID#22 |
| SCTP | SCTP Header |
| IP | SA : eNB#2 IP Address, DA : MME#1 IP Address |
| L2 | L2 Header |
| L1 | L1 Header |

FIG. 27

EXAMPLE OF CONFIGURATION OF PATH SWITCH REQUEST ACK. MESSAGE

| | |
|---|---|
| S1AP | Message type=Path Switch Request Ack. |
| | MME UE S1AP ID=MME#1 UE S1AP ID#x |
| | eNB UE S1AP ID=eNB#2 UE S1AP ID#x |
| | E-RAB to Be Switched Uplink list |
| | E-RAB ID=1 \| GTP-TEID=TEID#SGW-u21 |
| | E-RAB ID=2 \| GTP-TEID=TEID#SGW-u22 |
| SCTP | SCTP Header |
| IP | SA : MME#1 IP Address, DA : eNB#2 IP Address |
| L2 | L2 Header |
| L1 | L1 Header |

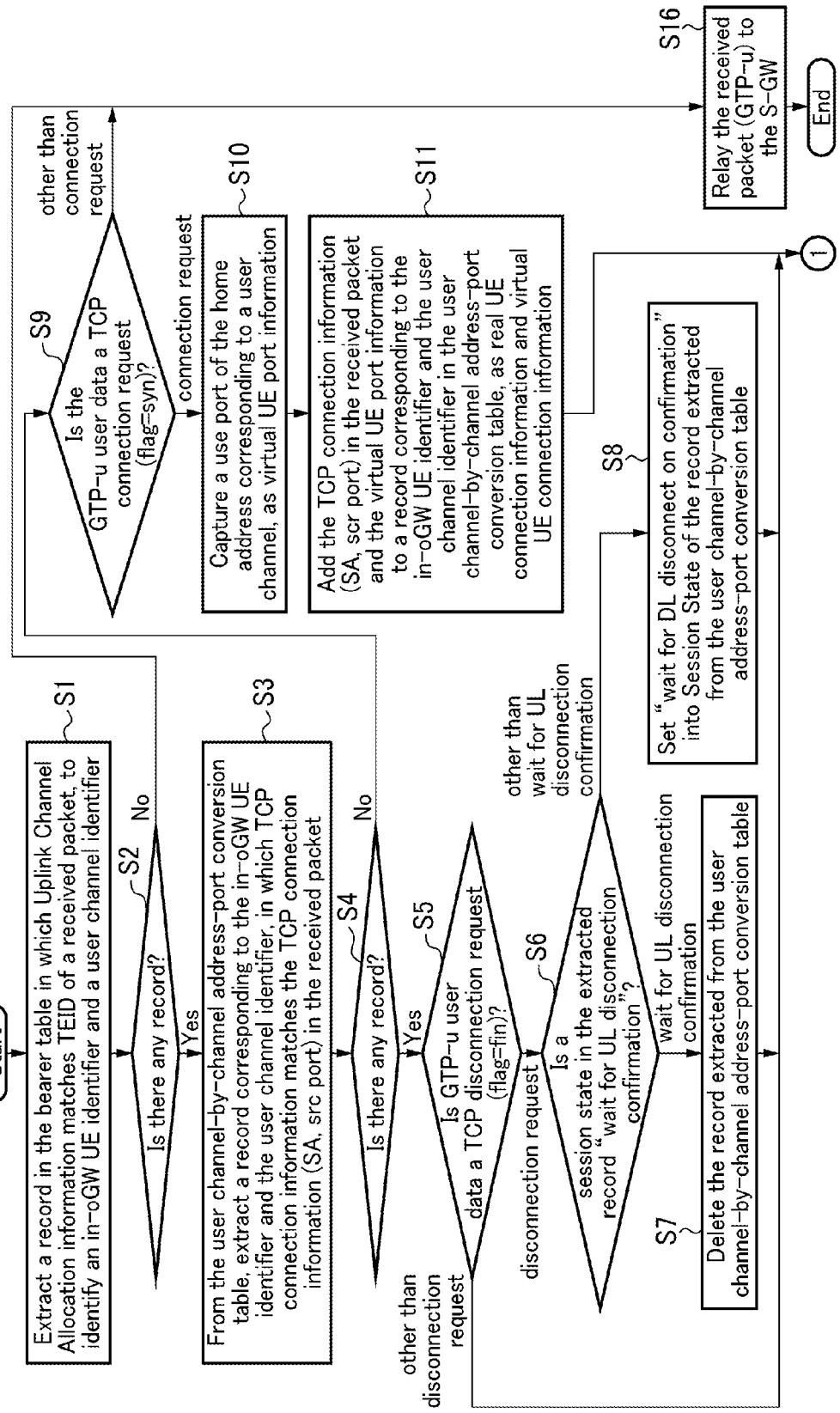

PROCESSING FLOW WHEN RECEIVING PACKET FORWARDED TO OFFLOAD ANCHOR POINT FROM OFFLOAD

PROCESSING FLOW AT INTERCEPTION OF INITIAL CONTEXT SETUP REQUEST MESSAGE

EXAMPLE OF VIRTUAL UE HOME ADDRESS CAPTURING
(SUBROUTINE)

PROCESSING FLOW AT INTERCEPTION OF INITIAL CONTEXT SETUP RESPONSE MESSAGE

PROCESSING FLOW AT INTERCEPTION OF HANDOVER REQUIRED MESSAGE

PROCESSING FLOW AT INTERCEPTION OF HANDOVER REQUEST MESSAGE

EXAMPLE OF OFFLOAD COMMUNICATION ADDRESS CAPTURING PROCESSING (SUBROUTINE)

PROCESSING FLOW AT INTERCEPTION OF HANDOVER COMMAND MESSAGE

PROCESSING FLOW AT INTERCEPTION OF X2AP: HANDOVER REQUEST MESSAGE

PROCESSING FLOW AT INTERCEPTION OF PATH SWITCH REQUEST MESSAGE

PROCESSING FLOW AT INTERCEPTION OF PATH SWITCH REQUEST ACK. MESSAGE

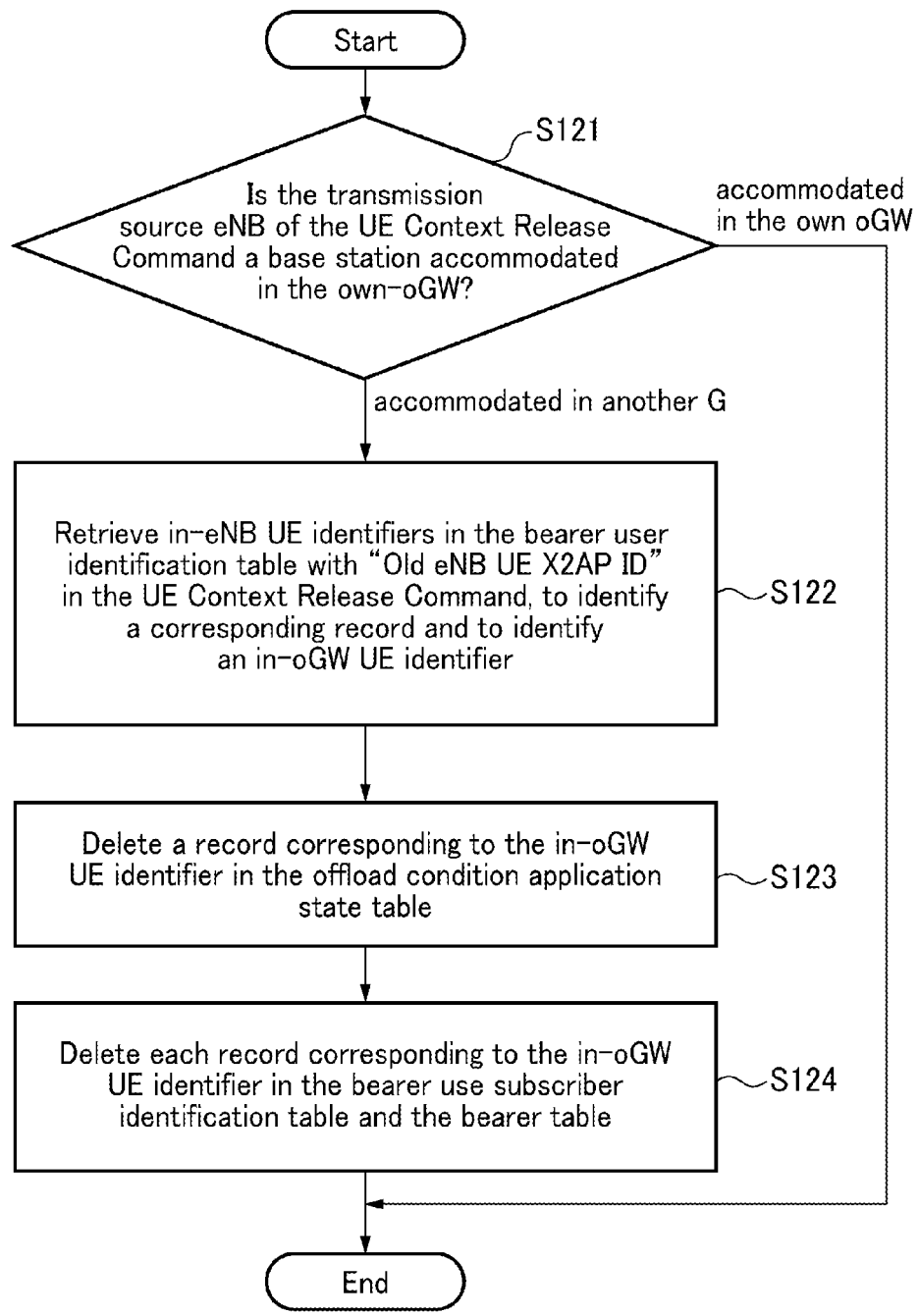

EXAMPLES OF OFFLOAD CONDITION APPLICATION STATES AFTER
GENERATION OF TCP CONNECTION (BEARER STATE DATA)

FIG. 41A

Bearer Use Subscriber Identification Table (1/2)    176a

| in-oGW UE Identifier | in-MME UE Identifier | MME Apparatus Identifier | in-eNB UE Identifier (S1AP) | in-eNB UE Identifier (S1AP) | eNB Apparatus Identifier |
|---|---|---|---|---|---|
| 8000 | MME#1 UE S1AP ID#x | MME#1 | eNB UE S1AP ID#x |  | eNB#1 |
|  |  |  |  |  |  |
|  |  |  |  |  |  |
|  |  |  |  |  |  |

FIG. 41B

Bearer Use Subscriber Identification Table (2/2)    176b

| in-oGW UE Identifier | T-Target CellID inf | T-C-RNTI inf | Target ID | S-Target CellID inf | S-C-RNTI inf |
|---|---|---|---|---|---|
| 8000 |  |  |  |  |  |
|  |  |  |  |  |  |
|  |  |  |  |  |  |
|  |  |  |  |  |  |

FIG. 41C

Bearer Table    176B

| in-oGW UE Identifier | User Channel Identifier | Uplink Channel Allocation Information | | Downlink Channel Allocation Information | | Offload Communication Address |
|---|---|---|---|---|---|---|
| 8000 | 1 | TEID#SGW-u1 | SGW#1 | eNB-TEID#1 | eNB#1 | (Non-Application of Offload) |
| 8000 | 2 | TEID#SGW-u2 | SGW#1 | eNB-TEID#2 | eNB#1 | UE#x-Home Addr |
|  |  |  |  |  |  |  |
|  |  |  |  |  |  |  |
|  |  |  |  |  |  |  |
|  |  |  |  |  |  |  |
|  |  |  |  |  |  |  |

EXAMPLES OF OFFLOAD CONDITION APPLICATION STATES
AFTER GENERATION OF TCP CONNECTION
(OFFLOAD CONDITION APPLICATION STATE DATA)

FIG. 42A

User Channel-By-Channel Home Address Registration Table

| in-oGW UE Identifier | User Channel Identifier (E RAB ID) | Home Address Information |
|---|---|---|
|  |  |  |
| 8000 | 2 | UE#x-Home-Addr |
|  |  |  |
|  |  |  |
|  |  |  |
|  |  |  |
|  |  |  |
|  |  |  |

User Channel-By-Channel Communication Destination Registration Table

| in-oGW UE Identifier | User Channel Identifier (E RAB ID) | Communication Destination Information |
|---|---|---|
| 8000 | 2 | Web Address |
|  |  |  |
|  |  |  |
|  |  |  |
|  |  |  |
|  |  |  |
|  |  |  |
|  |  |  |

User Channel-By-Channel Address-Port Conversion Table       177A3

| in-oGW UE Identifier | User Channel Identifier (E RAB ID) | Real UE Connection Information | Session State | Virtual UE Connection Information |
|---|---|---|---|---|
|  |  |  |  |  |
|  |  |  |  |  |
| 8000 | 2 | UE#x-IP-Addr,port#10005 | in Connection | UE#x-Home-Addr,port#20021 |
|  |  |  |  |  |
|  |  |  |  |  |
|  |  |  |  |  |
|  |  |  |  |  |

FIG. 43

EXAMPLE OF OFFLOAD CONDITION APPLICATION STATE
AFTER GENERATION OF TCP CONNECTION (HOME AGENT)

Home Agent State Management Table   179A

| Home Address | care of Address |
|---|---|
|  |  |
|  |  |
|  |  |
|  |  |
|  |  |

EXAMPLE OF OFFLOAD CONDITION APPLICATION STATE AFTER GENERATION OF TCP CONNECTION
(FLOW OF TRAFFIC)

EXAMPLE OF HANDING OVER OFFLOAD CONDITION APPLICATION STATE
AT S1-BASED HANDOVER (BEARER STATE DATA)

Source oGW (=oGW#1)

FIG. 45A

Bearer Use Subscriber Identification Table (1/2)    176a

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| 8000 | MME#1 UE S1AP ID#x | MME#1 | eNB UE S1AP ID#x | | eNB#1 |
| | | | | | |
| | | | | | |

Bearer Use Subscriber Identification Table (2/2)    176b

Set by intercepting Handover Required

Set by intercepting Handover Command

| in-oGW UE Identifier | T-Target CellID inf | T-C-RNTI inf | Target ID | S-Target CellID inf | S-C-RNTI inf |
|---|---|---|---|---|---|
| 8000 | | | eNB#2 | CellID#x | C-RNTI#x |
| | | | | | |
| | | | | | |

Bearer Table

| in-oGW UE Identifier | User Channel Identifie | Uplink Channel Allocation Information | | Downlink Channel Allocation Information | | Offload Communication Address |
|---|---|---|---|---|---|---|
| 8000 | 1 | TEID#SGW-u1 | SGW#1 | eNB-TEID#1 | eNB#1 | (Non-Application of Offload) |
| 8000 | 2 | TEID#SGW-u2 | SGW#1 | eNB-TEID#2 | eNB#1 | UE#x~Home Addr |

(V)  (W)  (U)

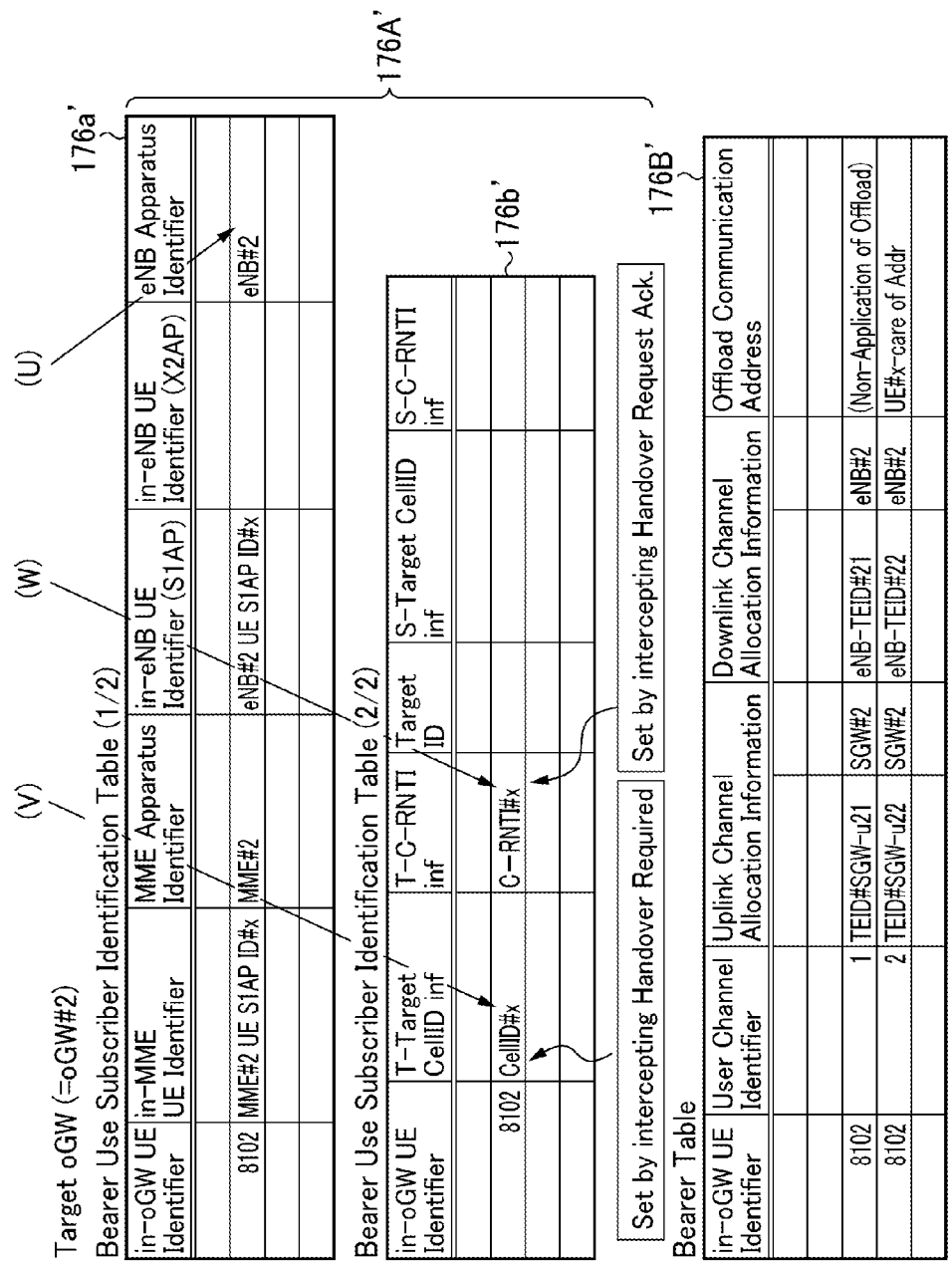

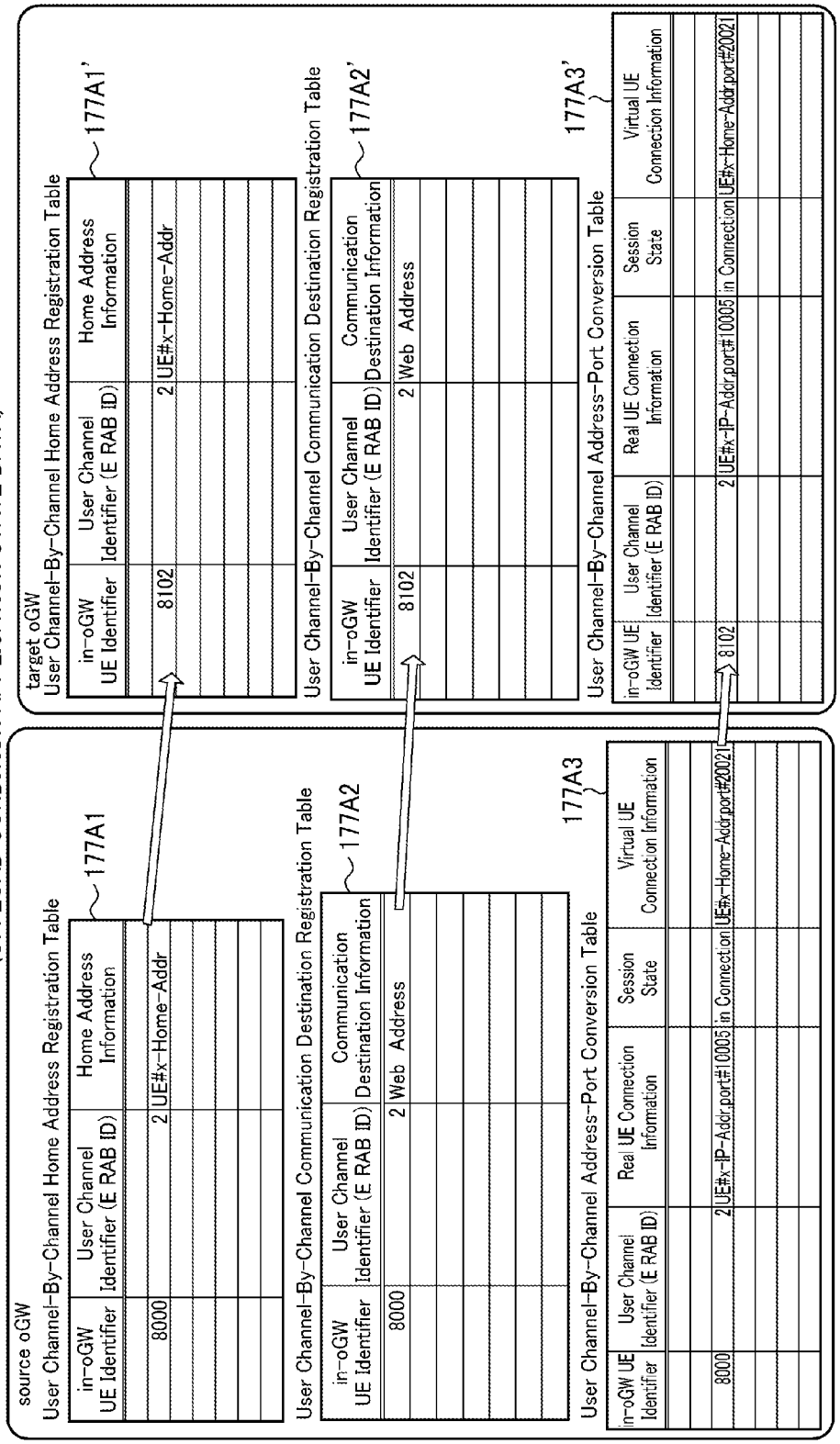

EXAMPLES OF HANDING OVER OFFLOAD CONDITION
APPLICATION STATE AT S1-BASED HANDOVER (HOME AGENT)

FIG. 47A

Home Agent State Management Table (source oGW)

| Home Address | care of Address |
|---|---|
|  |  |
| UE#x-Home Addr | UE#x-care of Addr |
|  |  |
|  |  |

Home Agent State Management Table (target oGW)

| Home Address | care of Address |
|---|---|
|  |  |
|  |  |
|  |  |
|  |  |
|  |  |

~179A'

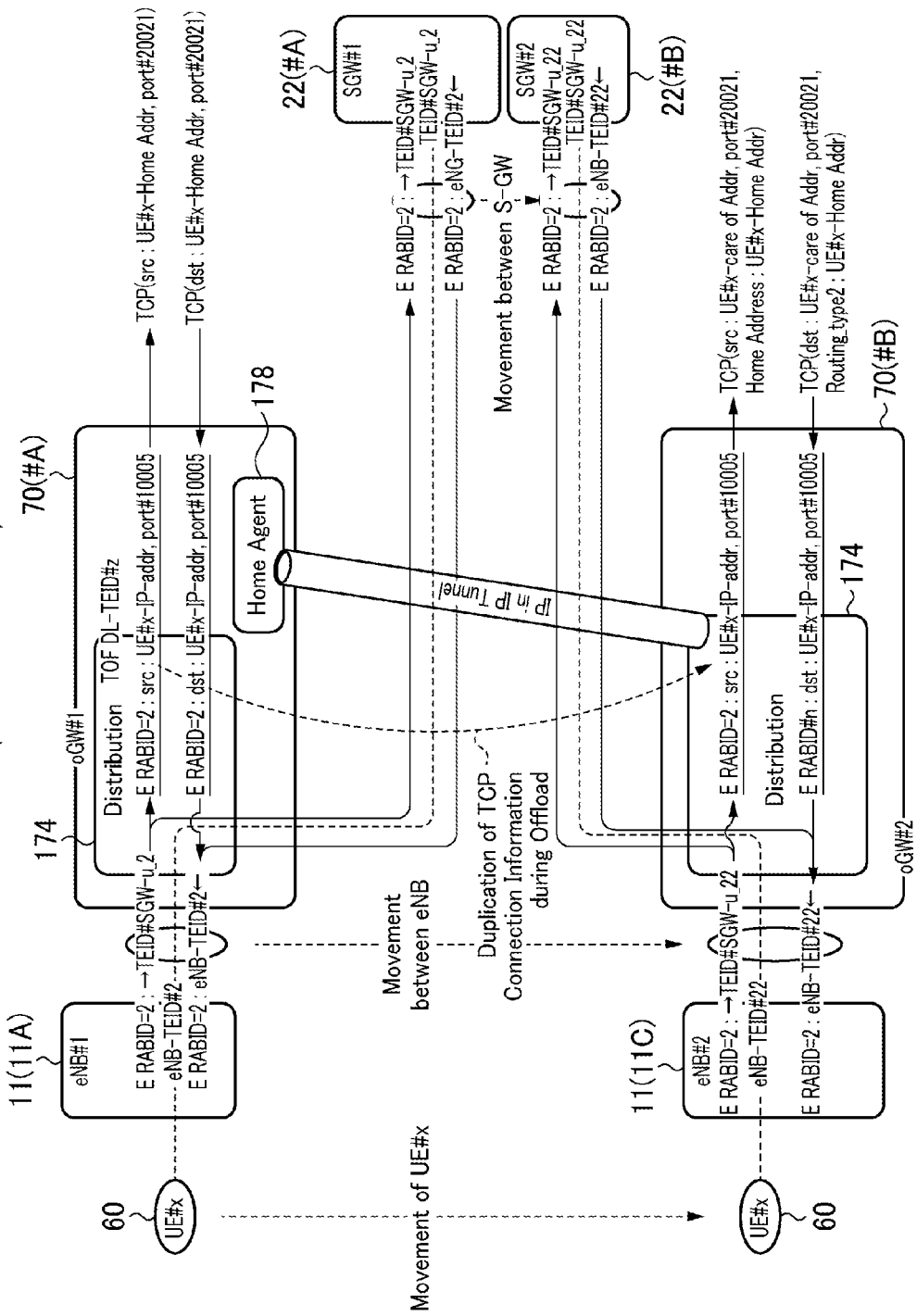
FIG. 48  EXAMPLE OF HANDING OVER OFFLOAD CONDITION APPLICATION STATE AT S1-BASED HANDOVER (FLOW OF TRAFFIC)

EXAMPLE OF OFFLOAD CONDITION APPLICATION STATE AT COMPLETION OF HANDOVER WITH MAINTAINED TCP CONNECTION (BEARER STATE DATA)

Source oGW (=oGW#1)

Bearer Use Subscriber Identification Table (1/2)

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| | | | | | |
| | | | | | |
| | | | | | |
| | | | | | |

FIG. 49A

Bearer Use Subscriber Identification Table (2/2)

| in-oGW UE Identifier | T-Target CellID inf | T-C-RNTI inf | Target ID | S-Target CellID inf | S-C-RNTI inf |
|---|---|---|---|---|---|
| | | | | | |
| | | | | | |
| | | | | | |
| | | | | | |

FIG. 49B

Bearer Table

| in-oGW UE Identifier | User Channel Identifie | Uplink Channel Allocation Information | Downlink Channel Allocation Information | Offload Communication Address |
|---|---|---|---|---|
| | | | | |
| | | | | |
| | | | | |
| | | | | |

FIG. 49C

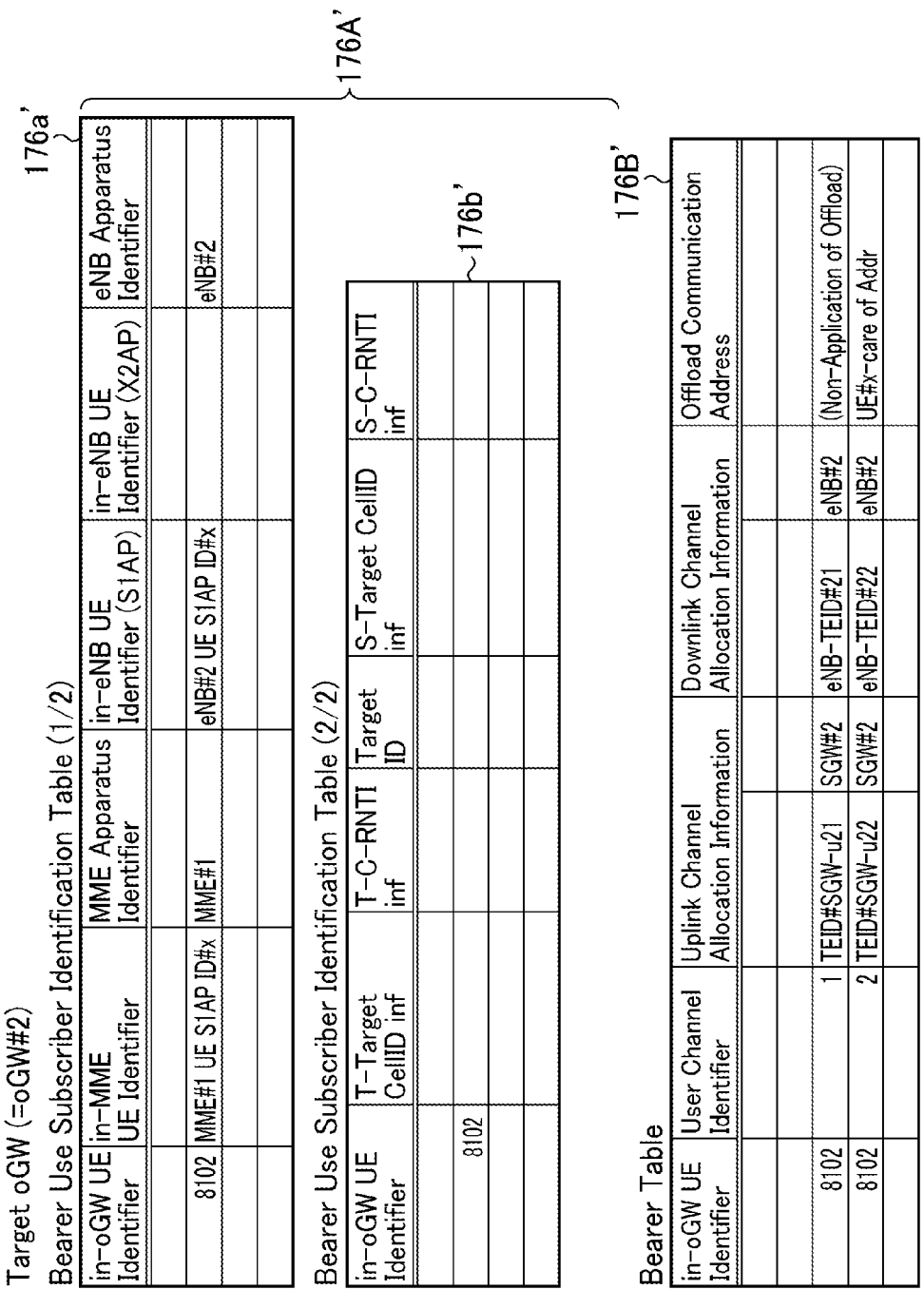

EXAMPLE OF OFFLOAD CONDITION APPLICATION STATE AT COMPLETION OF HANDOVER WITH MAINTAINED TCP CONNECTION (OFFLOAD CONDITION APPLICATION STATE DATA)

source oGW
User Channel-By-Channel Home Address Registration Table ~177A1

| in-oGW UE Identifier | User Channel Identifier (E RAB ID) | Home Address Information |
|---|---|---|
|  |  |  |
|  |  |  |
|  |  |  |

User Channel-By-Channel Communication Destination Registration Table ~177A2

| in-oGW UE Identifier | User Channel Identifier (E RAB ID) | Communication Destination Information |
|---|---|---|
|  |  |  |
|  |  |  |
|  |  |  |

User Channel-By-Channel Address-Port Conversion Table ~177A3

| in-oGW UE Identifier | User Channel Identifier (E RAB ID) | Real UE Connection Information | Session State | Virtual UE Connection Information |
|---|---|---|---|---|
|  |  |  |  |  |
|  |  |  |  |  |
|  |  |  |  |  |

FIG. 50A target oGW
User Channel-By-Channel Home Address Registration Table ~177A1'

| in-oGW UE Identifier | User Channel Identifier (E RAB ID) | Home Address Information |
|---|---|---|
| 8102 | 2 | UE#x-Home-Addr |
|  |  |  |
|  |  |  |

User Channel-By-Channel Communication Destination Registration Table ~177A2'

| in-oGW UE Identifier | User Channel Identifier (E RAB ID) | Communication Destination Information |
|---|---|---|
| 8102 | 2 | Web Address |
|  |  |  |
|  |  |  |

User Channel-By-Channel Address-Port Conversion Table ~177A3'

| in-oGW UE Identifier | User Channel Identifier (E RAB ID) | Real UE Connection Information | Session State | Virtual UE Connection Information |
|---|---|---|---|---|
| 8102 | 2 | UE#x-IP-Addr,port#10005 | in Connection | UE#x-Home-Addr,port#20021 |
|  |  |  |  |  |
|  |  |  |  |  |

FIG. 50B

EXAMPLE OF OFFLOAD CONDITION APPLICATION STATE
AT COMPLETION OF HANDOVER WITH MAINTAINED TCP CONNECTION
(HOME AGENT)

FIG. 51A

Home Agent State Management Table (source oGW)

| Home Address | care of Address |
|---|---|
|  |  |
| UE#x-Home Addr | UE#x-care of Addr |
|  |  |
|  |  |

Home Agent State Management Table (target oGW)

| Home Address | care of Address |
|---|---|
|  |  |
|  |  |
|  |  |
|  |  |
|  |  |

~179A'

EXAMPLE OF OFFLOAD CONDITION APPLICATION STATE AT COMPLETION OF HANDOVER WITH MAINTAINED TCP CONNECTION (FLOW OF TRAFFIC)

EXAMPLE OF HANDING OVER OFFLOAD CONDITION APPLICATION
STATE AT X2-BASED HANDOVER (BEARER STATE DATA)

Source oGW (=oGW#1)

FIG. 53A

Bearer Use Subscriber Identification Table (1/2)  — 176A

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| 8000 | MME#1 UE S1AP ID#x | MME#1 | eNB#1 UE S1AP ID#x | eNB#1 UE X2AP ID#x | eNB#1 |
|  |  |  |  |  |  |
|  |  |  |  |  |  |

Bearer Use Subscriber Identification Table (2/2) — 176b

| in-oGW UE Identifier | T-Target CellID inf | T-C-RNTI inf | Target ID | S-Target CellID | S-C-RNTI inf |
|---|---|---|---|---|---|
| 8000 |  |  |  |  |  |
|  |  |  |  |  |  |
|  |  |  |  |  |  |

Bearer Table — 176B

| in-oGW UE Identifier | User Channel Identifie | Uplink Channel Allocation Information | Downlink Channel Allocation Information | | Offload Communication Address |
|---|---|---|---|---|---|
| 8000 | 1 | TEID#SGW-u1 | SGW#1 | eNB-TEID#1 | eNB#1 | (Non-Application of Offload) |
| 8000 | 2 | TEID#SGW-u2 | SGW#1 | eNB-TEID#2 | eNB#1 | UE#x-Home Addr |
|  |  |  |  |  |  |

EXAMPLE OF HANDING OVER OFFLOAD CONDITION APPLICATION STATE AT X2-BASED HANDOVER (BEARER STATE DATA)

Target oGW (=oGW#2)

Bearer Use Subscriber Identification Table (1/2) — 176a'

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| 8102 | MME#1 UE S1AP ID#x | MME#1 | eNB#2 UE S1AP ID#x | | eNB#2 |
| | | | | | |
| | | | | | |

FIG. 53D

Bearer Use Subscriber Identification Table (2/2) — 176b'

| in-oGW UE Identifier | T-Target CellID inf | T-C-RNTI inf | Target ID | S-Target CellID inf | S-C-RNTI inf |
|---|---|---|---|---|---|
| 8102 | | | | | |
| | | | | | |
| | | | | | |

FIG. 53E

Bearer Table — 176B'

| in-oGW UE Identifier | User Channel Identifier | Uplink Channel Allocation Information | Downlink Channel Allocation Information | | Offload Communication Address |
|---|---|---|---|---|---|
| 8102 | 1 | TEID#SGW-u21 | SGW#2 | eNB-TEID#21 | eNB#2 | (Non-Application of Offload) |
| 8102 | 2 | TEID#SGW-u22 | SGW#2 | eNB-TEID#22 | eNB#2 | UE#x-care of Addr |

FIG. 53F

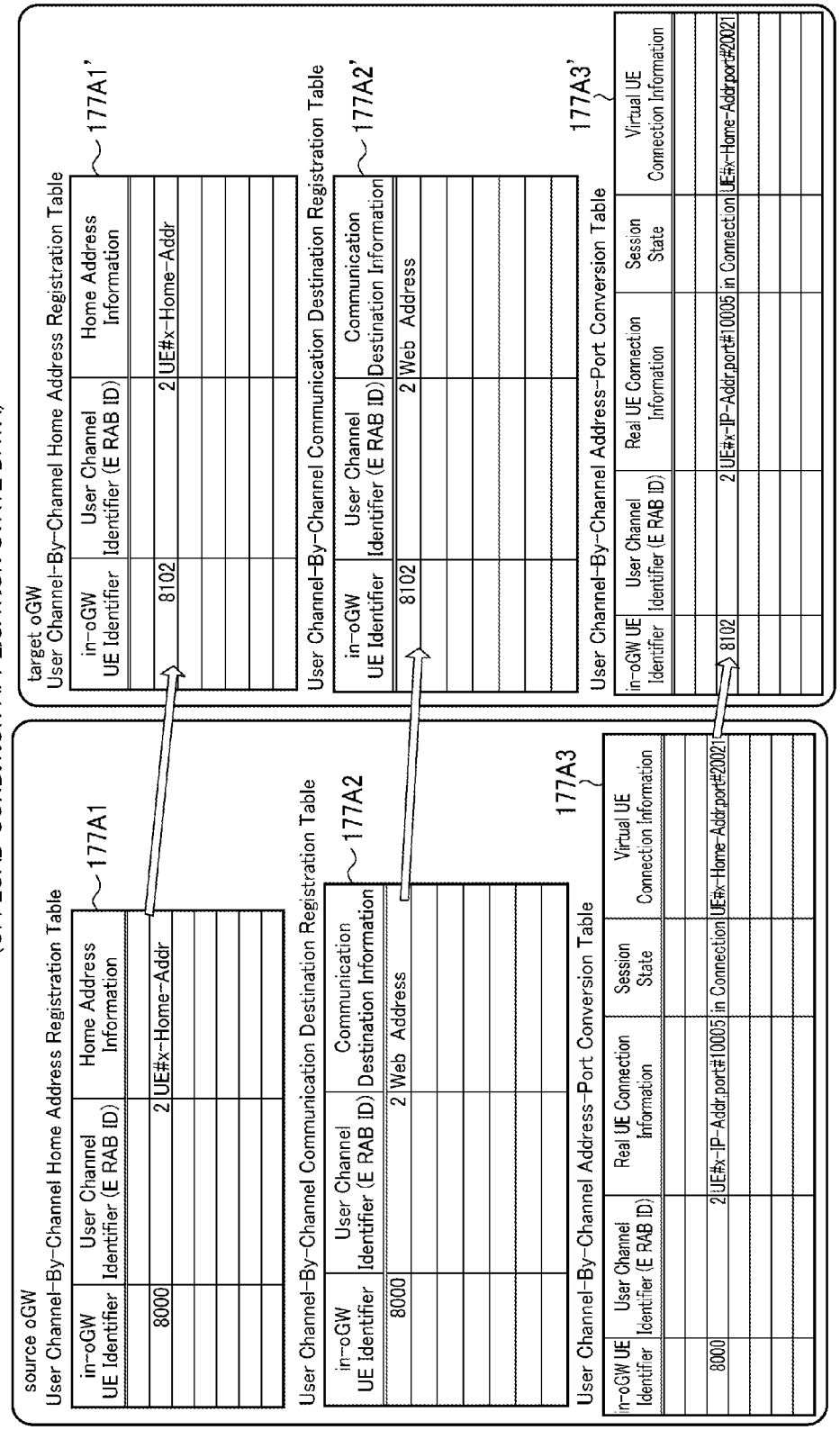

EXAMPLES OF HANDING OVER OFFLOAD CONDITION APPLICATION
STATE AT X2-BASED HANDOVER (HOME AGENT)

FIG. 55A

Home Agent State Management Table (source oGW)

| Home Address | care of Address |
|---|---|
|  |  |
| UE#x-Home Addr | UE#x-care of Addr |
|  |  |
|  |  |

Home Agent State Management Table (target oGW)

| Home Address | care of Address |
|---|---|
|  |  |
|  |  |
|  |  |
|  |  |
|  |  |

~179A'

EXAMPLE OF OFFLOAD CONDITION APPLICATION STATE AFTER GENERATION
OF NEW TCP CONNECTION AFTER HANDOVER (BEARER STATE DATA)

Source oGW (=oGW#1)

Bearer Use Subscriber Identification Table (1/2) — 176a

| in-oGW UE Identifier | in-MME UE Identifier | T-Target CellID inf | MME Apparatus Identifier | in-eNB UE Identifier (S1AP) | in-eNB UE Identifier (X2AP) | eNB Apparatus Identifier |
|---|---|---|---|---|---|---|
| | | | | | | |
| | | | | | | |
| | | | | | | |

FIG. 57A

Bearer Use Subscriber Identification Table (2/2) — 176b

| in-oGW UE Identifier | T-C-RNTI inf | Target ID | S-Target CellID inf | S-C-RNTI inf |
|---|---|---|---|---|
| | | | | |
| | | | | |
| | | | | |

FIG. 57B

Bearer Table — 176B

| in-oGW UE Identifier | User Channel Identifie | Uplink Channel Allocation Information | Downlink Channel Allocation Information | Offload Communication Address |
|---|---|---|---|---|
| | | | | |
| | | | | |
| | | | | |

FIG. 57C

EXAMPLE OF OFFLOAD CONDITION APPLICATION STATE AFTER GENERATION OF NEW TCP CONNECTION AFTER HANDOVER (BEARER STATE DATA)

Target oGW (=oGW#2)

FIG. 57D Bearer Use Subscriber Identification Table (1/2)

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| 8102 | MME#1 UE S1AP ID#x | MME#1 | eNB#2 UE S1AP ID#x | | eNB#2 |
| | | | | | |
| | | | | | |

176a'  176A'

FIG. 57E Bearer Use Subscriber Identification Table (2/2)

| in-oGW UE Identifier | T-Target CellID inf | T-C-RNTI inf | Target ID | S-Target CellID inf | S-C-RNTI inf |
|---|---|---|---|---|---|
| 8102 | | | | | |
| | | | | | |
| | | | | | |

176b'

FIG. 57F Bearer Table

| in-oGW UE Identifier | User Channel Identifier | Uplink Channel Allocation Information | Downlink Channel Allocation Information | Offload Communication Address |
|---|---|---|---|---|
| 8102 | 1 | TEID#SGW-u21 | SGW#2 | eNB-TEID#21 | eNB#2 | (Non-Application of Offload) |
| 8102 | 2 | TEID#SGW-u22 | SGW#2 | eNB-TEID#22 | eNB#2 | UE#x-care of Addr |
| | | | | | | |

176B'

EXAMPLE OF OFFLOAD CONDITION APPLICATION STATE AFTER GENERATION OF
NEW TCP CONNECTION AFTER HANDOVER (OFFLOAD CONDITION APPLICATION STATE DATA)

source oGW

User Channel-By-Channel Home Address Registration Table ~177A1

| in-oGW UE Identifier | User Channel Identifier (E RAB ID) | Home Address Information |
|---|---|---|
|  |  |  |
|  |  |  |
|  |  |  |

User Channel-By-Channel Communication Destination Registration Table ~177A2

| in-oGW UE Identifier | User Channel Identifier (E RAB ID) | Communication Destination Information |
|---|---|---|
|  |  |  |
|  |  |  |
|  |  |  |

177A3

User Channel-By-Channel Address-Port Conversion Table

| in-oGW UE Identifier | User Channel Identifier (E RAB ID) | Real UE Connection Information | Session State | Virtual UE Connection Information |
|---|---|---|---|---|
|  |  |  |  |  |
|  |  |  |  |  |
|  |  |  |  |  |

FIG. 58A target oGW

User Channel-By-Channel Home Address Registration Table ~177A1'

| in-oGW UE Identifier | User Channel Identifier (E RAB ID) | Home Address Information |
|---|---|---|
| 2 | 8102 | UE#x-Home-Addr |
|  |  |  |

User Channel-By-Channel Communication Destination Registration Table ~177A2'

| in-oGW UE Identifier | User Channel Identifier (E RAB ID) | Communication Destination Information |
|---|---|---|
| 2 | 8102 | Web Address |
| 2 | 8102 | Web Address#2 |

177A3'

User Channel-By-Channel Address-Port Conversion Table

| in-oGW UE Identifier | User Channel Identifier (E RAB ID) | Real UE Connection Information | Session State | Virtual UE Connection Information |
|---|---|---|---|---|
| 2 | 8102 | UE#x-IP-Addr.port#10005 | in Connection | UE#x-Home-Addr.port#20021 |
| 2 | 8102 | UE#x-IP-Addr.port#10010 | in Connection | UE#x-Home-Addr.port#20016 |
|  |  |  |  |  |

FIG. 58B

EXAMPLES OF OFFLOAD CONDITION APPLICATION STATES
AFTER GENERATION OF NEW TCP CONNECTION AFTER HANDOVER
(HOME AGENT)

FIG. 59A

Home Agent State Management Table (source oGW)

| Home Address | care of Address |
|---|---|
|  |  |
| UE#x-Home Addr | UE#x-care of Addr |
|  |  |
|  |  |
|  |  |

Home Agent State Management Table (target oGW)

| Home Address | care of Address |
|---|---|
|  |  |
|  |  |
|  |  |
|  |  |
|  |  |

~179A'

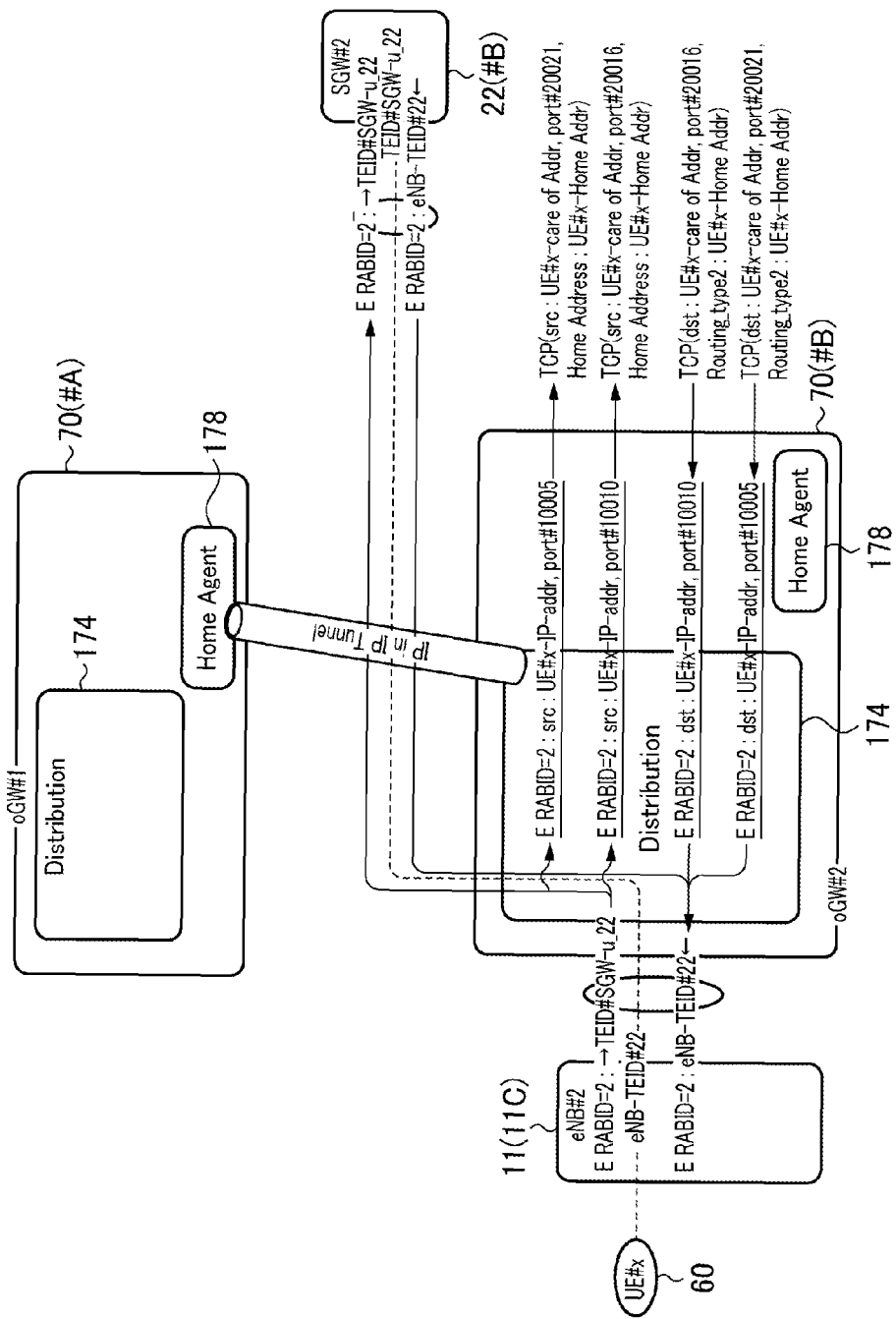

EXAMPLE OF OFFLOAD CONDITION APPLICATION STATE AFTER DISCONNECTION OF TCP CONNECTION AFTER HANDOVER (BEARER STATE DATA)

Source oGW (=oGW#1)

Bearer Use Subscriber Identification Table (1/2)

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| | | | | | |
| | | | | | |
| | | | | | |

Bearer Use Subscriber Identification Table (2/2)

| in-oGW UE Identifier | T-Target CellID inf | T-C-RNTI inf | Target ID | S-Target CellID inf | S-C-RNTI inf |
|---|---|---|---|---|---|
| | | | | | |
| | | | | | |
| | | | | | |

Bearer Table

| in-oGW UE Identifier | User Channel Identifie | Uplink Channel Allocation Information | Downlink Channel Allocation Information | Offload Communication Address |
|---|---|---|---|---|
| | | | | |
| | | | | |
| | | | | |

FIG. 61C

EXAMPLE OF OFFLOAD CONDITION APPLICATION STATE AFTER DISCONNECTION OF TCP CONNECTION AFTER HANDOVER (BEARER STATE DATA)

Target oGW (=oGW#2)

FIG. 61D — Bearer Use Subscriber Identification Table (1/2)  176a'

| in-oGW UE Identifier | in-MME UE Identifier | MME Apparatus Identifier | in-eNB UE Identifier (S1AP) | in-eNB UE Identifier (X2AP) | eNB Apparatus Identifier |
|---|---|---|---|---|---|
| 8102 | MME#1 UE S1AP ID#x | MME#1 | eNB#2 UE S1AP ID#x | | eNB#2 |
| | | | | | |
| | | | | | |

} 176A'

FIG. 61E — Bearer Use Subscriber Identification Table (2/2)  176b'

| in-oGW UE Identifier | T-Target CellID inf | T-C-RNTI inf | Target ID | S-Target CellID inf | S-C-RNTI inf |
|---|---|---|---|---|---|
| 8102 | | | | | |
| | | | | | |
| | | | | | |

FIG. 61F — Bearer Table  176B'

| in-oGW UE Identifier | User Channel Identifier | Uplink Channel Allocation Information | | Downlink Channel Allocation Information | | Offload Communication Address |
|---|---|---|---|---|---|---|
| 8102 | 1 | TEID#SGW-u21 | SGW#2 | eNB-TEID#21 | eNB#2 | (Non-Application of Offload) |
| 8102 | 2 | TEID#SGW-u22 | SGW#2 | eNB-TEID#22 | eNB#2 | UE#x-care of Addr |

EXAMPLE OF OFFLOAD CONDITION APPLICATION STATE
AFTER DISCONNECTION OF TCP CONNECTION AFTER HANDOVER
(OFFLOAD CONDITION APPLICATION STATE DATA)

FIG. 62A source oGW
User Channel-By-Channel Home Address Registration Table  177A1

| in-oGW UE Identifier | User Channel Identifier (E RAB ID) | Communication Destination Information |
|---|---|---|
| | | |
| | | |
| | | |
| | | |

User Channel-By-Channel Communication Destination Registration Table  177A2

| in-oGW UE Identifier | User Channel Identifier (E RAB ID) | Communication Destination Information |
|---|---|---|
| | | |
| | | |
| | | |
| | | |
| | | |

User Channel-By-Channel Address-Port Conversion Table  177A3

| in-oGW UE Identifier | User Channel Identifier (E RAB ID) | Real UE Connection Information | Session State | Virtual UE Connection Information |
|---|---|---|---|---|
| | | | | |
| | | | | |
| | | | | |
| | | | | |

FIG. 62B target oGW
User Channel-By-Channel Home Address Registration Table  177A1'

| in-oGW UE Identifier | User Channel Identifier (E RAB ID) | Communication Destination Information |
|---|---|---|
| 8102 | 2 | UE#x-Home-Addr |
| | | |
| | | |

User Channel-By-Channel Communication Destination Registration Table  177A2'

| in-oGW UE Identifier | User Channel Identifier (E RAB ID) | Communication Destination Information |
|---|---|---|
| 8102 | 2 | Web_Address |
| 8102 | 2 | Web_Address#2 |
| | | |
| | | |

User Channel-By-Channel Address-Port Conversion Table  Delete 177A3'

| in-oGW UE Identifier | User Channel Identifier (E RAB ID) | Real UE Connection Information | Session State | Virtual UE Connection Information |
|---|---|---|---|---|
| ~~8102~~ | ~~2~~ | ~~UE#x-IP-Addr,port#10005~~ | ~~in Connection~~ | ~~UE#x-Home-Addr,port#20021~~ |
| 8102 | 2 | UE#x-IP-Addr,port#10010 | in Connection | UE#x-Home-Addr,port#20016 |
| | | | | |

EXAMPLES OF OFFLOAD CONDITION APPLICATION STATES
AFTER DISCONNECTION OF TCP CONNECTION AFTER HANDOVER
(HOME AGENT)

FIG. 63A

Home Agent State Management Table (source oGW)

| Home Address | care of Address |
|---|---|
|  |  |
| UE#x-Home Addr | UE#x-care of Addr |
|  |  |
|  |  |

Home Agent State Management Table (target oGW)

| Home Address | care of Address |
|---|---|
|  |  |
|  |  |
|  |  |
|  |  |

~179A'

EXAMPLE OF OFFLOAD CONDITION APPLICATION STATE AFTER DISCONNECTION OF TCP CONNECTION AFTER HANDOVER (FLOW OF TRAFFIC)

FIG. 65

EXAMPLE OF CONFIGURATION OF oGW INFORMATION
ACCOMMODATING EACH eNB IN OFFLOAD GW eNB Accommodation Table

| eNB Identifier | eNB Address Information | oGW Information accommodating each eNB |
|---|---|---|
| eNB#1 | eNB#1 Address | oGW#1 |
| eNB#2 | eNB#2 Address | oGW#2 |
| eNB#3 | eNB#3 Address | oGW#2 |
| eNB#4 | eNB#4 Address | oGW#1 |
|  |  |  |
|  |  |  |
|  |  |  |

NETWORK SYSTEM, OFFLOAD APPARATUS AND TRAFFIC CONTROL METHOD FOR NETWORK SYSTEM

CROSS-REFERENCE TO RELATED APPLICATION

This application is based upon and claims the benefit of priority of the prior Japanese Patent Application No. 2012-268018, filed on Dec. 7, 2012, the entire contents of which are incorporated herein by reference.

FIELD

The embodiments discussed herein are related to a network system, an offload apparatus and a traffic control method for the network system.

BACKGROUND

A radio communication system such as a mobile telephone system and a wireless MAN (Metropolitan Area Network) is widely in use today. Also, in a radio communication field, a next generation communication technology to improve communication speed and capacity is under continuous discussion.

With regard to such a radio communication system, there is LTE/EPC (Long Term Evolution/Evolved Packet Core), as an example. The LTE/EPC is standardized at the 3GPP (3rd Generation Partnership Project) as a next generation radio communication system to succeed the third generation mobile telephone network (3G Mobile System).

The LTE/EPC includes an LTE network and an EPC network as a core network. The LTE network, a radio access network conforming to the LTE standard, may also be designated as E-UTRAN (Evolved UMTS Terrestrial Radio Access Network). Further, the EPC network, which is also called as SAE (System Architecture Evolution), is connected to an IP (Internet Packet) network (or simply, a packet network) through an IMS (IP Multimedia Subsystem) network. The IP network includes an ISP (Internet Service Provider) network (or the Internet) and an intranet, for example.

In the LTE/EPC, a mobile station (mobile terminal: UE or User Equipment) may be connected to the EPC network through the LTE network, and may be connected to the IP network through the EPC network or the IMS network. By accessing a variety of server apparatuses and terminal apparatuses connected to the IP network, the mobile station may receive a variety of services, such as a browsing service by a browser, a video distribution service and VoIP (Voice over IP).

The EPC network includes a plurality of nodes, such as MME (Mobile Management Entity), S-GW (Serving Gateway), P-GW (Packet Data Network Gateway) and PCRF (Policy and Charging Rules Function). With a connection to the IMS network through the S-GW and the P-GW, the mobile station may access the IP network.

Now, in such a radio communication system, there is a technique called traffic offload. In the traffic offload, traffic from a mobile station is carried to the ISP network without passing through the S-GW and the P-GW, so that traffic in the EPC network may be reduced.

As an example of the traffic offload technique, an offload apparatus is provided in the EPC network. The offload apparatus functions as an anchor point for traffic from the mobile station (radio access network), to transfer the traffic from the mobile station to a network for offloading which is different from the EPC network. The network for offloading may be called an offload network (such as the IP network and an MPLS (Multi Protocol Label Switching) network), for example. Offloaded traffic arrives at a target IP network through the offload network.

For the offload traffic in the EPC network, for example, an offload apparatus which functions as an offload anchor point is determined for each communication channel, when the communication channel is set at the mobile station. The offload apparatus which functions as the offload anchor point is not changed if a base station connecting the mobile station is changed. In other words, the whole offload traffic from the mobile station passes through the offload apparatus, the anchor point. By this, it is possible to avoid disconnection or interruption of communication between the mobile station and the IP network caused by the movement of the mobile station.

Meanwhile, there is another technique as described below, for example. Namely, when a mobile terminal is expected to move in to a radio area, and a radio base station corresponding to that area is accommodated in another switching system, a standby connection is formed from the switching system, which accommodates the radio base station currently in communication, to a pseudo terminal which is accommodated in the other switching system. By this, route selection after handover can be made within a short time, and an effective use of a network link resource can be attained, for example.

Patent document 1: Japanese Laid-open Patent Publication No. 10-243440.

However, with regard to the above-mentioned offload technique, a phenomenon called "trombone phenomenon" may occur.

For example, there is a case as described below. Namely, with the provision of a plurality of offload apparatuses in an EPC network, an offload apparatus may be changed by the movement of a mobile station. In such a case, an offload apparatus after the change is different from the offload apparatus which originally acts as an anchor point. In such a state, offload traffic passes through the anchor point which is determined originally, despite that a transmission distance to a target IP network from the offload apparatus after the change can be greatly reduced, as compared with a transmission distance to the target IP network from the offload apparatus which acts as an anchor point. The trombone phenomenon signifies that, in spite of the movement of a mobile station, the whole offload traffic from the mobile station passes through an offload apparatus which is originally determined as an anchor point, for example.

Because extra traffic is produced between the offload apparatuses by the trombone phenomenon, the reduction of a traffic load in the core network (EPC network) may be impeded.

However, the aforementioned technique related to standby connection aims to shorten a route selection time at hand-off by the formation of a standby connection to a pseudo terminal by a switching system, for example, which does not provide any solution to the trombone phenomenon. Therefore, by the above technique, it is difficult to reduce traffic in the core network.

SUMMARY

According to an aspect of the embodiments, a network system including: a first and second radio base station apparatuses which are connectable with a mobile station apparatus; a first network which accommodates the first and second radio base station apparatuses; a first offload apparatus which relays packet data transmitted between the first radio base station apparatus and the first network, and transmits to a second network a portion of packet data transmitted from the first radio base station apparatus after rewriting a first address of the mobile station apparatus with a second address, or transmits to the first radio base station apparatus packet data received from the second network after rewriting the second address with the first address; and a second offload apparatus, wherein the first offload apparatus includes a first control unit which transmits the second address to the second offload apparatus intervened between the second radio base station apparatus and the first network, when the mobile station apparatus changes over connection from the first radio base station apparatus to the second radio base station apparatus, and the second offload apparatus includes a second control unit which receives the second address.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A is a diagram illustrating an example of a user channel-by-channel home address registration table.

FIG. 7B is a diagram illustrating an example of a user channel-by-channel communication destination registration table.

FIG. 7C is a diagram illustrating an example of a user channel-by-channel address-port conversion table.

FIG. 8 is a diagram illustrating an example of an uplink GTP-u packet.

FIG. 9 is a diagram illustrating an example of a downlink GTP-u packet.

FIG. 10A and FIG. 10B are diagrams illustrating examples of offload packets.

FIG. 11A and FIG. 11B are diagrams illustrating examples of offload packets.

FIG. 12A and FIG. 12B are diagrams illustrating examples of Binding Update messages.

FIG. 13A and FIG. 13B are diagrams illustrating examples of offload packets to be relayed by a home agent.

FIGS. 14A to 14C are diagrams explaining bearer state management data.

FIG. 15 is a diagram explaining correspondence management data.

FIG. 16 is a diagram illustrating an example of an Initial Context Setup Request message.

FIG. 17 is a diagram illustrating an example of an Initial Context Setup Response message.

FIG. 18 is a diagram illustrating an example of a Handover Required message.

FIG. 19 is a diagram illustrating an example of a Handover Request message.

FIG. 20 is a diagram illustrating an example of a Handover Request Ack. message.

FIG. 21 is a diagram illustrating an example of a Handover Command message.

FIG. 22 is a diagram illustrating an example of a UE Context Release Command message.

FIG. 23 is a diagram illustrating an example of an X2AP: Handover Request message.

FIG. 24 is a diagram illustrating an example of an X2AP: Handover Request Ack. message.

FIG. 25 is a diagram illustrating an example of an X2AP: UE Context Release message.

FIG. 26 is a diagram illustrating an example of a Path Switch Request message.

FIG. 27 is a diagram illustrating an example of a Path Switch Request Ack. message.

FIGS. 28A, 28B are diagrams illustrating an example of a processing flow when the offload GW receives an Uplink GTP-u packet.

FIG. 40 is a diagram illustrating an example of a processing flow at the interception of an X2AP: UE Context Release message.

FIGS. 41A to 41C are diagrams illustrating examples of offload condition application states (bearer state data) after the generation of a TCP connection.

FIGS. 42A to 42C are diagrams illustrating examples of offload condition application states (offload condition application state data) after the generation of a TCP connection.

FIG. 43 is a diagram illustrating an example of an offload condition application state (home agent) after the generation of a TCP connection.

FIGS. 45A to 45F are diagrams illustrating an example of handing over an offload condition application state (bearer state data) at an S1-based handover.

FIGS. 46A and 46B are diagrams illustrating an example of handing over an offload condition application state (offload condition application state data) at an S1-based handover.

FIGS. 47A and 47B are diagrams illustrating examples of handing over an offload condition application state (home agent) at an S1-based handover.

FIG. 48 is a diagram illustrating an example of handing over an offload condition application state (a flow of traffic) at an S1-based handover.

FIGS. 49A to 49F are diagrams illustrating an example of an offload condition application state (bearer state data) at the completion of handover with a maintained TCP connection.

FIGS. 50A and 50B are diagrams illustrating an example of an offload condition application state (offload condition application state data) at the completion of handover with a maintained TCP connection.

FIGS. 51A and 51B are diagrams illustrating an example of an offload condition application state (home agent) at the completion of handover with a maintained TCP connection.

FIGS. 53A to 53F are diagrams illustrating an example of handing over an offload condition application state (bearer state data) at an X2-based handover.

FIGS. 54A and 54B are diagrams illustrating an example of handing over an offload condition application state (offload condition application state data) at an X2-based handover.

FIGS. 55A and 55B are diagrams illustrating examples of handing over an offload condition application state (home agent) at an X2-based handover.

FIGS. 57A to 57F are diagrams illustrating an example of an offload condition application state (bearer state data) after the generation of a new TCP connection after handover.

FIGS. 58A and 58B are diagrams illustrating an example of an offload condition application state (offload condition application state data) after the generation of a new TCP connection after handover.

FIGS. 59A and 59B are diagrams illustrating examples of offload condition application states (home agent) after the generation of a new TCP connection after handover.

FIG. 60 is a diagram illustrating an example of an offload condition application state (a flow of traffic) after the generation of a new TCP connection after handover.

FIGS. 61A to 61F are diagrams illustrating an example of an offload condition application state (bearer state data) after the disconnection of a TCP connection after handover.

FIGS. 62A and 62B are diagrams illustrating an example of an offload condition application state (offload condition application state data) after the disconnection of a TCP connection after handover.

FIGS. 63A and 63B are diagrams illustrating examples of offload condition application states (home agent) after the disconnection of a TCP connection after handover.

FIG. 65 is a diagram illustrating an example of the configuration of oGW information accommodating each eNB in the offload GW.

DESCRIPTION OF EMBODIMENTS

Hereafter, embodiments of the present invention will be described.

[First Embodiment]

Figure 1:
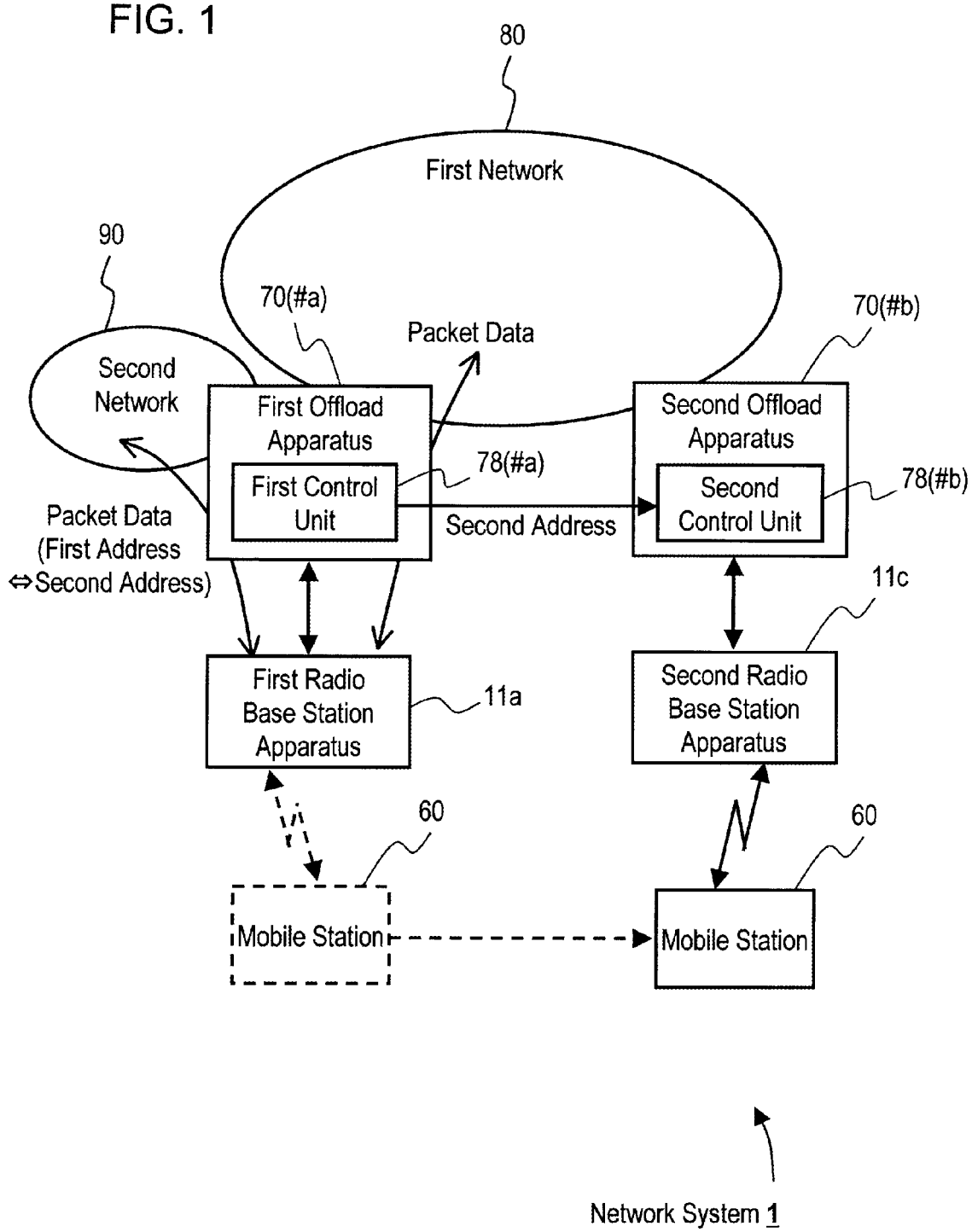
FIG. 1 is a diagram illustrating an example of a network system configuration.

First of all, a first embodiment will be described. FIG. 1 illustrates an example of a network system 1 according to the first embodiment. The network system 1 includes a first and a second radio base station apparatus 11A, 11C which are connectable to a mobile station apparatus 60, a first network 80 which accommodates the first and second radio base station apparatuses 11A, 11C, a first and a second offload apparatus 70 (#A), 70 (#B), and a second network 90. In the example depicted in FIG. 1, there is illustrated a state that the mobile station apparatus 60 changes over the connection destination thereof from the first radio base station apparatus 11A to the second radio base station apparatus 11C. Also, in FIG. 1, for example, the first network 80 is a core network and the second network 90 is an offload network.

The first offload apparatus 70 (#A) relays packet data transmitted between the first radio base station apparatus 11A and the first network 80. Also, the first offload apparatus 70 (#A) transmits to the second network 90 a portion of packet data transmitted from the first radio base station apparatus 11A after rewriting a first address of the mobile station apparatus 60 with a second address, and transmits to the first radio base station apparatus 11A packet data received from the second network 90 after rewriting the second address with the first address. Transmitting packet data from the first offload apparatus 70 (#A) to the second network 90 may be designated as, for example, "offloading" in some cases. As such, by that the first offload apparatus 70 offloads packet data to the second network 90, a packet data (or traffic) amount flowing through the first network 80 is reduced.

The first offload apparatus 70 (#A) includes a first control unit 78 (#A). The first control unit 78 (#A) transmits the second address to the second offload apparatus 70 (#B) which intervenes between the second radio base station apparatus 11C and the first network 80, when the mobile station apparatus 60 changes over a connection from the first radio base station apparatus 11A to the second radio base station apparatus 11C.

The second offload apparatus 70 (#B) includes a second control unit 78 (#B). The second control unit 78 (#B) receives the second address transmitted from the first offload apparatus 70 (#A). By this, the second address is duplicated from the first offload apparatus 70 (#A) into the second offload apparatus 70 (#B).

For example, with regard to the second address, the second offload apparatus 70 (#B) sets a third address to be an address for the mobile station apparatus 60. Then, the second offload apparatus 70 (#B) can transmit packet data, which is transmitted from the second radio base station apparatus 11C, to a third network (not illustrated in the figure), using the third address. Also, the second offload apparatus 70 (#B) can transmit packet data, which is transmitted from the third network, to the second radio base station apparatus 11C, using the third address.

Thus, even when the mobile station apparatus 60 moves from the first radio base station apparatus 11A to the second radio base station apparatus 11C, it is possible for the second offload apparatus 70 (#B) to offload packet data to be offloaded to the third network which is different from the first network 80.

Therefore, even when the mobile station apparatus 60 moves from the first radio base station apparatus 11A to the second radio base station apparatus 11C, the packet data to be offloaded does not flow into the first network 80, and thus, it is possible to reduce traffic in the first network 80 (or core network).

[Second Embodiment]

Figure 2:
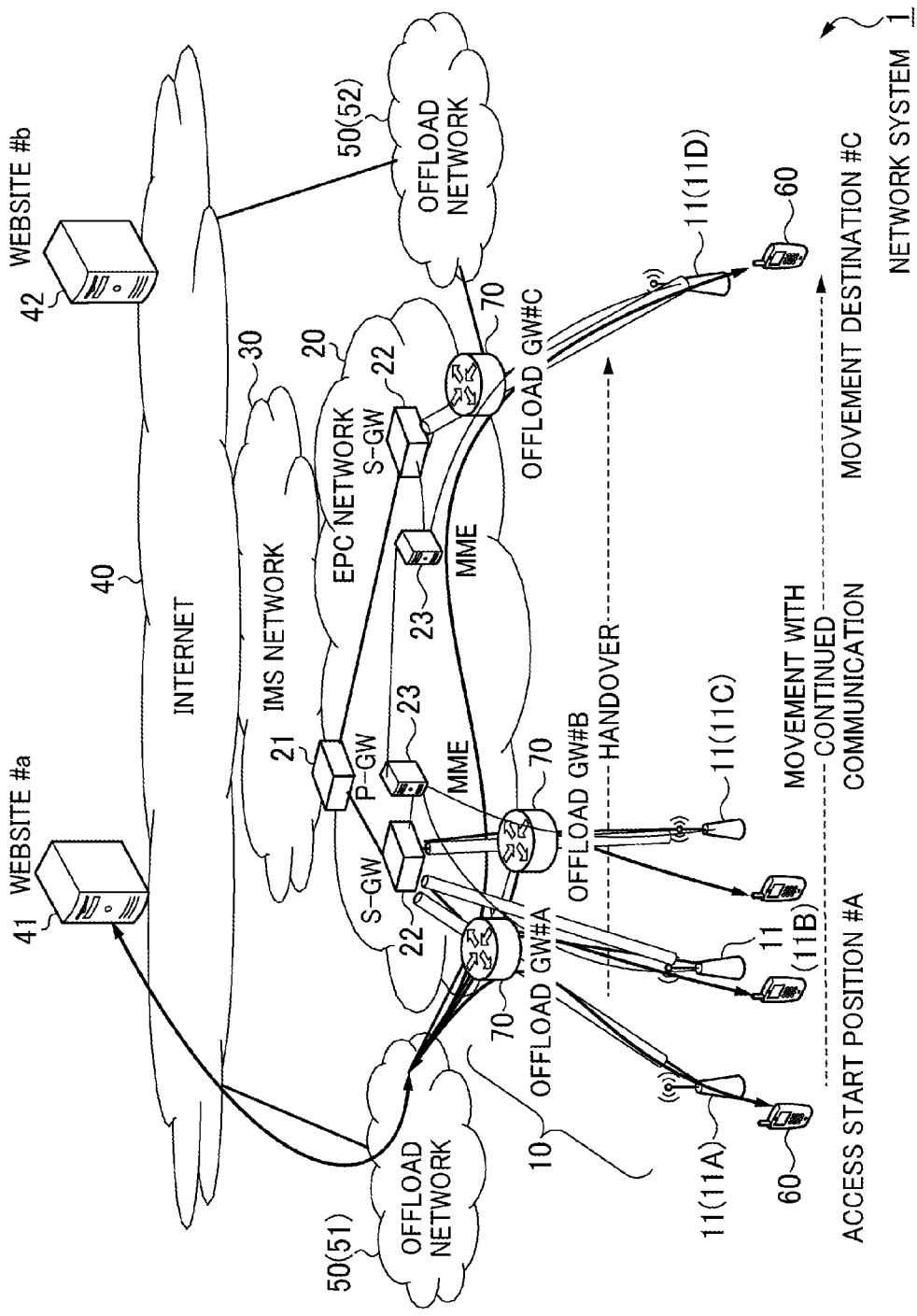
FIG. 2 is a diagram illustrating an example of a network system configuration.

Next, a second embodiment will be described. FIG. 2 is a diagram illustrating an example of a configuration of a network system 1 in the second embodiment.

The network system includes an LTE network 10, an EPC network 20, an IMS network 30, an ISP (Internet Service Provider) network (Internet) 40 and an offload network 50.

Incidentally, for example, the EPC network 20 corresponds to the first network 80 in the first embodiment, and also the offload network 50 corresponds to the second network 90 in the first embodiment.

The LTE network 20 is one example of a radio access network. The LTE network 10 includes a radio base station apparatus (which may hereafter be referred to as "base station") 11 called "eNodeB (evolved Node B)" which conforms to the LTE standard.

The EPC network 20 is one example of the core network. The EPC network 20 can accommodate a radio access network by the 3GPP, including the networks of the second generation (2G: for example, GSM (Registered trademark) (Global System for Mobile communications)), the third generation (3G: for example, W-CDMA (Wideband Code Division Multiple Access)), the 3.5 generation (for example, HSPA (High Speed Packet Access)). Also, the EPC network 20 can accommodate a non-3GPP radio access network, including CDMA-2000 and WiMAX (Wideband interoperability for Microwave Access). The EPC network 20 includes a P-GW 21, an S-GW 22, an MME 23 and an offload apparatus (which may hereafter be referred to as "offload GW") 70. Further, the EPC network 20 may include a node such as a PCRF node.

The P-GW 21 acts as a connection point to a packet network such as the ISP network 40. The P-GW 21 performs IP address allocation and dispensing to the mobile station 60 and user authentication, for example. Also, the P-GW 21 performs QoS (Quality of Service) control and charging data generation instructed from PCRF, and may also include a DHCP server function.

The S-GW 22 handles U-plane (User plane) data such as user data, for example. The S-GW 22 functions as an anchor point to a 3GPP radio access network, for example, to perform packet data relay processing between with the P-GW 21.

The MME 23 handles C-plane (Control plane) data related to network control, for example. The MME 23 also performs establishment and release of a bearer, position registration and movement control such as handover related to the mobile station 60. Further, the MME 23 performs authentication of the mobile station 60 in cooperation with HSS (Home Subscriber Server) in which subscriber information is registered.

The offload GW 70 functions as a node which controls offload traffic, for example. In FIG. 1, as examples of the offload GW 70, an offload GW 70 (#A), an offload GW 70 (#B) and an offload GW 70 (#C) are depicted. The EPC network 20 includes one or more offload apparatuses. Each offload GW 70 is disposed, for example, between the base station 11 and the S-GW 22. The number of the offload GW 70 is appropriately settable, and it is also possible to install each offload GW 70 for each base station 11.

The offload GW 70 intercepts a C-plane packet exchanged between the base station 11 and S-GW 22. The offload GW 70 then determines traffic to be offloaded (which may hereafter be referred to as "offload traffic"), among U-plane traffic exchanged between the base station 11 and the S-GW 22.

After determining the traffic to be offloaded, the offload GW 70 exchanges the offload traffic in the following manner, for example. Namely, the offload GW 70 branches a U-plane data (user packet) in uplink communication, which is transmitted from the mobile station 60, to transfer to the offload network 50 (in FIG. 2, an offload network 51). The traffic transferred to the offload network 50 is transmitted to the ISP network 40 without passing through the EPC network 20, and finally arrives at a target communication party (for example, a Web server 41). On the other hand, the offload GW 70 allows offload traffic in downlink communication, which is transmitted from the target communication party, to join in traffic from the S-GW 22 to the base station 11. An example of a configuration etc. of the offload GW 70 will be described later.

To the ISP network 40, the Web server 41 which provides a website #a and a Web server 42 which provides a website #b are connected. Each Web server 41, 42 is an example of the opposite communication party (correspondence node) of the mobile station 60. The Web server 41, 42 may also be a terminal apparatus as long as it performs TCP communication, for example.

The base station 11 converts data, which is received from the Web server 41, 42 through the offload GW 70, into a radio signal to transmit to the mobile station 60. Also, the base station 11 converts a radio signal, transmitted from the mobile station 60, into data etc. to transmit to the Web server 41, 42 through the offload GW 70.

Further, the base station 11 is connected through the offload GW 70 to the MME 23 by a U-plane interface called "S1-MME interface". Also, the base station 11 is connected to the S-GW 22 by a C-plane interface called "S11 interface". The S-GW 22 is connected to the P-GW 21 by an interface called "S5". Further, each base station 11 is interconnected by an interface called "X2 interface".

The mobile station 60 can change over a base station of connection destination, for example, from a base station 11A to 11B and further to 11C, successively. The changeover of the mobile station 60 to a connection destination base station 11 may be referred to as handover, for example.

Additionally, the handover is classified into S1-based handover which is performed across different MMEs 23 and X2-based handover which is performed within the management range of an identical MME 23. In operation described later, explanation will be given on the above two handover types. By such the handover, the offload GW 70 which receives offload traffic transmitted from the mobile station 60 is also changed. In the example depicted in FIG. 1, when the mobile station 60 changes a base station 11 of connection destination from the base station 11A to the base station 11B, the offload GW 70 is also changed from the offload GW 70 (#A) to the offload GW 70 (#B).

<Offload GW>

Figure 3:
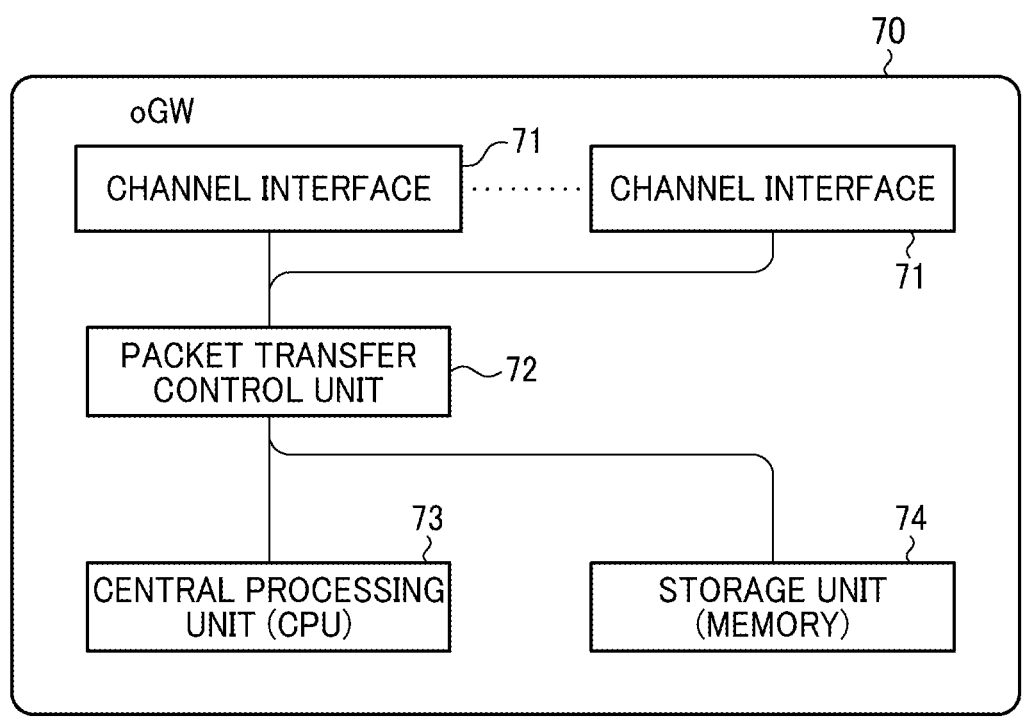
FIG. 3 is a diagram illustrating an example of a hardware configuration of an offload GW 70.

Next, a description will be given on a configuration example of the offload GW 70. FIG. 3 illustrates an example of the hardware configuration of the offload GW 70.

The offload GW (oGW) 70 includes a channel interface 71, a packet transfer control unit 72, a CPU (Central Processing Unit) 73 and a storage unit (memory) 74.

Here, the CPU 73 corresponds to the first control unit 78 (#A) or the second control unit 78 (#B) in the first embodiment, for example.

The channel interface 71 accommodates, for example, each channel which connects, for example, between the offload GW 70 and the base station 11, between the offload GW 70 and the S-GW 22, between the offload GW 70 and the MME 23 and between the offload GW 70 and the offload network 50. The offload GW 70 includes one or more channel interfaces 71 according to the number of channels to be accommodated. Incidentally, each channel interface 71 is formed of a general-purpose or a dedicated semiconductor circuit (such as LSI (Large Scale Integration) and ASIC (Application Specific Integrated Circuit)).

The packet transfer control unit 72 is connected to the channel interface 71, the CPU 73 and the storage unit 74, and performs packet transfer processing. The packet transfer control unit 72 includes, for example, a routing table for use to obtain an output port corresponding to a packet destination address, and outputs a packet to the output port. Incidentally, the packet transfer control unit 72 is formed of a circuit chip on which a general-purpose or a dedicated semiconductor circuit (such as LSI, ASIC, PLD (Programmable Logic Device) and DSP (Digital Signal Processor)) is mounted.

The CPU 73 controls the overall operation of the offload GW 70 through the control of the packet transfer control unit 72. The CPU 73 is an example of a controller (control unit), and also an example of a processor. The controller which takes charge of the function of the CPU 73 is achieved by the application of a dedicated or a general-purpose hardware chip, for example.

The storage unit 74 is formed of, for example, a semiconductor memory such as ROM (Read Only Memory), RAM (Random Access Memory) and EEPROM (Electrically Erasable Programmable ROM). The storage unit 74 provides a work area for the CPU 73, each storage area for a variety of programs to be executed by the CPU 73, etc.

Figure 4:
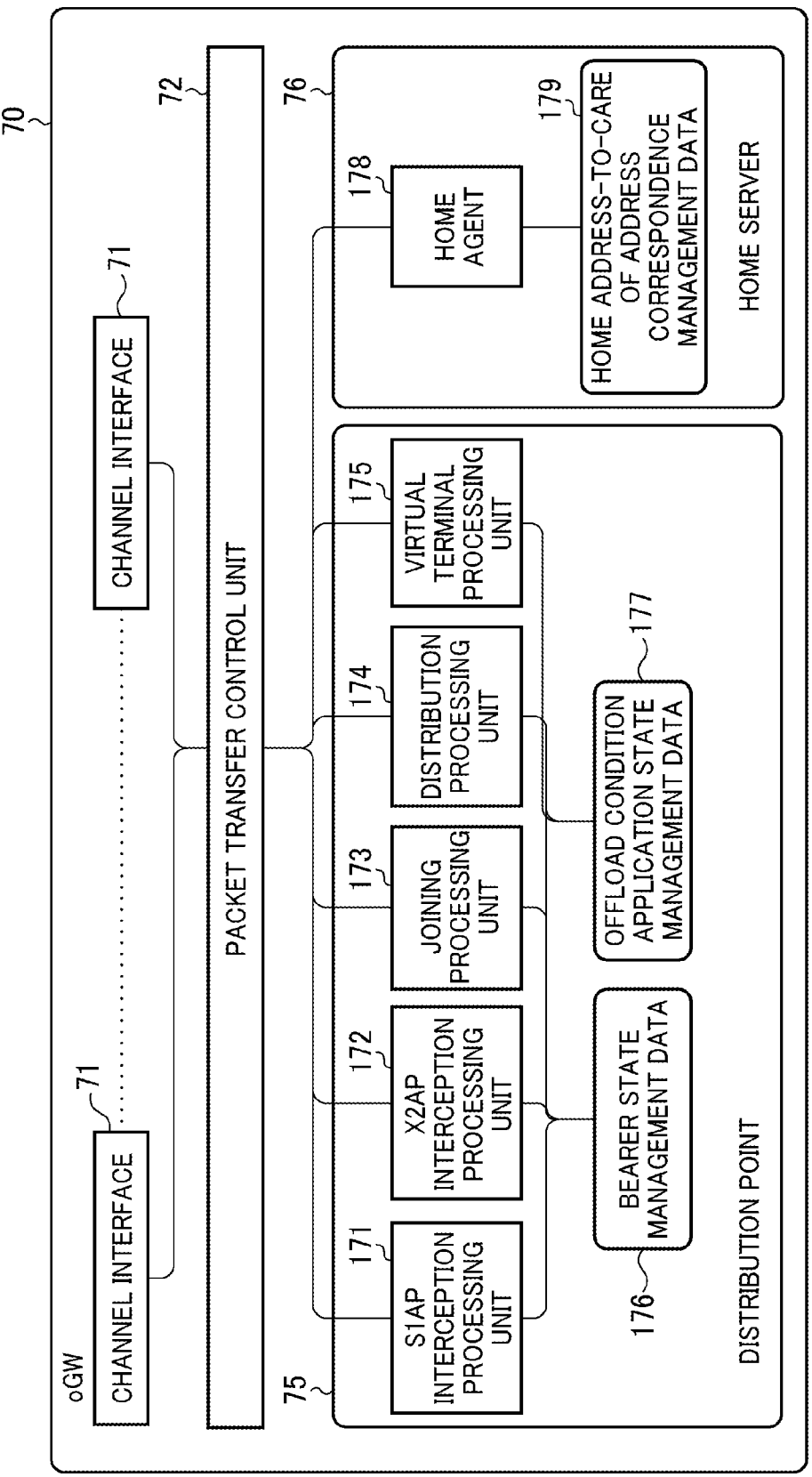
FIG. 4 is a diagram illustrating an example of a configuration of the offload GW 70.

FIG. 4 illustrates an example of the configuration of the offload GW 70. FIG. 4 illustrating the offload GW 70 is an explanation diagram of each function achieved by the execution of each program stored in the storage unit 74, by the CPU 73. Each functional block of the offload GW 70 depicted in FIG. 4 may be provided as hardware in the offload GW 70, needless to say.

The CPU 73 functions as a distribution point 75 and a home server 76, for example. The function as the distribution point 75 includes an S1AP interception processing unit 171, an X2AP interception processing unit 172, a joining processing unit 173, a distribution processing unit 174, a virtual terminal processing unit 175, bearer state management data 176, and offload condition application state management data (which may hereafter be referred to as "offload condition data") 177.

Also, the function as the home server 76 includes a home agent 178 and home address-to-care of address correspondence management data (which may hereafter be referred to as "correspondence management data") 179.

The storage unit 74 stores the bearer state management data 176, the offload condition application state management data and the correspondence management data 179.

Figure 5:
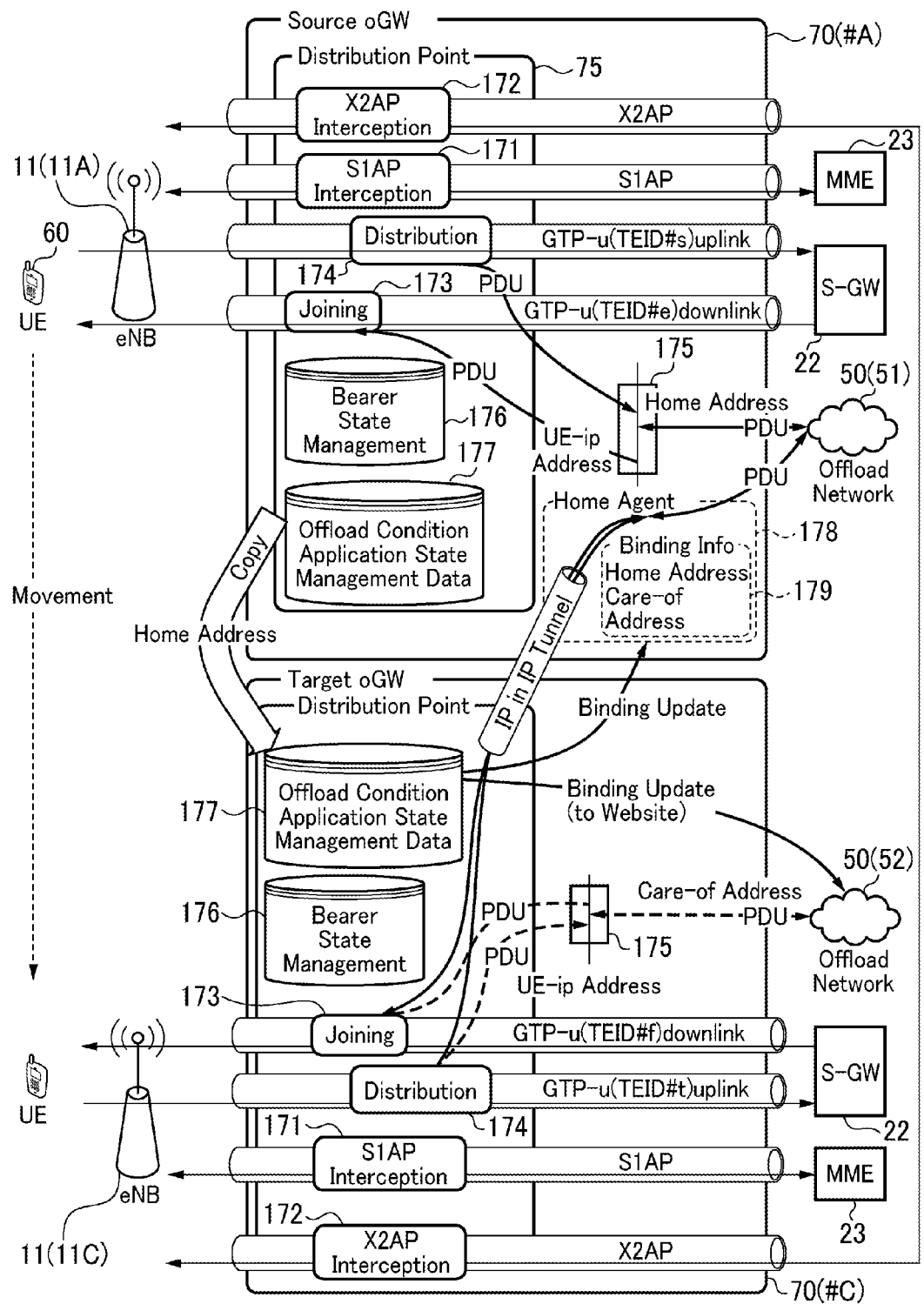
FIG. 5 is an explanation diagram of a function achieved by CPU.

FIG. 5 is an explanation diagram of the function achieved by the CPU 73 depicted in FIG. 3. FIG. 5 illustrates an example that, by the handover of the mobile station 60, the offload GW 70 is changed from a source offload GW 70 (#A) to a target offload GW 70 (#C). Each configuration of the source offload GW 70 (#A) and the target offload GW 70 (#C) is identical to the configuration of the offload GW 70 depicted in FIGS. 3 and 4.

The S1AP processing unit 171 intercepts a control packet based on an S1AP (S1 Application Protocol) between the base station 11 and the MME 23, allocates a communication channel to a target mobile station 60, and detects an opportunity to hand over, for example. Incidentally, the S1AP is a C-plane protocol which provides a signaling service between the base station 11 (eUTRAN) and the MME 23. By the S1AP, the base station 11 and the MME 23 can execute establishment, change and release of a bearer, handover control, incoming call control to a waiting mobile station, etc.

The X2AP transfer processing unit 172 intercepts a control packet based on an X2AP (X2 Application Protocol) between the base stations 11, allocates a communication channel to the target mobile station 60, and detects an opportunity to hand over, for example. The X2AP is a C-plane protocol on the X2 interface between the base stations (eNodeB) 11. By the X2AP, the base station 11 can execute load management and handover control between base stations, etc.

According to the communication channel allocated to the target mobile station 60, the distribution processing unit 174 extracts, from the communication channel, data to be transmitted to the Web server 41, 42 using the communication channel, and outputs the data to the virtual terminal processing unit 175, for example. By this, the distribution processing unit 174 can branch offload traffic to the offload network 50, for example. In this case, the distribution processing unit 174 can branch traffic which matches an offload application condition.

Additionally, in the example depicted in FIG. 5, traffic transmitted from the mobile station 60 flows in a GTP-u (GPRS Tunneling Protocol for User Plane) tunnel. The GTP-u is a protocol for IP transmission between the base station 11 and the S-GW 22, for example. Not only uplink communication traffic, downlink communication traffic also comes to flow through a bearer (GTP-u tunnel) established between the base station 11 and the S-GW 22. Also, a TEID (Tunnel Endpoint Identifier) is inserted in a GTP packet which flows in the GTP-u tunnel, and represents an endpoint of the GTP-u tunnel, for example.

The joining processing unit 173 outputs traffic, which is received from the Web server 41, 42 in the virtual terminal processing unit 175, toward the mobile station 60, according to the channel allocation of the target mobile station 60, for example. By this, the joining processing unit 173 can join traffic received from the offload network 50 with traffic from the S-GW 22, for example.

The virtual terminal processing unit 175 relays communication between the mobile station 60 and the Web server 41, 42. In this case, for example, the virtual terminal processing unit 175 rewrites the transmission source address of offload traffic, which is to be transmitted to the offload network 50, from the IP address of the mobile station 60 to a home address, and transmits the rewritten offload traffic to the offload network 50. Also, the virtual terminal processing unit 175 rewrites the transmission destination address of offload traffic, which is received from the offload network 50, from the home address to the IP address of the mobile station 60, and outputs the rewritten offload traffic to the joining processing unit 173.

Here, home address signifies an address which is not changed if a network is changed. For example, once a home address is granted to the mobile station 60, the home address is not changed if the mobile station 60 changes a base station connected thereto from a source base station 11 (11A) to a target base station 11 (11C).

In contrast, the IP address allocated to the mobile station 60 is possibly changed when the mobile station 60 changes the connected base station from the source base station 11 (11A) to the target base station 11 (11C). For example, the IP address is allocated and dispensed by the P-GW 21, and when the P-GW 21 which accommodates the mobile station 60 is changed, the IP address is also changed. However, the home address is not changed if the P-GW 21 is changed, for example. The IP address is also changed when a network is changed, for example.

At the handover of the mobile station 60, the virtual terminal processing unit 175 transmits offload condition data 177 from an offload GW 70 (source offload GW 70 (#A)) before handover, to an offload GW 70 (target offload GW 70 (#C)) after handover. In the offload condition data 177, the home address used by the source offload GW 70 (#A) is included, which is transmitted to the target offload GW 70 (#C). The target offload GW 70 (#C) sets a care of address, which is different from the home address, to the mobile station 60. By use of the care of address, the offload traffic after handover can be transmitted to an offload network 50 (offload network 52 in the example depicted in FIG. 2) which is different from the offload network before handover.

Further, in place of the mobile station 60, a virtual terminal processing unit 175 in the target offload GW 70 (#C) transmits correspondence between the home address and the care of address, to the home server 76 of the source offload GW 70 (#A). In this case, the virtual terminal processing unit 175 in the target offload GW 70 (#C) also transmits correspondence between the home address and the care of address, to the Web server 41, 42 which is the transmission destination of the offload traffic.

The home agent 178 supports a home agent function in Mobile IPv6, for example. The home agent 178 receives the care of address and the home address from the target offload GW 70 (#C), for example, to store into the correspondence management data 179.

Figure 6A:
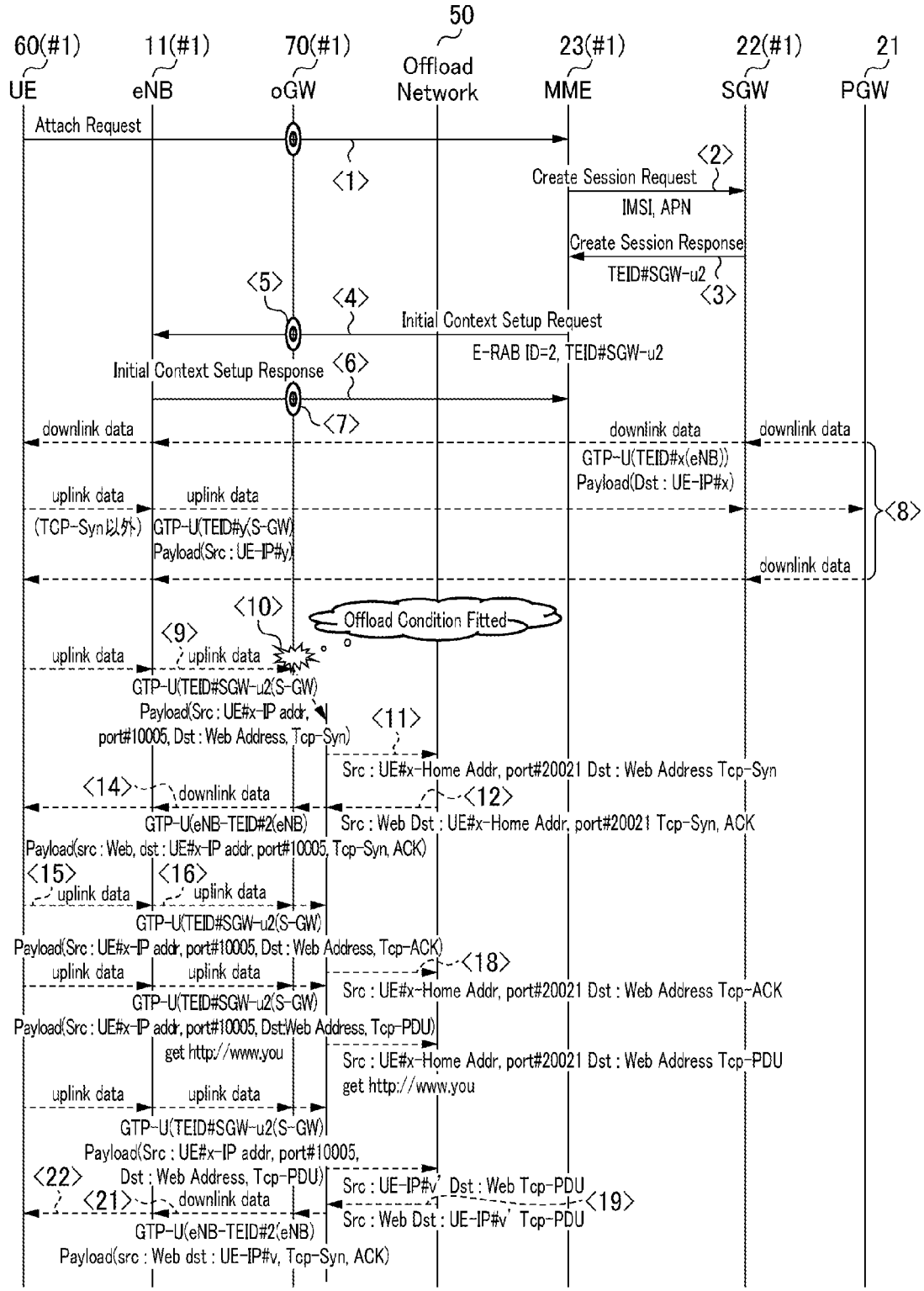
FIG. 6A is a diagram illustrating an example of a sequence from the initiation of a mobile station 60 to the execution of offload processing.
Figure 6B:
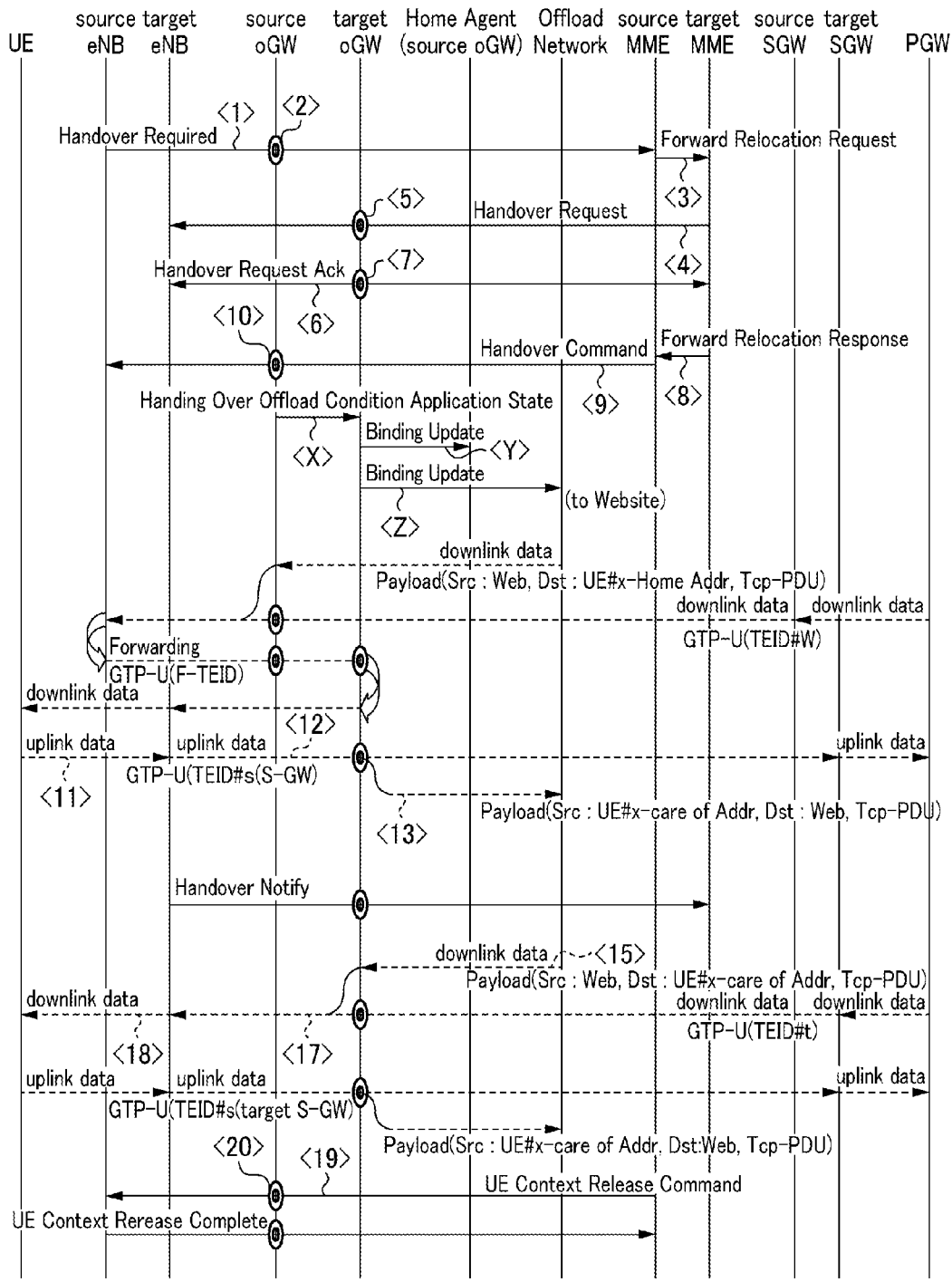
FIG. 6B is a diagram illustrating an example of a sequence in S1-based handover processing.
Figure 6C:
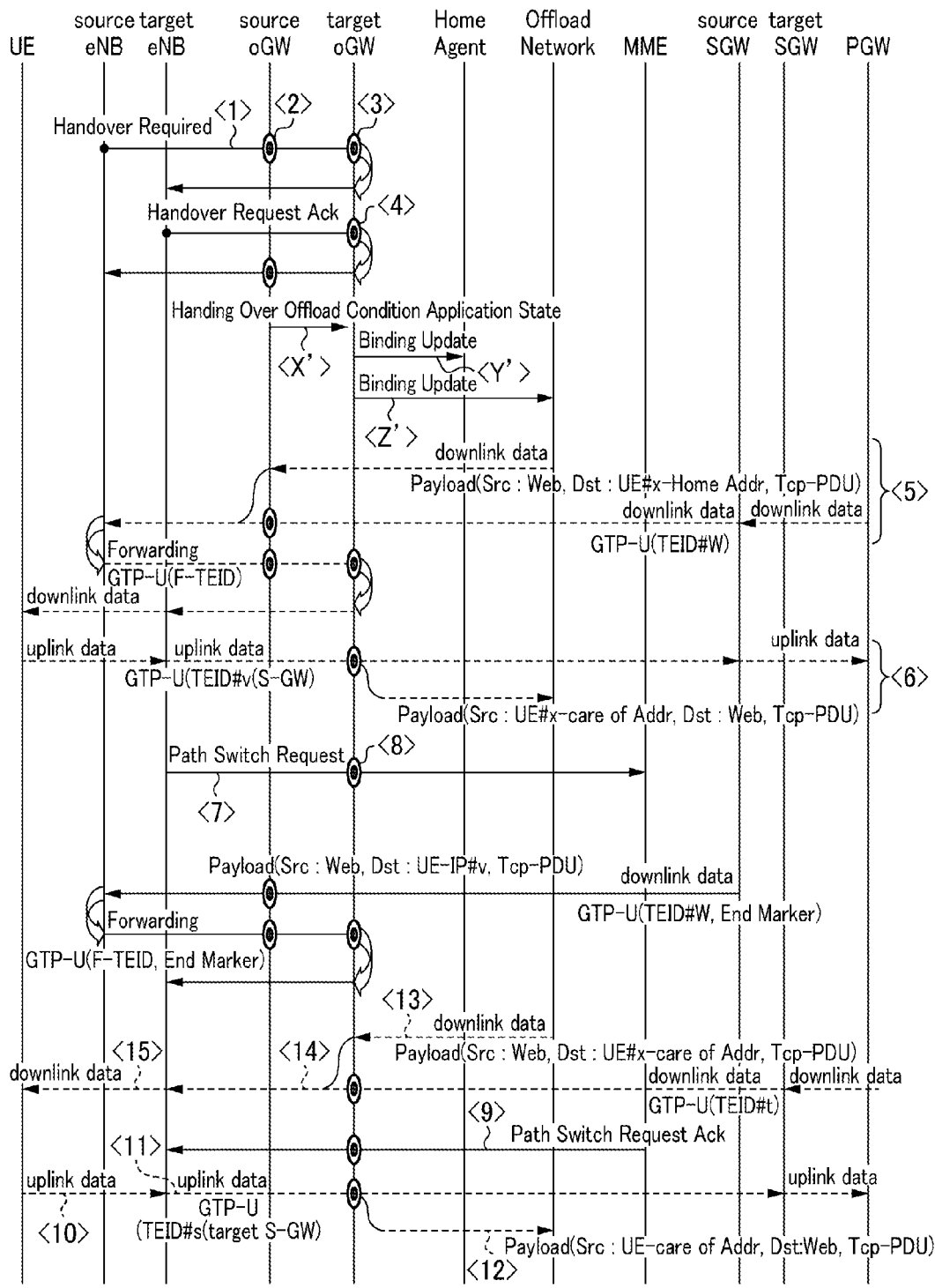
FIG. 6C is a diagram illustrating an example of a sequence in X2-based handover processing.

Hereafter, a more detailed description on the offload GW 70 will be given. FIG. 6A is a sequence diagram illustrating an example from the initiation of the mobile station 60 to the execution of offload processing, FIG. 6B is a sequence diagram illustrating an example of S1-based handover processing, and FIG. 6C is a sequence diagram illustrating an example of X2-based handover processing, respectively. Each detailed sequence will be described later.

<Offload Condition Application State Management Data>

FIGS. 7A to 7C illustrate an example of the configuration of an offload condition application state table 177A which retains the offload condition data 177 depicted in FIG. 5. As depicted in FIGS. 7A to 7C, the offload condition application state table 177A includes a user channel-by-channel home address registration table 177A1 (FIG. 7A), a user channel-by-channel communication destination registration table 177A2 (FIG. 7B) and a user channel-by-channel address-port conversion table 177A3 (FIG. 7C). The offload apparatus 70 transmits an offload packet to the offload network 50 on the basis of the offload condition application state table 177A, for example.

The user channel-by-channel home address registration table 177A1 includes items of "in-oGW Identifier", "User Channel Identifier" and "Home Address information".

Here, "in-oGW Identifier" stores, for example, information to uniquely identify the mobile station 60 in the offload GW 70. Also, "User Channel Identifier" stores, for example, information to uniquely identify a user channel in the mobile station 60. Information stored in this "User Channel Identifier" is synchronous with a channel identifier (E-RAB ID (E-UTRAN Radio Access Bearer)) at the mobile station 60. "Home Address information" stores a home address.

By the user channel-by-channel home address registration table 177A1, the offload GW 70 can associate home address information with information stored in "in-oGW Identifier" and "User Channel Identifier". Here, as a home address stored in "Home Address information", an identical value is retained, as the home address of a virtual UE, until the relevant user channel is disconnected.

Also, the user channel-by-channel communication destination registration table 177A2 further includes an item of "Communication Destination information". This "Communication Destination information" stores, for example, a communication destination address of the mobile station 60 (for example, the address of the Web server 41, 42). By the user channel-by-channel communication destination registration table 177A2, the offload GW 70 can associate the communication destination address of the mobile station 60 with the "in-oGW identifier" and the "user channel identifier".

Further, the user channel-by-channel address-port conversion table 177A3 includes items of "Real UE Connection information", "Session State" and "Virtual UE Connection information".

"Real UE Connection information" stores connection information in regard to TCP communication to be offloaded, among communication between a real UE (or the mobile station 60) and an opposite communication party (or the Web server 41, 42). The real UE is a mobile station 60 identified by an IP address allocated and dispensed by the P-GW 21. In the example depicted in FIG. 7C, the connection information includes an identifier and an IP address of the mobile station 60, and a TCP port number related to the mobile station 60.

"Session State" stores, for example, a communication channel state (such as "in connection", "waiting for UL disconnection" and "waiting for DL disconnection").

"Virtual UE Connection information" stores, for example, the TCP connection information of a virtual UE. Virtual UE signifies a mobile station 60 identified by the home address, for example. In the example depicted in FIG. 7C, the connection information includes the identifier of the mobile station 60, the home address and a TCP port number.

By the above user channel-by-channel address-port conversion table 177A3, the offload GW 70 can grasp mutual states between the TCP connection information of the real UE and the virtual UE. The offload GW 70 can associate each of the TCP connection information with the "in-oGW identifier" and the "user channel identifier".

<Packet>

Next, an example of a packet data format will be described. FIGS. 8 to 13B illustrate an example of each packet data format.

FIG. 8 is an example of the data format of a GTP-u packet on an uplink (an uplink GTP-u packet) forwarded from the base station 11 to the S-GW 22. The GTP-u packet includes user data, TCP header, IP header, GTP-u header, UDP_G header, IP_G header, L2 (layer 2) header and L1 (layer 1) header. In the GTP-u packet, an IP packet which includes the user data, the TCP header and the IP header is encapsulated with the GTP-u header, the UDP_G header and the IP_G header, and then the L2 header and the L1 header are granted to the encapsulated packet.

In the example depicted in FIG. 8, an IP address of the Web server is set as Destination Address (DA) of an IP packet in the GTP-u packet. Also, an IP address of the mobile station 60 is set as Source Address (SA). On the other hand, in the IP_G header, an IP address of the S-GW 22 is set as Destination IP Address, and an IP address of the base station 11 is set as Source IP Address. A TEID value indicates the S-GW 22 located at the terminating point of the GTP tunnel.

FIG. 9 illustrates an example of the data format of a GTP-u packet on a downlink (a downlink GTP-u packet) transmitted from the S-GW 22 to the base station 11. In the example of FIG. 9, in both the IP header and the IP_G header, Source IP Address and Destination IP Address are reversed from those in the GTP-u packet depicted in FIG. 8. A TEID value indicates a tunnel terminating point in the base station 11.

FIGS. 10A and 10B illustrate each exemplary format of an offload traffic packet (which may hereafter be referred to as "offload packet") exchanged between the offload GW 70 and the Web server 41, 42 through the offload network 50, when the virtual UE is located on a home link (or connected at customer premises). The virtual UE being located on the home link (or connected at customer premises) signifies a case when the mobile station 60 is located in a customer premises network, and a state that home address information is present in the offload GW 70 (#A) without duplication to others. The examples depicted in FIGS. 10A and 10B are exemplary offload packets transmitted and received at the offload GW 70 before handover.

In these figures, FIG. 10A illustrates an example of an offload packet which is transmitted from the offload GW 70 through the offload network 50 to the Web server 41, 42. Also, FIG. 10B illustrates an example of an offload packet format which is transmitted from the Web server 41, 42 through the offload network 50 and received at the offload GW 70.

As depicted in FIG. 10A, in the offload packet transmitted from the offload GW 70, the home address is specified as Source IP Address in the IP header. The offload GW 70 extracts an IP packet from the GTP-u packet depicted in FIG. 8, and after rewriting Source IP Address in the IP header from the IP address to the home address of the mobile station 60, the offload GW 70 transmits the IP packet.

Also, as depicted in FIG. 10B, in the offload packet received in the offload GW 70, the home address is specified as Destination IP Address in the IP header. The offload GW 70 rewrites Destination IP Address of the offload packet as depicted in FIG. 10B, from the home address to the IP address of the mobile station 60. Then, by adding a GTP-u header etc. to the offload packet, the offload GW 70 composes and transmits a GTP-u packet (FIG. 9).

FIGS. 11A and 11B illustrate each exemplary offload packet exchanged between the offload GW 70 and the Web server 41, 42 through the offload network 50 when the virtual UE is located on a foreign link (or connected externally). The virtual UE being located on the foreign link signifies a case when the mobile station 60 is located in an external network, for example, and a state that the information of the home address is present in the target offload GW 70 (#C), not in the source offload GW 70 (#A). FIGS. 11A and 11B illustrate examples of offload packets transmitted and received at the target offload GW 70 (#C).

In these figures, FIG. 11A illustrates an example of an offload packet format which is transmitted from the target offload GW 70 (#C) through the offload network 52 to the Web server 41, 42. FIG. 11B illustrates an exemplary offload packet format which is transmitted from the Web server 41, 42 through the offload network 52 and received in the target offload GW 70 (#C).

As compared to the GTP-u packet (FIG. 8), in the IP header of the offload packet transmitted from the target offload GW 70 (#C), the care of address is specified as Source IP Address, and also, the home address is added as Home Address option, as depicted in FIG. 11A.

Also, as compared to the GTP-u packet (FIG. 9), in the IP header of the offload packet received by the target offload GW 70 (#C), the care of address is specified as Destination IP Address, and also the home address is added, as depicted in FIG. 11B.

The target offload GW 70 (#C) extracts an IP packet from the GTP-u packet transmitted from the base station 11, rewrites Source IP Address with the care of address, and further, transmits to the offload network 52 the IP packet which includes the added home address.

Also, when the target offload GW 70 (#C) receives an offload packet from the offload network 52, the target offload GW 70 (#C) rewrites Destination IP Address from the care of address to the IP address of the mobile station 60, and generates an IP packet after deleting the added home address etc. Then, by adding a GTP-u header etc. to the generated IP packet, the target offload GW 70 (#C) generates a GTP-u packet, so as to make it join a GTP-u packet from the S-GW 22.

FIGS. 12A and 12B are diagrams illustrating each exemplary format of a Binding Update message. The Binding Update message enables the home agent 178 and a website to register that the virtual UE is present on a new link, when the virtual UE moves between the offload GWs 70 (or the home address is moved) as the mobile station 60 moves.

In these figures, FIG. 12A illustrates an example of a Binding Update message format which is transmitted from the target offload GW 70 (#C) to the home agent 178. Also, FIG. 12B illustrates an example of a Binding Update message format which is transmitted from the target offload GW 70 (#C) to the Web server 41, 42.

As depicted in FIGS. 12A and 12B, each Binding Update message includes a pair of the home address and the care of address. In both figures, the care of address is specified as Source IP Address in the IP header. In the Binding Update message to be transmitted to the home agent 178, the home address is specified as Destination IP Address in the IP header. Also, in the Binding Update message transmitted to the Web server 41, 42, the IP address of the Web server 41, 42 is included in the IP header, as Destination IP Address. The above processing is performed, for example, in the home agent 178, the virtual terminal processing unit 175, etc.

FIGS. 13A and 13B illustrate each exemplary format of an offload packet when the home agent 178 relays an offload packet between the Web server 41, 42 and the virtual UE (home address). Both figures represent examples when the virtual UE is located on the foreign link. In these figures, FIG. 13A illustrates an example of an offload packet format which is transmitted from the home agent 178 to the virtual UE, while FIG. 13B illustrates an example of an offload packet format which is transmitted from the virtual UE to the home agent 178.

In the IP header of the offload packet depicted in FIG. 13A, the IP address of the Web server 41, 42 is specified as Source IP Address, and the home address is specified as Destination IP Address. In the IP header of the offload packet depicted in FIG. 13B, the home address is specified as Source IP Address, and the IP address of the Web server 41, 42 is specified as Destination IP Address. The above offload packets are relayed through an IP-in-IP tunnel which is set between the home agent 178 and the virtual UE. For example, the virtual terminal processing unit 175 and the home agent 178 perform the IP-in-IP tunnel setting and processing such as the generation of the offload packets depicted in FIGS. 13A and 13B, and so on.

<Bearer State Management Data>

Next, the bearer state management data 176 (FIG. 4) will be described. FIGS. 14A to 14C are diagrams for explaining the bearer state management data 176. In the present second embodiment, the bearer state management data 176 is managed using a bearer use subscriber identification table 176A and a bearer table 176C.

The bearer use subscriber identification table 176A (bearer use subscriber identification tables 176a, 176b) is a consecutive table. In the bearer use subscriber identification table 176b, each "in-oGW UE Identifier" includes the same value as each "in-oGW UE Identifier" in the bearer use subscriber identification table 176a, which is described to specify that each row including the same value of "in-oGW UE Identifier" constitutes the same record.

Here, "in-oGW UE Identifier" stores, for example, information to uniquely identify the mobile station 60 at the offload GW 70; "MME Apparatus Identifier" stores, for example, an identifier of the MME 23 which grants an in-MME UE identifier to the mobile station 60; "in-eNB UE Identifier (S1AP)" stores, for example, an identifier (eNB UE S1AP ID) of the mobile station 60 granted by the base station 11; "in-eNB UE Identifier (X2AP)" stores, for example, an identifier (eNB UE X2AP ID) of the mobile station 60 granted by the base station 11; and "eNB Apparatus Identifier" stores, for example, an identifier of the base station 11 which grants the "in-eNB UE Identifier (S1AP)" and the "in-eNB UE Identifier (X2AP)" to the mobile station 60.

Further, "T-Target Cell Identification information" stores, for example, handover-target cell identification information which is selected by a handover-source base station 11 and received by a handover-target offload GW 70; "in-T-Target-Cell UE Identification information" stores, for example, identification information of the mobile station 60 in a handover-target cell, which is selected by a handover-target base station 11 and received by the handover-target offload GW 70; and "Target ID" stores, for example, identification information of the mobile station 60 in the handover-target cell, which is selected by the handover-source base station 11 and received by a handover-source offload GW 70.

Further, "S-Target Cell Identification information" stores, for example, handover-target cell identification information which is selected by the handover-source base station and received by the handover-source offload GW 70; and "in-S-Target-Cell UE Identification information" stores, for example, UE identification information in the handover-target cell which is selected by the handover-target base station 11 and received by the handover-source offload GW 70.

<Bearer Table>

In the bearer table 176B depicted in FIG. 14C, "in-oGW UE Identifier" stores information to uniquely identify the mobile station 60 at the offload GW 70. With regard to the same mobile station 60, each "in-oGW UE Identifier" in the bearer table 176B and the bearer use subscriber identification table 176A stores the same identifier. "User Channel Identifier" stores information to uniquely identify a user channel in the mobile station 60, which is synchronous with a channel identifier (E RAB ID) in the mobile station 60.

"Uplink Channel Allocation information" stores, for example, destination information of an uplink packet related to the user channel identifier, to be forwarded to the S-GW 22. "Downlink Channel Allocation information" stores, for example, destination information of a downlink packet related to the user channel identifier, to be forwarded to the base station 11.

"Offload Communication Address" stores, for example, an address for the transmission and reception of a packet passing through the offload network 50, on the basis of each virtual UE. The above address is also usable for transmission and reception on a link accommodated in the offload GW 70, for example. In the example depicted in FIG. 14C, the home address or the care of address is stored together with the identifier of the corresponding mobile station 60.

<Correspondence Management Data>

Next, an exemplary format of the correspondence management data 179 (FIG. 4) will be described. FIG. 15 is a diagram for explaining the correspondence management data (in FIG. 15, a home agent state management data is described) 179. The correspondence management data 179 is managed using a home agent state management table 179A.

"Home Address" stores, for example, an offload communication address granted to the virtual UE at a corresponding offload GW 70 when the mobile station 60 sets a use channel (bearer). The home address is, for example, an address of the virtual UE on the home link.

"Care of Address" stores, for example, an offload communication address (care of address) at the movement destination of the virtual UE as the mobile station 60 moves. The care of address is, for example, an address of the virtual UE on the foreign link.

Incidentally, the registration of correspondence between the home address and the care of address is reported to the home agent, using the Binding Update message from the virtual UE.

<Message>

Next, exemplary data formats of major messages exchanged between each node will be described. FIGS. 16 to 27 illustrate exemplary data formats of the messages.

FIG. 16 illustrates an exemplary data format of an Initial Context Setup Request message transmitted from the MME 23 to the base station 11 when the mobile station 60 is initiated. Also, FIG. 17 illustrates an exemplary data format of an Initial Context Setup Response message which is a response message to the Initial Context Setup Request message. The Initial Context Setup Response message is transmitted from the base station 11 to the MME 23.

FIG. 18 illustrates an exemplary data format of a Handover Required message transmitted from the mobile station 60 to a source MME 23, when an S1-based handover is performed at the mobile station 60. Also, FIG. 19 illustrates an exemplary data format of a Handover Request message transmitted from the target MME 23 to the target base station 11, at the S1-based handover.

Further, FIG. 20 illustrates an exemplary data format of a Handover Request Ack. message transmitted from the target base station 11 to the target MME 23 in response to the Handover Request message. Also, FIG. 21 illustrates an exemplary format of a Handover Command message transmitted from the source MME 23 to the source base station (or serving base station) 11; and FIG. 22 illustrates an exemplary format of a UE Context Release Command message transmitted from the source MME 23 to the source base station 11.

FIG. 23 illustrates an exemplary data format of an X2AP: Handover Request message transferred from the source base station 11 via a target offload GW 70 (#C) to the target base station 11, at an X2-based handover; and FIG. 24 illustrates an exemplary data format of an X2AP: Handover Request Ack. message which is a response message to the X2AP: Handover Request message. The X2AP: Handover Request Ack. message is transmitted from the target base station 11 through the target offload GW 70 (#C) to the source base station 11. Further, FIG. 25 illustrates an exemplary format of an X2AP: UE Context Release message.

FIG. 26 illustrates an exemplary format of a Path Switch Request message transmitted from the target base station 11 to the MME 23 at an X2-based handover. Also, FIG. 27 illustrates an exemplary format of a Path Switch Request Ack. message transmitted from the MME 23 to the target base station 11, as a response to the Path Switch Request message.

<Processing Flow>

Next, a description will be given on a processing flow in the offload GW 70. FIG. 28A to FIG. 40 illustrate an exemplary processing flow in the offload GW 70. Hereafter the description is given in order of the drawing number. Incidentally, the following processing is executed by the CPU 73 (FIG. 3), for example.

Figure 28B:
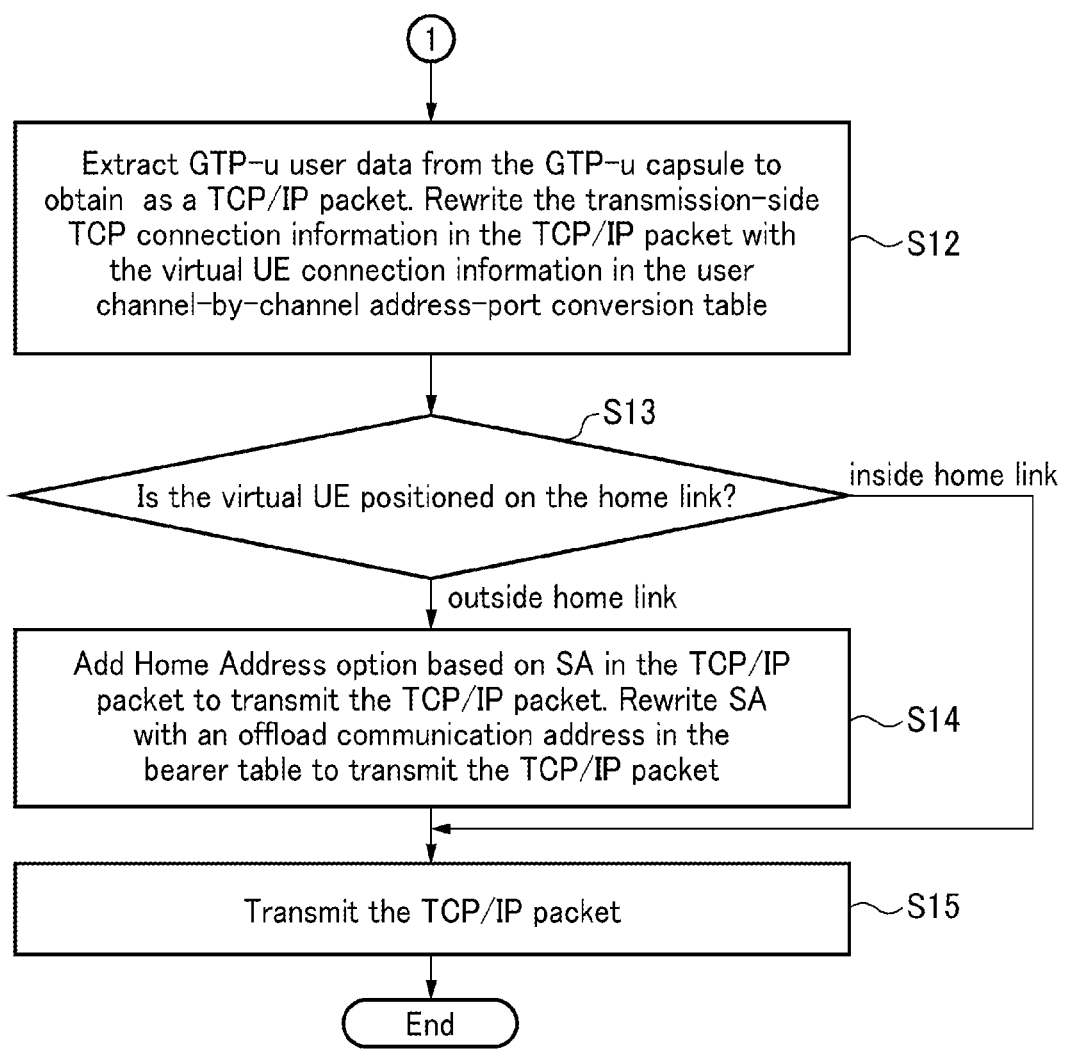

FIGS. 28A, 28B illustrate an exemplary processing flow when the offload GW 70 at a distribution point receives an uplink GTP-u packet (FIG. 8) forwarded from the base station 11 to the S-GW 22. The above uplink GTP-u packet becomes an offload packet to be transmitted to the offload network 50.

On starting processing, the CPU 73 extracts a record in the bearer table 176B in which uplink channel allocation information stored in the bearer table 176B (FIG. 14C) matches TEID in a received packet, and identifies an in-oGW UE identifier and a user channel identifier (S1).

Next, the CPU 73 decides whether there is any record (S2). If there is no record ("No" in S2), the CPU 73 relays the received packet (uplink GTP-u packet) to the S-GW 22 (S16), and completes processing depicted in FIGS. 28A and 28B.

On the other hand, if there is a record ("Yes" in S2), the CPU 73 extracts from the user channel-by-channel address-port conversion table 177A3 (FIG. 7C) a record which corresponds to the in-oGW UE identifier and the user channel identifier and whose TCP connection information matches TCP connection information (Source IP Address (SA) and Source Port Number (src port)) in the received packet (S3).

Next, the CPU 73 decides whether or not there is a record (S4). If there is a record ("Yes" in S4), the processing proceeds to S5, whereas if there is no record ("No" in S4), the processing proceeds to S9.

In S5, the CPU 73 decides whether or not a GTP-u user data is a TCP disconnection request (flag=fin). The CPU 73 performs the above decision based on whether or not "fin" is included as the "flag" of the TCP header in the received packet, for example. If it is decided to be a disconnection request ("disconnection request" in S5), the processing proceeds to S6, whereas if it is decided not to be a disconnection request ("other than disconnection request" in S5), the processing proceeds to S12.

In S6, the CPU 73 decides whether or not a session state in the extracted record indicates "wait for UL disconnection confirmation" (S6). If the session state indicates waiting for UL disconnection confirmation ("wait for UL disconnection confirmation" in S6), the processing proceeds to S7, whereas if the session state indicates other than waiting for UL disconnection confirmation ("other than wait for UL disconnection confirmation" in S6), the processing proceeds to S8.

In S7, the CPU 73 deletes the record (S3) extracted from the user channel-by-channel address-port conversion table 177A3. Then, the processing proceeds to S12.

Meanwhile, in S8, the CPU 73 sets "wait for DL disconnection confirmation" into the session state in the record extracted from the user channel-by-channel address-port conversion table 177A3 (S8).

Also, in S9, the CPU 73 decides whether or not the GTP-u user data is a TCP connection request (flag=syn). The CPU 73 performs the above decision on the basis of whether or not "syn" is included as the "flag" of the TCP header in the received packet, for example. If the GTP-u user data is a TCP connection request ("connection request" in S9), the processing proceeds to S10, whereas if the GTP-u user data is other than a TCP connection request ("other than connection request" in S10), the processing proceeds to S16.

In S10, the CPU 73 captures a use port corresponding to a user channel, to obtain as virtual UE port information.

Next, the CPU 73 adds the TCP connection information (SA, scr port) in the received packet and the virtual UE port information to a record corresponding to the in-oGW UE identifier and the user channel identifier in the user channel-by-channel address-port conversion table 177A3 (FIG. 7C), as real UE connection information and virtual UE connection information, respectively (S11). By this, in the user channel-by-channel address-port conversion table 177A3, the real UE connection information and the virtual UE connection information are added to a record corresponding to the in-oGW UE identifier and the user channel identifier, for example.

Figure 29:
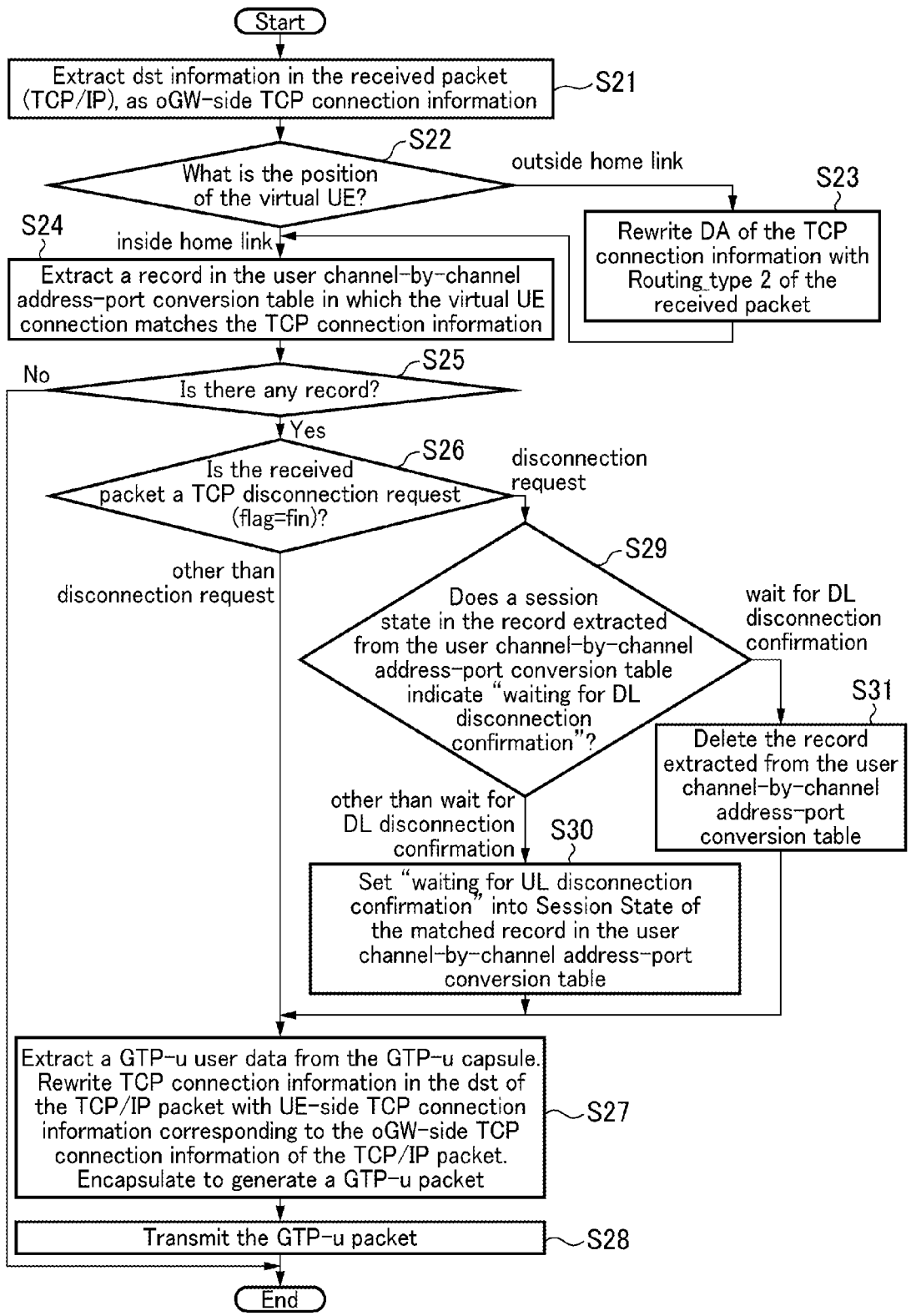
FIG. 29 is a diagram illustrating an example of a processing flow when the offload GW receives a packet forwarded to an offload anchor.

Next, the CPU 73 extracts a GTP-u user data from the GTP-u capsule of the received packet, to obtain as a TCP/IP packet, and rewrites the transmission-side TCP information in the TCP/IP packet with the virtual connection information in the user channel-by-channel address-port conversion table 177A3 (S12 in FIG. 29). By this, for example, the CPU 73 can change the TCP header and the IP header of the received packet on the basis of the user channel-by-channel address-port conversion table 177A3. For example, the CPU 73 rewrites "Transmission Source Port Number" in the TCP header of the received packet (FIG. 8) from a port number corresponding to the real UE to a port number corresponding to the virtual UE (FIG. 10A). Also, for example, the CPU 73 rewrites Source IP Address in the IP header of the received packet from an IP address corresponding to the real UE (or the IP address of the mobile station 60) to a home address corresponding to the virtual UE (FIG. 10A).

Next, the CPU 73 decides whether or not the position of the virtual UE is on the home link (S13). For example, the CPU 73 performs the above decision depending on whether or not the home address information in the user channel-by-channel home address registration table 177A1 (FIG. 7A) matches an offload communication address in the bearer table 176B (FIG. 14C) corresponding to the in-oGW UE identifier and the user channel identifier of the home address. If the above two addresses match each other, the CPU 73 can decide that the virtual UE is on the home link, whereas if the two addresses do not match, the CPU 73 can decide the virtual UE is not on the home link.

When the virtual UE is on the home link ("inside home link" in S13), the CPU 73 transmits the TCP/IP packet, in which Source IP Address and Transmission Source Port Number is changed, to the offload network 50 intact, without processing S14 (S15).

On the other hand, when the virtual UE is not on the home link ("outside home link" in S13), the CPU 73 proceeds to S14. In S14, based on SA in the TCP/IP packet, the CPU 73 adds Home Address option, and rewrites SA with the offload communication address in the bearer table 176B. A case when the virtual UE is not on the home link is that information including the home address is transmitted from the source offload GW 70 (#A) to the target offload GW 70 (#C). In such a case, the target offload GW 70 (#C) rewrites Source IP Address of a packet to be transmitted to the offload network 50 from the home address to the care of address, and further adds Home Address option to include the home address. The CPU 73 (in the target offload GW 70 (#C)) performs such rewrite and addition, for example.

Next, the CPU 73 transmits the TCP/IP packet (FIG. 11A), which stores the care of address as Source IP Address, with the added home address in Home Address option, to the offload network 50 (S15).

The CPU 73 then completes a sequence of processing.

FIG. 29 illustrates an example of a processing flow when the offload GW 70 at an offload anchor point receives from the offload network 50 a packet forwarded to the offload anchor point.

On starting processing, the CPU 73 extracts destination information (dst information) in the received packet (TCP/IP), as TCP connection information on the offload GW 70 side (S21).

Next, the CPU 73 decides whether or not the position of the virtual UE is on the home link (S22). For example, similar to S13 depicted in FIG. 28B, the CPU 73 performs the above decision based on whether or not the home address in the user channel-by-channel home address registration table 177A1 matches the offload communication address in the bearer table 176B. If the position of the virtual UE is on the home link ("inside home link" in S22), the processing proceeds to S24, whereas if the position of the virtual UE is outside the home link ("outside home link" in S22), the processing proceeds to S 23.

In S23, the CPU 73 rewrites Destination IP Address (DA) of the TCP connection information with Routing type 2 of the received packet. For example, the CPU 73 of the target offload GW 70 (#C) receives a TCP/IP packet (FIG. 11B) from the offload network 52, and rewrites Destination IP Address in the IP header from the care of address to the home address included in an extension header (Routing type 2). Then, the processing proceeds to S24.

In S24, the CPU 73 extracts a record in the user channel-by-channel address-port conversion table 177A3 in which virtual UE connection information matches the TCP connection information. For example, the CPU 73 extracts a record in the user channel-by-channel address-port conversion table 177A3 including UE virtual connection information which matches connection information in the TCP header or the IP header of the received TCP/IP packet.

Next, the CPU 73 decides whether or not there is any record (S25). If there is no record ("No" in S25), the processing depicted in FIG. 29 is completed. On the other hand, if there is a record ("Yes" in S25), the processing proceeds to S26.

In S26, the CPU 73 decides whether or not the received packet is a TCP disconnection request (flag=fin). If the received packet is decided not to be a disconnection request packet ("other than disconnection request" in S26), the processing proceeds to S27, whereas if the received packet is decided to be a disconnection request ("disconnection request" in S26), the processing proceeds to S29.

In S27, the CPU 73 extracts a GTP-u user data from the GTP-u capsule, and rewrites TCP connection information in the destination (dst) of the TCP/IP packet with UE-side TCP connection information corresponding to the offload GW-side TCP connection information of the TCP/IP packet. Further, CPU 73 performs GTP-u encapsulation to generate a GTP-u packet. For example, the CPU 73 generates the GTP-u packet by rewriting the home address included in the IP header of the TCP/IP packet with the IP address of the mobile station 60 (or real UE IP address).

Next, the CPU 73 transmits the generated GTP-u packet to the base station 11 (S28). The CPU 73 then completes processing depicted in FIG. 29.

Meanwhile, in S29, the CPU 73 decides whether or not a session state in the record extracted from the user channel-by-channel address-port conversion table 177A3 is "waiting for DL disconnection confirmation".

If the session state indicates "waiting for DL disconnection confirmation" ("wait for DL disconnection confirmation" in S29), the CPU 73 deletes the record extracted from the user channel-by-channel address-port conversion table 177A3 (S31). The processing then proceeds to S27.

On the other hand, if the session state is other than "waiting for DL disconnection confirmation" ("other than wait for DL disconnection confirmation" in S29), the processing proceeds to S30. In S30, the CPU 73 sets "waiting for UL disconnection confirmation" into the session state of the matched record in the user channel-by-channel address-port conversion table 177A3. Then, the processing proceeds to S27.

Figure 30:
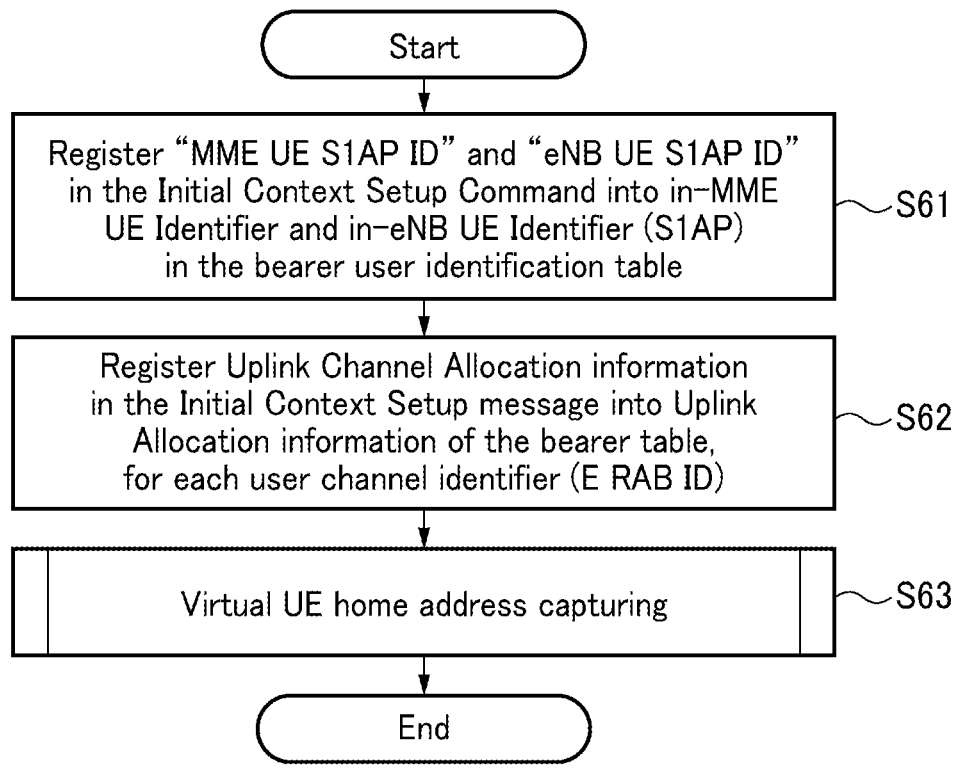
FIG. 30 is a diagram illustrating an example of a processing flow at the interception of an Initial Context Setup Request message.

FIG. 30 illustrates an example of a processing flow to be executed by, for example, the S1AP interception processing unit 171 of the CPU 73, when an Initial Context Setup Request message (MME 23→base station 11: FIG. 16) is intercepted.

On starting processing, the CPU 73 registers "MME UE S1AP ID" and "eNB UE S1AP ID" in the Initial Context Setup message into "in-MME UE Identifier" and "in-eNB UE Identifier (S1AP)" in the bearer use subscriber identification table 176A (FIGS. 14A, 14B), respectively (S61).

Next, the CPU 73 registers Uplink Channel Allocation information in the Initial Context Setup message into Uplink Allocation information of the bearer table 176B (FIG. 14C) on the basis of each user channel identifier (E RAB ID) (S62).

Figure 30A:
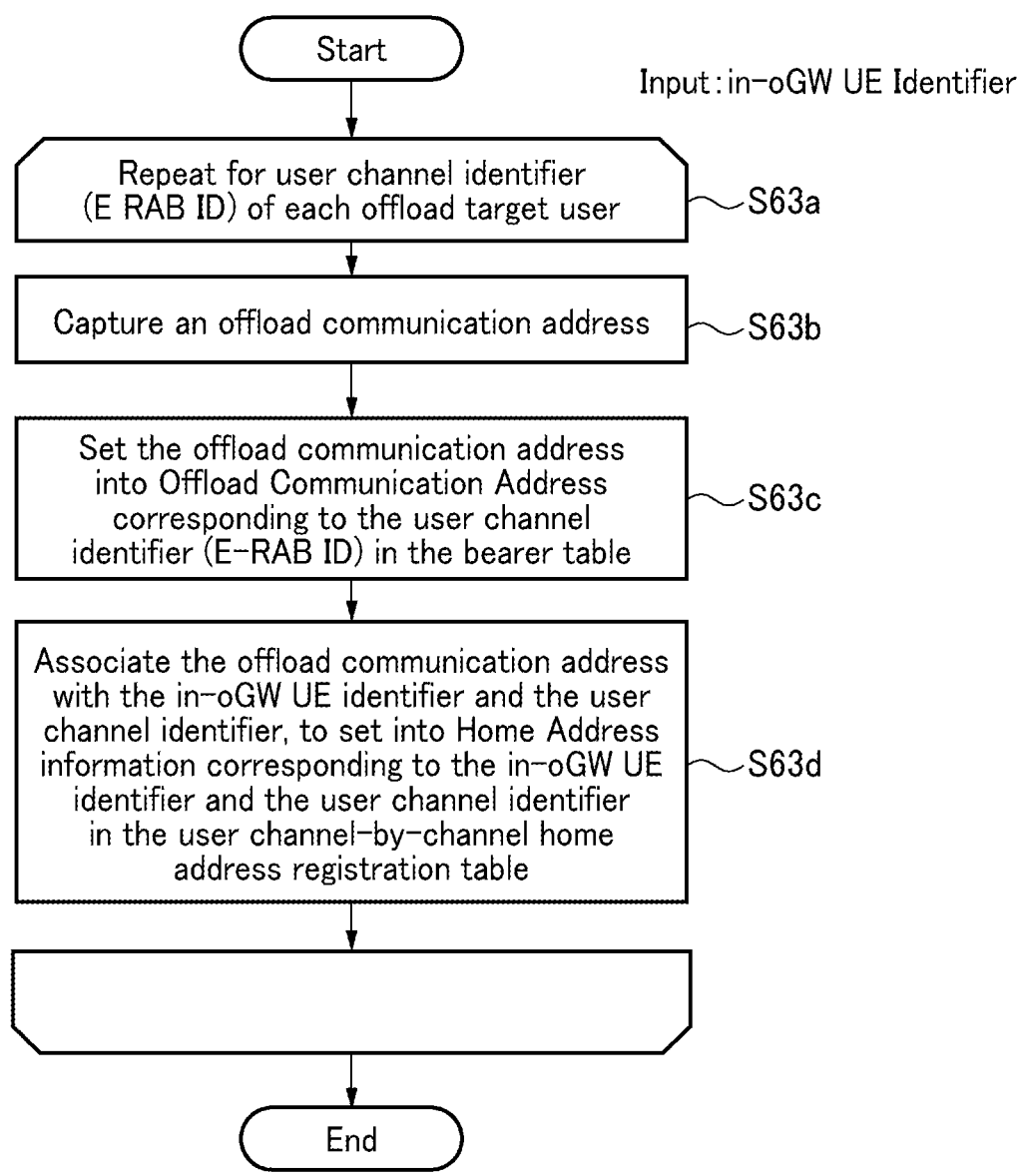
FIG. 30A is a diagram illustrating an example of virtual UE home address capturing (subroutine).

Next, the CPU 73 performs virtual UE home address capturing processing (S63). FIG. 30A illustrates an example of a processing flow of the virtual UE home address capturing processing. The processing depicted in FIG. 30A is executed in the virtual terminal processing unit 175 of the CPU 73, for example.

On starting processing, the CPU 73 repeats the following processing (S63b to S63d) in regard to the user channel identifier (E RAB ID) of each offload target user (S63a).

The CPU 73 captures an offload communication address (S63b). For example, the offload GW 70 issues to a DHCP server a request for a home address, and receives a plurality of home addresses from the DHCP server. Then, from the received home addresses, the offload GW 70 sets a home address in a manner not to be duplicated with a home address assigned to another user channel identifier, on the basis of each user channel identifier. Here, in place of the DHCP server, the home server 76 in the offload GW 70 may generate a home address, for example.

Next, the CPU 73 sets the offload communication address into "Offload Communication Address" corresponding to the user channel identifier (E RAB ID) in the bearer table 176B (FIG. 14C) (S63c). For example, the CPU 73 registers the captured home address into the corresponding "Offload Communication Address" in the bearer table 176B.

Next, the CPU 73 sets the offload communication address into "Home Address information" in the user channel-by-channel home address registration table 177A1, corresponding to the in-oGW UE identifier and the user channel identifier (S63d). The CPU 73 then completes the processing depicted in FIGS. 30A and 30.

Figure 31:
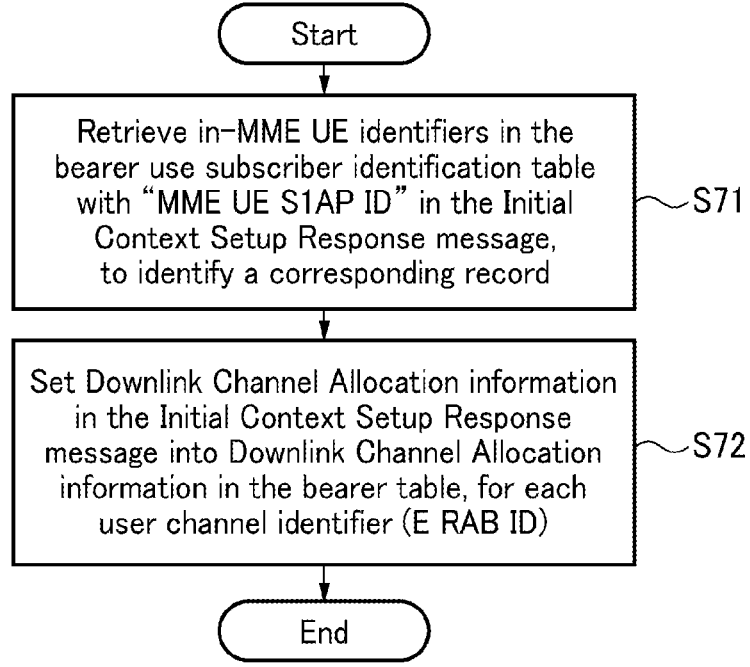
FIG. 31 is a diagram illustrating an example of a processing flow at the interception of an Initial Context Setup Response message.

FIG. 31 illustrates an example of a processing flow to be executed by, for example, the S1AP interception processing unit 171 of the CPU 73, when an Initial Context Setup Response message (base station 11→MME 23: FIG. 17) is intercepted.

On starting processing, the CPU 73 retrieves in-MME UE identifiers in the bearer use subscriber identification table 176A (FIGS. 14A, 14B) with "MME UE S1AP ID" in the Initial Context Setup Response message, to identify a corresponding record (S71).

Next, the CPU 73 sets Downlink Channel Allocation information in the Initial Context Setup Response message into Downlink Channel Allocation information in the bearer table 176B, on the basis of each user channel identifier (E RAB ID) (S72). The CPU 73 then completes the processing depicted in FIG. 31.

Figure 32:
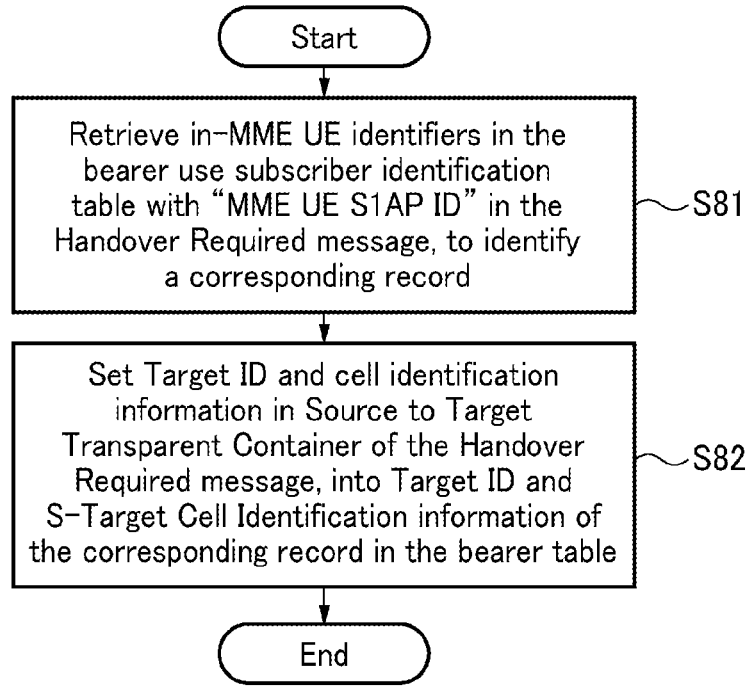
FIG. 32 is a diagram illustrating an example of a processing flow at the interception of a Handover Required message.

FIG. 32 illustrates an example of a processing flow to be executed by the S1AP interception processing unit 171 of the CPU 73 when a Handover Required message (from a source base station 11 to a source MME 23: FIG. 18) is intercepted, at the execution of S1-based handover. The processing depicted in FIG. 32 may be executed by the source offload GW 70 (#A) at the S1-based handover, for example.

On starting processing, the CPU 73 retrieves in-MME UE identifiers in the bearer use subscriber identification table 176A with "MME UE S1AP ID" in the Handover Required message, to identify a corresponding record (S81).

Next, the CPU 73 sets "Target ID" and cell identification information in "Source to Target Transparent Container" of the Handover Required message, into "Target ID" and "S-Target Cell Identification information" of the corresponding record in the bearer table 176B, respectively (S82). The CPU 73 then completes the processing depicted in FIG. 32.

Figure 33:
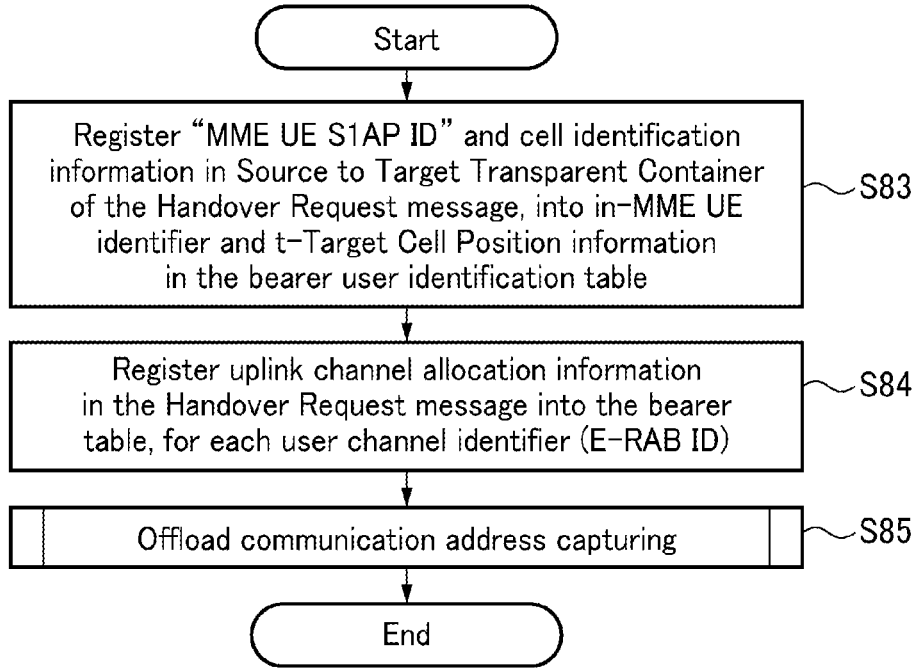
FIG. 33 is a diagram illustrating an example of a processing flow at the interception of a Handover Request message.

FIG. 33 illustrates an example of a processing flow to be executed by the S1AP interception processing unit 171 of the CPU 73 when a Handover Request message (target MME 23→target base station 11: FIG. 19) is intercepted, at the execution of S1-based handover. The processing depicted in FIG. 33 may be executed by the target offload GW 70 (#C) at the S1-based handover, for example.

On starting processing, the CPU 73 registers "MME UE S1AP ID" and cell identification information in "Source to Target Transparent Container" of the Handover Request message, into "in-MME UE Identifier" and "S-Target Cell Identification information" in the bearer use subscriber identification table 176A (S83).

Next, the CPU 73 registers Uplink Channel Allocation information in the Handover Request message into the bearer table 176B on the basis of each user channel identifier (E-RAB ID) (S84).

Next, the CPU 73 performs offload communication address capture processing (S85). FIG. 33 illustrates an example of a processing flow of the offload communication address capture processing, which is executed by the virtual terminal processing unit 175 of the CPU 73, for example.

On starting processing, the CPU 73 repeats the following processing (S85b and S85c) for the user channel identifier (E-RAB ID) of an offload target user (S85a).

Next, the CPU 73 captures an offload communication address (S85b). For example, the CPU 73 transmits to the DHCP server, the home server 76, etc. a request for a care of address, and receives a plurality of care of address candidates. The CPU 73 then selects a care of address in a manner not to duplicate with a care of address for use for another user channel identifier. The offload communication address in the present processing is, for example, the care of address.

Next, the CPU 73 sets the offload communication address into "Offload Communication Address" corresponding to the user channel identifier (E-RAB ID) in the bearer table 176B (S85c). For example, the CPU 73 registers the selected care of address into the corresponding "Offload Communication Address" in the bearer table 176B. The CPU 73 then completes the processing depicted in FIGS. 33A, 33B.

Figure 34:
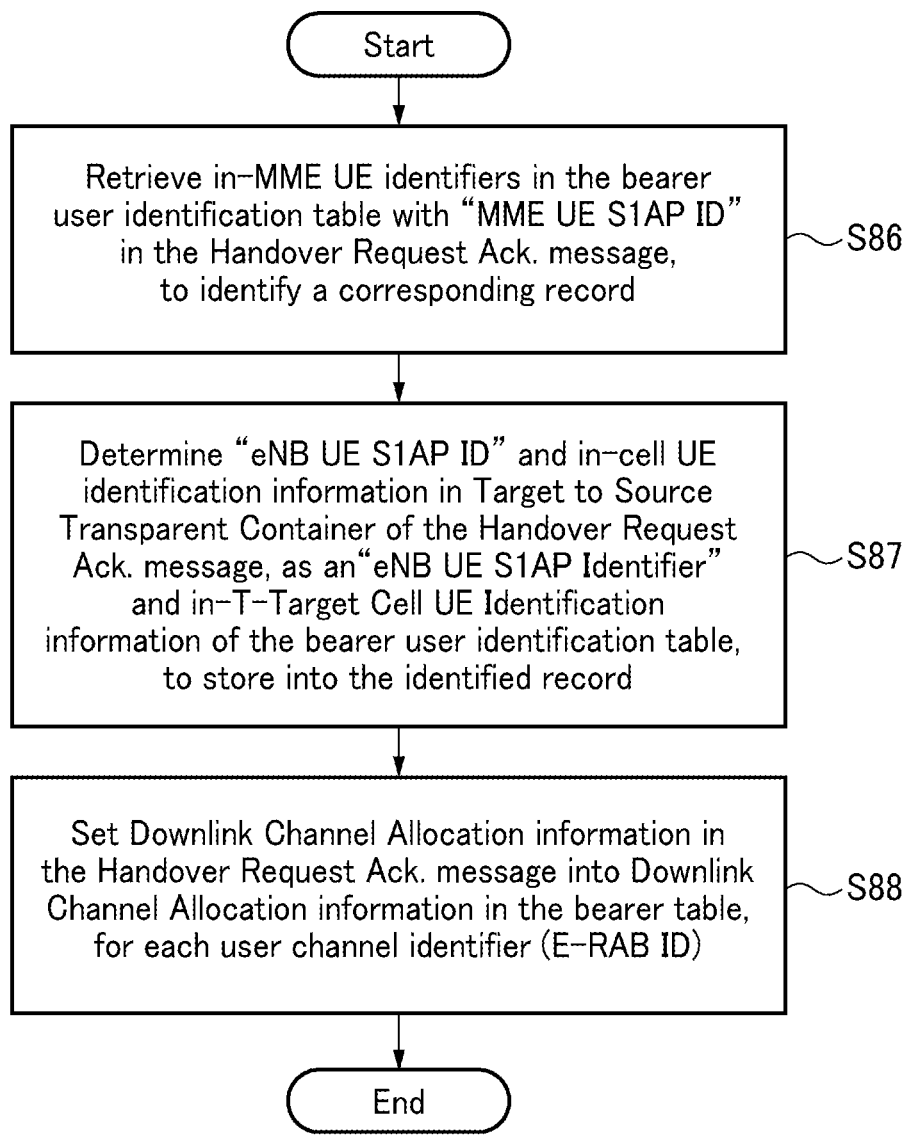
FIG. 34 is a diagram illustrating an example of a processing flow at the interception of a Handover Request Ack. message.

FIG. 34 illustrates an example of a processing flow to be executed by the S1AP interception processing unit 171 of the CPU 73 when a Handover Request Ack. message (target base station 11→target MME 23: FIG. 20) is intercepted at the execution of S1-based handover. The processing depicted in FIG. 34 may be executed by the target offload GW 70 (#C) at the S1-based handover, for example.

On starting processing, the CPU 73 retrieves in-MME UE identifiers in the bearer use subscriber identification table 176A (FIGS. 14A, 14B) with "MME UE S1AP ID" in the Handover Request Ack. message, to identify a corresponding record (S86).

Next, the CPU 73 determines "eNB UE S1AP ID" and in-cell UE identification information in "Target to Source Transparent Container" of the Handover Request Ack. message to be an eNB UE S1AP Identifier and in-T-Target Cell UE Identification information of the bearer use subscriber identification table 176A, to store into the identified record (S87).

Next, the CPU 73 sets "Downlink Channel Allocation information" in the Handover Request Ack. message into "Downlink Channel Allocation information" in the bearer table 176B on the basis of each user channel identifier (E-RAB ID) (S88). The CPU 73 then completes the processing depicted in FIG. 34.

Figure 35:
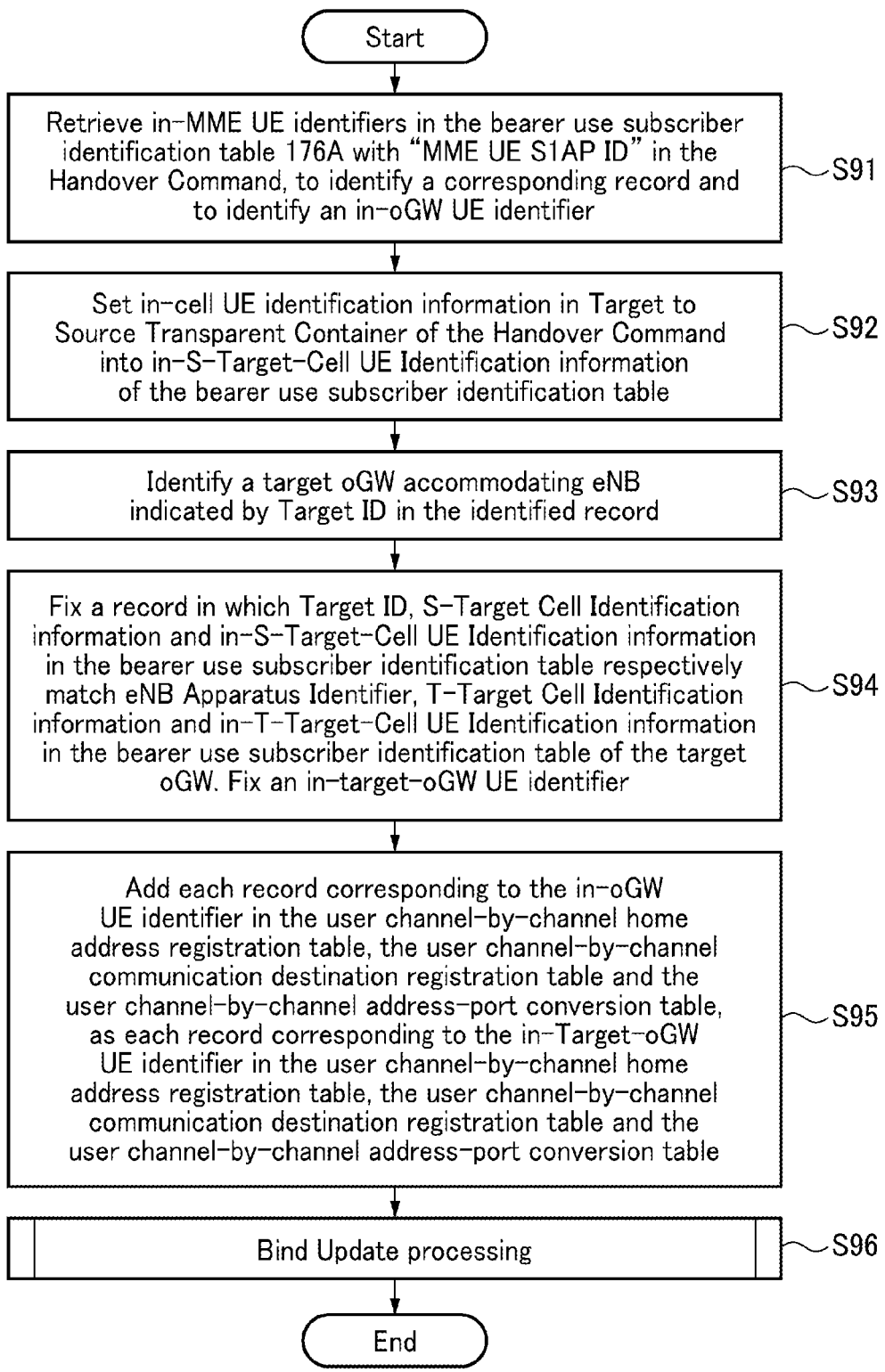
FIG. 35 is a diagram illustrating an example of a processing flow at the interception of a Handover Command message.

FIG. 35 illustrates an example of a processing flow to be executed by the S1AP interception processing unit 171 of the CPU 73 when a Handover Command message (source MME 23→source base station 11: FIG. 21) is intercepted at the execution of S1-based handover. The processing depicted in FIG. 35 may be executed by the source offload GW 70 (#A) at the S1-based handover, for example.

On starting processing, the CPU 73 retrieves in-MME UE identifiers in the bearer use subscriber identification table 176A (FIGS. 14A, 14B) with "MME UE S1AP ID" in the Handover Command message, to identify a corresponding record and to identify an in-oGW UE identifier (S91).

Next, the CPU 73 sets in-cell UE identification information in "Target to Source Transparent Container" of the Handover Command message into "in-S-Target-Cell UE Identification information" of the bearer use subscriber identification table 176A (S92).

Next, the CPU 73 identifies a record in which "Target ID", "S-Target Cell Identification information" and "in-S-Target-Cell UE Identification information" in the bearer use subscriber identification table 176A of the source offload GW 70 (#A) respectively match "eNB Apparatus Identifier", "T-Target Cell Identification information" and "in-T-Target-Cell UE Identification information" in the bearer use subscriber identification table 176A of the target offload GW 70 (#C) (S94).

Next, the CPU 73 adds each record corresponding to the in-oGW UE identifier in the user channel-by-channel home address registration table 177A1 (FIG. 7A), the user channel-by-channel communication destination registration table 177A2 (FIG. 7B) and the user channel-by-channel address-port conversion table 177A3 (FIG. 7C), as each record corresponding to the in-oGW UE identifier in the user channel-by-channel home address registration table 177A1, the user channel-by-channel communication destination registration table 177A2 and the user channel-by-channel address-port conversion table 177A3 of the target offload GW 70 (#C) (S95).

Figure 35A:
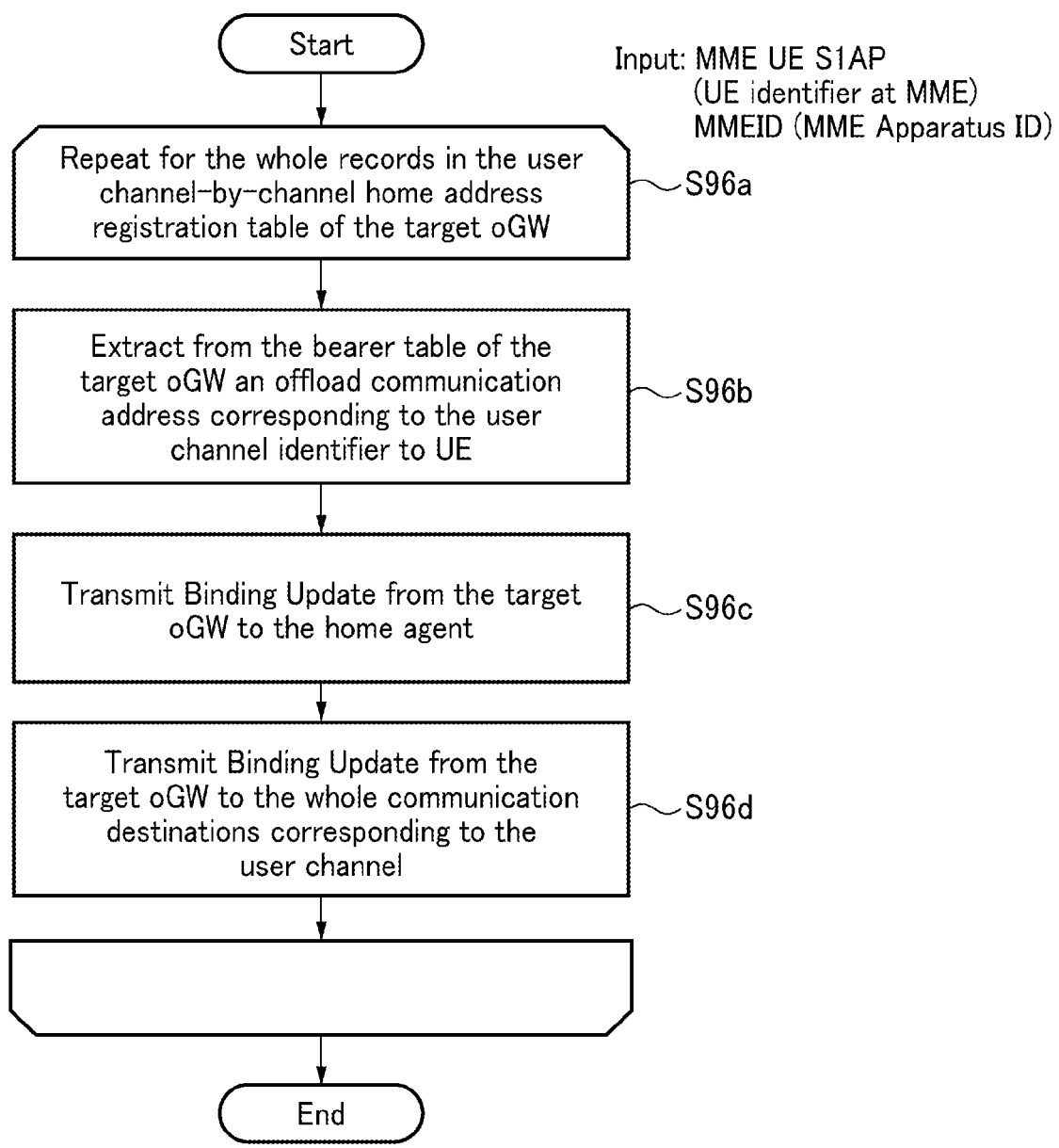
FIG. 35A is a diagram illustrating an example of a Binding Update processing flow (subroutine).

Next, the CPU 73 performs Binding Update processing (S96). FIG. 35A illustrates an example of a processing flow of the Binding Update processing. The processing may be executed in the home agent 178 of the CPU 73, for example.

On starting processing, the CPU 73 repeats the following processing (S96*b* through S96*d*) for the whole records in the user channel-by-channel home address registration table 177A1 (FIG. 7A) of the target offload GW 70 (#C).

Next, from the bearer table 176B (FIG. 14C) of the target offload GW 70 (#C), the CPU 73 extracts an offload communication address (for example, care of address) corresponding to the user channel identifier to the mobile station 60 (S96*b*).

Next, the CPU 73 transmits a Binding Update message (FIG. 12B) from the target offload GW 70 (#C) to the home address of the source offload GW 70 (#A) (S96*c*).

Next, the CPU 73 transmits Binding Update messages (FIG. 12B) from the target offload GW 70 (#C) to the whole communication destinations corresponding to the user channel.

By this, for example, the target offload GW 70 (#C) transmits the home address and the care of address corresponding to the home address, to the source offload GW 70 (#A) and the Web server 41, 42. The CPU 73 then completes the processing depicted in FIGS. 35A and 35.

Figure 36:
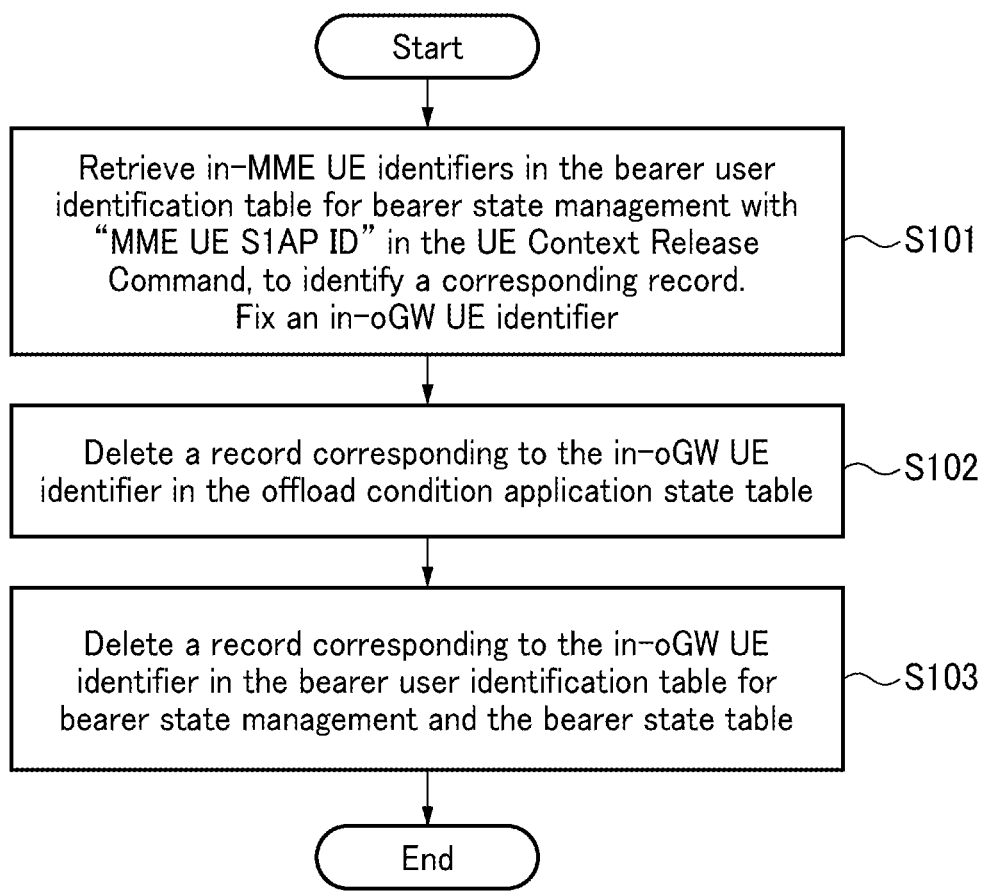
FIG. 36 is a diagram illustrating an example of a processing flow at the interception of a UE Context Release Command message.

FIG. 36 illustrates an example of a processing flow to be executed by the S1AP interception processing unit 171 of the CPU 73 at S1-based handover when a UE Context Release Command message (source MME 23→source base station 11: FIG. 22) is intercepted. The processing depicted in FIG. 36 may be executed by the source offload GW 70 (#A) at the execution of S1-based handover, for example.

On starting processing, the CPU 73 retrieves in-MME UE identifiers in the bearer use subscriber identification table 176A with "MME UE S1AP ID" in the UE Context Release Command message, to identify a corresponding record and an in-oGW UE identifier (S101).

Next, the CPU 73 deletes a record corresponding to the in-oGW UE identifier in the offload condition application state table 177A (FIGS. 7A through 7C) (S102).

Next, the CPU 73 deletes each record corresponding to the in-oGW UE identifier in the bearer use subscriber identification table 176A and the bearer table 176B (FIG. 14C) (S103). The CPU 73 then completes the processing depicted in FIG. 36.

Figure 37:
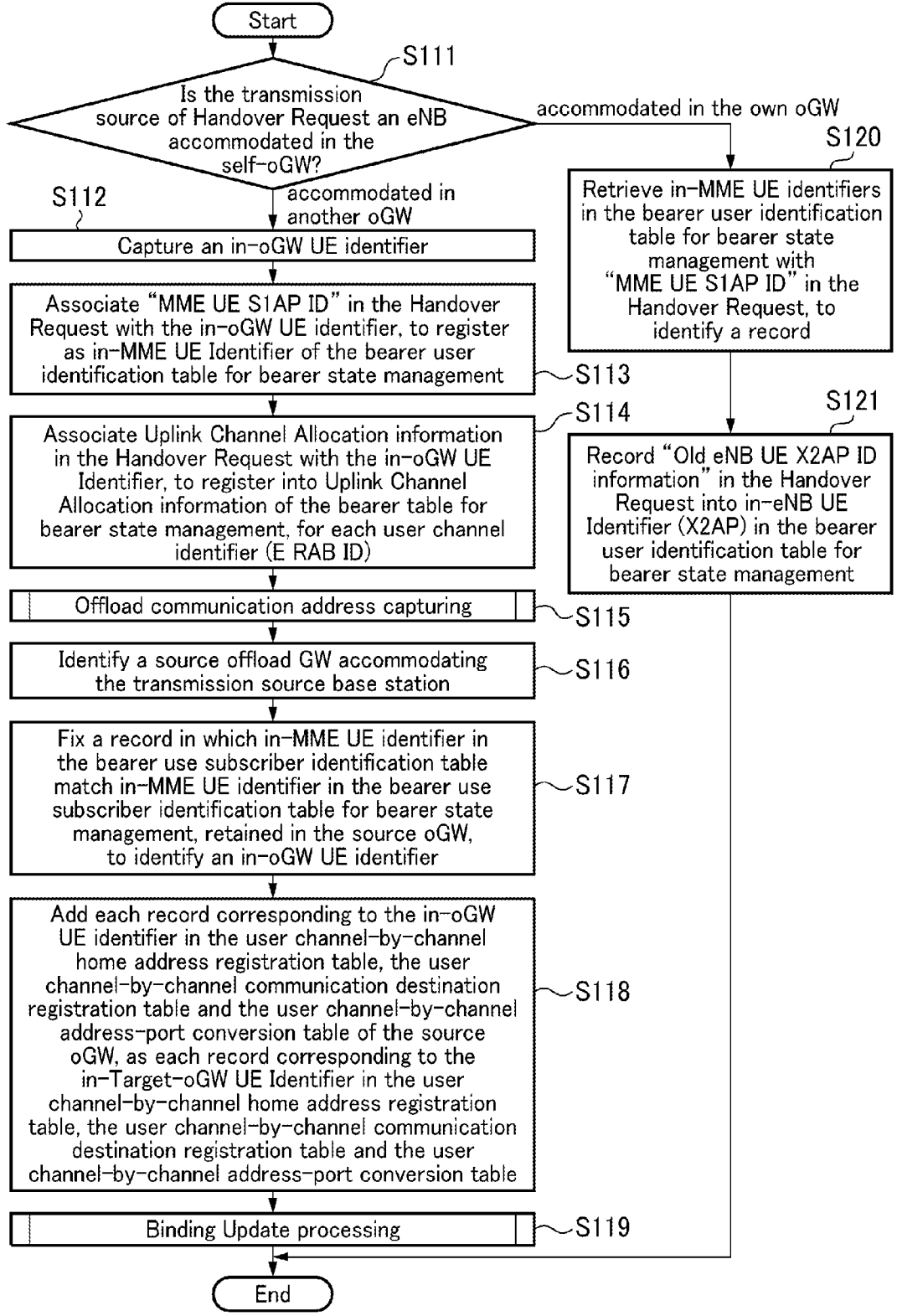
FIG. 37 is a diagram illustrating an example of a processing flow at the interception of an X2AP: Handover Request message.

FIG. 37 illustrates an example of a processing flow to be executed by the X2AP interception processing unit 171 of the CPU 73 at X2-based handover when an X2AP: Handover Request message (source base station 11→target base station 11: FIG. 23) is intercepted. The processing depicted in FIG. 37 may be executed by the source offload GW 70 (#A) and the target offload GW 70 (#C), for example.

On starting processing, the CPU 73 decides whether the transmission source base station 11 of the Handover Request message is the base station 11 which is accommodated in the self-offload GW 70 (S111). If the base station 11 is accommodated in the self-offload GW 70 ("accommodated in the own oGW" in S111), the processing proceeds to S120. On the other hand, if the base station 11 is not accommodated in the self-offload GW 70 ("accommodated in another oGW" in S111), the processing proceeds to S112.

In S112, the CPU 73 captures an in-oGW UE identifier.

Next, the CPU 73 associates "MME UE S1AP ID" in the Handover Request message with the in-oGW UE identifier, to register into "in-MME UE Identifier" of the bearer use subscriber identification table 176A (FIGS. 14A, 14B) (S113).

Next, the CPU 73 associates "Uplink Channel Allocation information" in the Handover Request message with the in-oGW UE identifier, to register into Uplink Channel Allocation information of the bearer table 176B, on the basis of each user channel identifier (E-RAB ID) (S114).

Next, the CPU 73 executes processing (FIG. 30A) to capture an offload communication address (S115). By this, for example, the target offload GW 70 (#C) can generate a care of address. Incidentally, the home address is generated when an offload GW 70 (which is the source offload GW 70 (#A) when an X2-based handover is executed) receives an Initial Context Setup Request message before the execution of the X2-based handover (FIGS. 30, 30A).

Next, the CPU 73 identifies a source offload GW 70 (#A) which accommodates the transmission source base station 11 (S116).

Next, the CPU 73 identifies a record in which an in-MME UE identifier in the bearer use subscriber identification table 176A matches an in-MME UE identifier in the bearer use subscriber identification table 176A of the source offload GW 70 (#A). By this, the CPU 73 identifies an in-oGW UE identifier of the source offload GW 70 (#A) (S117).

Next, the CPU 73 adds each record corresponding to the in-oGW UE identifier in the user channel-by-channel home address registration table 177A1 (FIG. 7A), the user channel-by-channel communication destination registration table 177A2 (FIG. 7B) and the user channel-by-channel address-port conversion table 177A3 (FIG. 7C) of the source offload GW 70 (#A), as each record corresponding to the in-oGW UE identifier in the tables (the user channel-by-channel home address registration table 177A1, the user channel-by-channel communication destination registration table 177A2 and the user channel-by-channel address-port conversion table 177A3) of the target offload GW 70 (#C) (S118).

Next, the CPU 73 performs Binding Update processing (FIG. 35A) (S119). By this, for example, the target offload GW 70 (#C) can transmit the home address and the care of address corresponding to the home address, through the offload network 52 to the Web server 41, 42. Also, the target offload GW 70 (#C) can transmit the home address and the care of address corresponding to the home address to the source offload GW 70 (#A), for example.

Then, the CPU 73 completes the processing depicted in FIG. 37.

Meanwhile, in S120, the CPU 73 retrieves in-MME UE identifiers in the bearer use subscriber identification table 176A with "MME UE S1AP ID" in the Handover Request message, to identify a corresponding record.

Next, the CPU 73 records "Old eNB UE X2AP ID" included in the Handover Request message into "in-eNB UE Identifier (X2AP)" in the bearer use subscriber identification table 176A (S121). The CPU 73 then completes the processing depicted in FIG. 37.

Figure 38:
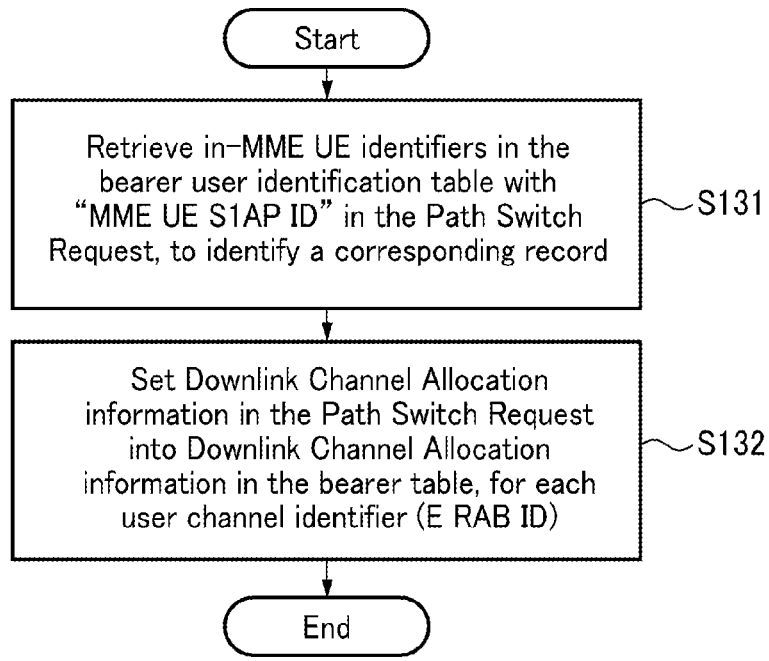
FIG. 38 is a diagram illustrating an example of a processing flow at the interception of a Path Switch Request message.

FIG. 38 illustrates an example of a processing flow to be executed by the X2AP interception processing unit 172 of the CPU 73, when a Path Switch Request message (target base station 11→MME 23: FIG. 26) is intercepted at the execution of X2-based handover. The processing depicted in FIG. 38 may be executed by the target offload GW 70 (#C) at the execution of X2-based handover, for example.

On starting processing, the CPU 73 retrieves in-MME UE identifiers in the bearer use subscriber identification table 176A with "MME UE S1AP ID" in the Path Switch Request message, to identify a corresponding record (S131).

Next, the CPU 73 sets "Downlink Channel Allocation information" in the Path Switch Request message into Downlink Channel Allocation information in the bearer table 176B on the basis of each user channel identifier (E_RAB ID) (S132). The CPU 73 then completes the processing depicted in FIG. 38.

Figure 39:
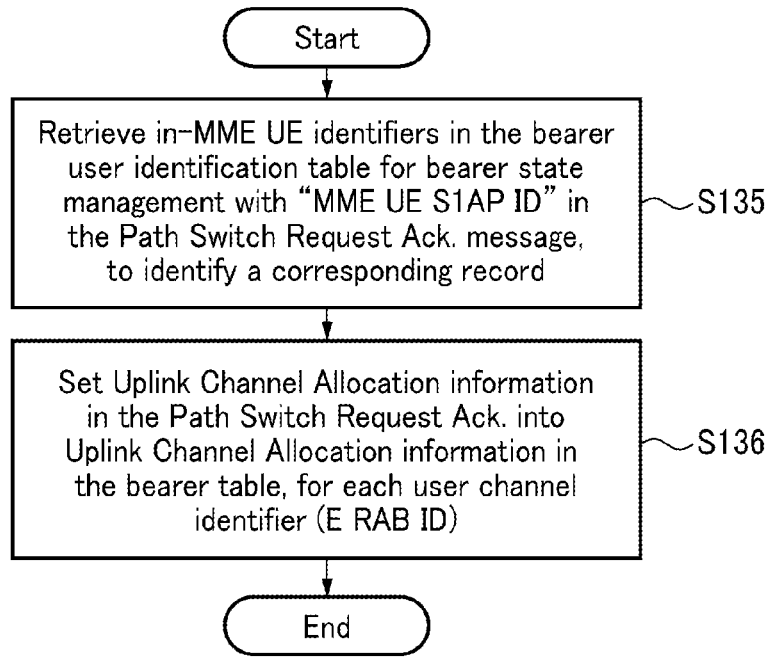
FIG. 39 is a diagram illustrating an example of a processing flow at the interception of a Path Switch Request Ack. message.

FIG. 39 illustrates an example of a processing flow to be executed by the X2AP interception processing unit 172 of the CPU 73, when a Path Switch Request Ack. message (MME 23→target base station 11: FIG. 27) is intercepted at the execution of X2-based handover. The processing depicted in FIG. 39 may be executed by the target offload GW 70 (#C) at the execution of X2-based handover, for example.

On starting processing, the CPU 73 retrieves in-MME UE identifiers in the bearer use subscriber identification table 176A with "MME UE S1AP ID" in the Path Switch Request Ack. message, to identify a corresponding record (S135).

Next, the CPU 73 sets "Uplink Channel Allocation information" in the Path Switch Request Ack. message into Uplink Channel Allocation information of the bearer table 176B on the basis of each user channel identifier (E RAB ID) (S136). The CPU 73 then completes the processing depicted in FIG. 39.

FIG. 40 illustrates an example of a processing flow to be executed by the X2AP interception processing unit 172 of the CPU 73, when an X2AP: UE Context Release message (target base station 11→source base station 11: FIG. 25) is intercepted at the execution of X2-based handover.

On starting processing, the CPU 73 decides whether or not the transmission source base station 11 of the UE Context Release message is a base station accommodated in the self-offload GW 70 (S121). If the transmission source base station 11 is accommodated in the offload GW 70 ("accommodated in the own oGW" in S121), the processing depicted in FIG. 40 is completed. On the other hand, if the transmission source base station 11 is not accommodated in the offload GW 70 ("accommodated in another GW" in S121), the processing proceeds to S122.

In S122, the CPU 73 retrieves in-eNB UE identifiers in the bearer use subscriber identification table 176A with "Old eNB UE X2AP ID" in the UE Context Release message, to identify a corresponding record and to identify an in-oGW UE identifier.

Next, the CPU 73 deletes a record corresponding to the in-oGW UE identifier in the offload condition application state table 177A (S123).

Next, the CPU 73 deletes each record corresponding to the in-oGW UE identifier in the bearer use subscriber identification table 176A and the bearer table 176B (S124). The CPU 73 then completes the processing depicted in FIG. 40.

<oGW Accommodation Table>

FIG. 65 illustrates an exemplary configuration of offload GW information (or eNB accommodation table) accommodating each base station 11, which the offload GW 70 stores in the storage unit 74. The CPU 73 can retrieve an offload GW 70 which accommodates a base station 11 by referring to the eNB accommodation table depicted in FIG. 65. The eNB accommodation table is used, for example, to identify an offload GW 70, which acts as a distribution point among the offload GWs 70, at the handover of the mobile station 60.

OPERATION EXAMPLE

Hereafter, by reference to FIGS. 6A-6C and FIGS. 41-64, operation examples according to the second embodiment will be described.

Operation Example 1

Generating TCP Connection

First, a description will be given on operation from the initiation of the mobile station 60 to the offload of TCP communication to be offloaded. FIG. 6A is a sequence diagram illustrating an operation example.

[Operation 1-1]

In the sequence diagram depicted in FIG. 6A, when the mobile station 60 is initiated, the mobile station 60 performs a connection procedure to the base station 11. Namely, the mobile station 60 transmits a connection request message (Attach Request message) to the base station 11 (<1> in FIG. 6A). The Attach Request message is transmitted through the base station 11 (eNB#1) to the MME 23 (MME#1).

On receiving the Attach Request message, the MME 23 transmits a Create Session Request message to the S-GW 22 (SGW#1) (<2> in FIG. 6A).

Next, the MME 23 receives a Create Session Response message from the S-GW 22 (<3> in FIG. 6A).

[Operation 1-2]

On receiving the Create Session Response message, the MME 23 generates an Initial Context Setup message (FIG. 16), to transmit to the base station 11 (<4> in FIG. 6A).

The offload GW 70 intercepts the Initial Context Setup message transmitted to the base station 11 (<5> in FIG. 6A). Here, the offload GW 70 executes processing as depicted in FIGS. 30 and 30A. Through the processing depicted in FIG. 30, an in-oGW UE identifier (8000), an in-MME UE identifier (MME#1 UE S1AP ID#x), an MME apparatus identifier (MME#1) and an in-eNB UE identifier (eNB UE S1AP ID#x) are registered into the bearer use subscriber identification table 176A and the bearer table 176B (refer to tables 176A and 176B depicted in FIG. 41). Further, an eNB apparatus identifier (eNB#1), user channel identifiers (1, 2), uplink channel allocation information (TEID#SGW-u1, SGW#1, TEID#SGW-u2, SGW#2) and an offload communication address ((non-application of offload), UE#x-Home Addr) are registered into the above tables 176A and 176B.

Further, by the processing depicted in FIG. 30A, the home address is generated as offload communication address.

[Operation 1-3]

By the CPU 73 in the offload GW 70, the storage content of the user channel-by-channel home address registration table 177A1 is set into a state depicted in FIG. 42A. Namely, an in-oGW UE identifier (8000), a user channel identifier (2) and home address information (UE#x-Home-Addr) in the user channel-by-channel home address registration table 177A1 are registered.

[Operation 1-4]

Referring back to FIG. 6A, when receiving the Initial Context Setup Request message, the base station 11 transmits an Initial Context Setup Response message (FIG. 17) (<6> in FIG. 6A).

The offload GW 70 intercepts the Initial Context Setup Request message transmitted to the MME 23 (<7> in FIG. 6A). At this time, the offload GW 70 executes processing as depicted in FIG. 31.

By this, downlink channel allocation information (eNB-TEID#1, eNB#1, eNB-TEID#2, eNB#1) is registered into the bearer table 176B (refer to FIG. 41).

[Operation 1-5]

Referring back to FIG. 6A, next, when the mobile station 60 starts a connection with a website (<8> in FIG. 6A), the base station 11 transmits a GTP-u packet (FIG. 8) to the S-GW 22 (<9> in FIG. 6A). The offload GW 70 receives the above GTP-u packet, and performs processing as depicted in FIGS. 28A, 28B (<10> in FIG. 6A). At this time, the CPU 73 performs processing 51 to S4, S9 to S14 and S15. By this, the offload GW 70 transmits an offload packet (FIG. 10A) through the offload network 50 to the Web server 41, 42 (S15 in FIG. 28B and <11> in FIG. 6A).

[Operation 1-6]

By the processing S15 depicted in FIG. 28B, the offload GW 70 registers an IP address of the communication destination Web server 41, 42, corresponding to the in-oGW UE identifier and the user channel identifier into the user channel-by-channel communication destination registration table 177A2 (refer to FIG. 42B).

[Operation 1-7]

Also, by the processing including S11 depicted in FIG. 28A, the offload GW 70 registers real UE connection information, a session state and virtual UE connection information, each corresponding to the in-oGW UE identifier and the user channel identifier, into the user channel-by-channel address-port conversion table 177A3 (refer to FIG. 42C).

[Operation 1-8]

Referring back to FIG. 6A, when an offload packet (TCP/IP packet) arrives at the Web server 41, 42 through the offload network 50, a downlink offload packet (FIG. 10B) from the Web server 41, 42 arrives at the offload GW 70 through the offload network 50 (<12> in FIG. 6A). On receipt of the offload packet, the offload GW 70 performs processing as depicted in FIG. 29 (S21-S22, S24-S28).

[Operation 1-9]

Figure 44:
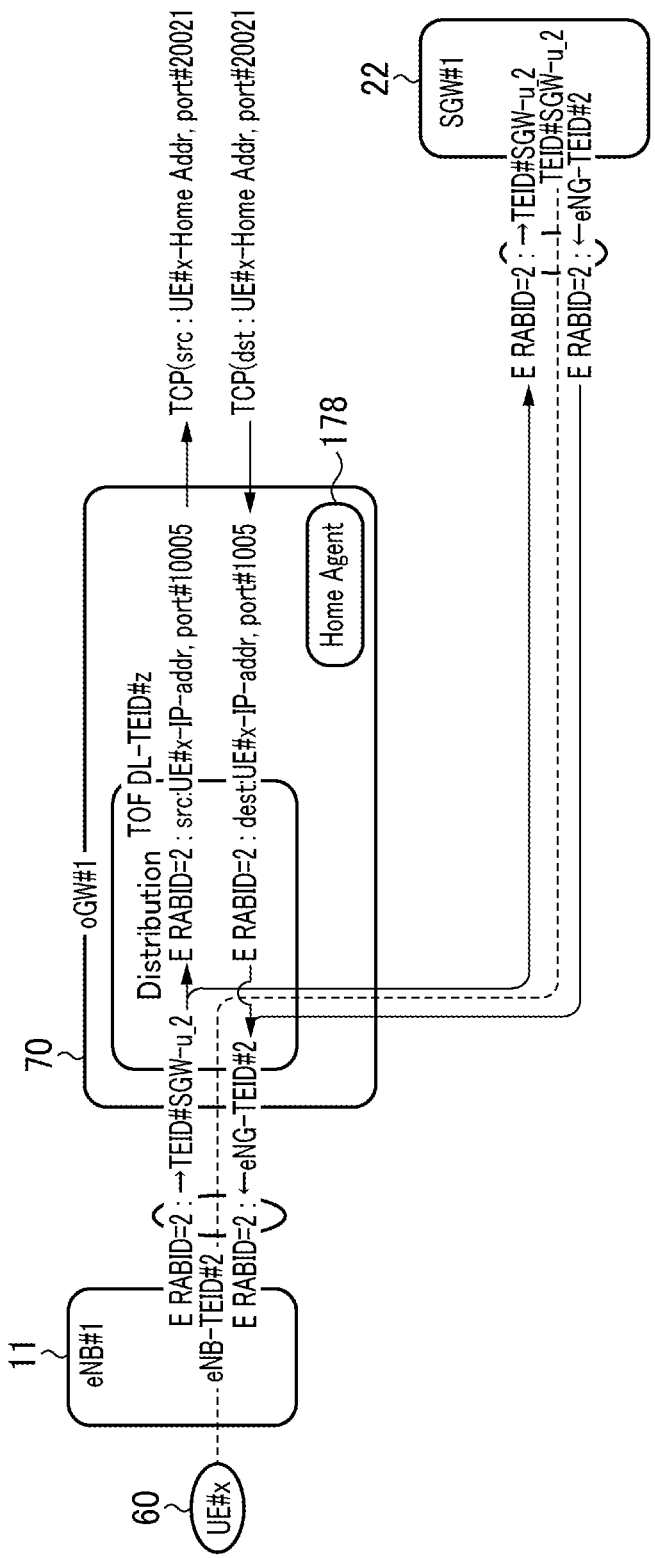
FIG. 44 is a diagram illustrating an example of an offload condition application state (a flow of traffic) after the generation of a TCP connection.

Referring back to FIG. 6A, next, the offload GW 70 transmits a downlink GTP-u packet (FIG. 9) to the base station 11 (<14> in FIG. 6A). By this, for example, a TCP communication through the offload network 50 is established as depicted in FIG. 44.

FIG. 43 illustrates an exemplary configuration of the home agent state management table 179A after the generation of the TCP connection. When no handover is performed on the mobile station 60 after the TCP connection is generated, a care of address is not generated. Therefore, the home server 76 (or the offload GW 70) registers no information into the home agent state management table 179A, to produce a state as depicted in FIG. 43.

[Operation 1-10]

The aforementioned <9> to <14> in FIG. 6A describes an example of a data sequence relative to a connection request. Next, a description will be given on a case when user data other than the connection request is transmitted. First, for example, uplink data destined from the mobile station 60 to the Web server 41, 42 is transmitted in the following manner.

Namely, on receiving the uplink data transmitted from the mobile station 60 (<15> in FIG. 6A), the base station 11 transmits a GTP-u packet (FIG. 8) to the S-GW 22 (<16> in FIG. 6A). On receiving the GTP-u packet, the offload GW 70 performs processing as depicted in FIGS. 28A and 28B, to transmit the offload packet (FIG. 10A) through the offload network 50 to the Web server 41, 42 (<18> in FIG. 6A).

[Operation 1-11]

Next, a description will be given on downlink data destined from the Web server 41, 42 to the mobile station 60. The downlink data is transmitted, for example, in the following manner.

Namely, the offload GW 70 receives an offload packet (FIG. 10B) through the offload network 50. The offload GW 70 then performs processing depicted in FIG. 29, to transmit a GTP-u packet (FIG. 9) to the base station 11 (<21> in FIG. 6A). The base station 11 transmits the downlink data to the mobile station 60 (<22> in FIG. 6A).

Operation Example 2

Maintaining TCP Connection at S1-Based Handover

Next, a description will be given on an operation example in which, accompanying the movement of the mobile station 60, the mobile station 60 is handed over from a handover source base station (which may hereafter be referred to as "source base station") 11 (11A) to a base station (which may hereafter be referred to as "target base station") 11 (11C) while TCP communication of the mobile station 60 is maintained. FIG. 6B is a sequence diagram illustrating the above operation example. Hereafter, the description will be given by reference to FIG. 6B.

[Operation 2-1]

As the mobile station (UE) 60 moves, when the source base station (source eNB) 11 (11A) starts an S1-based handover, the source base station 11 (11A) transmits a Handover Required message (FIG. 18) to a source MME 23 (#1) (<1> in FIG. 6B).

A source offload GW 70 (#A), which is a handover source, intercepts the Handover Required message, to perform processing as depicted in FIG. 32 (S81, S82) (<2> in FIG. 6B).

[Operation 2-2]

FIGS. 45A to 45F are diagrams illustrating an example of handing over an offload condition application state at an S1-based handover. By the processing depicted in FIG. 32, an identifier of a handover target base station 11 (11C) i.e. "Target ID=eNB#2" and handover target cell identification information "S-Target Cell Identification information=Cell ID#X" in the Handover Required message are registered into the bearer table 176B of the source offload GW 70 (#A), and identified.

[Operation 2-3]

Referring back to FIG. 6B, next, the source MME 23 (#1) transmits a Forward Relocation Request message to a handover target MME 23 (#2) (<3> in FIG. 6B).

Next, the target MME 23 (#2) transmits a Handover Request message (FIG. 19) to the target base station 11 (11C) (<4> in FIG. 6B).

Figure 33A:
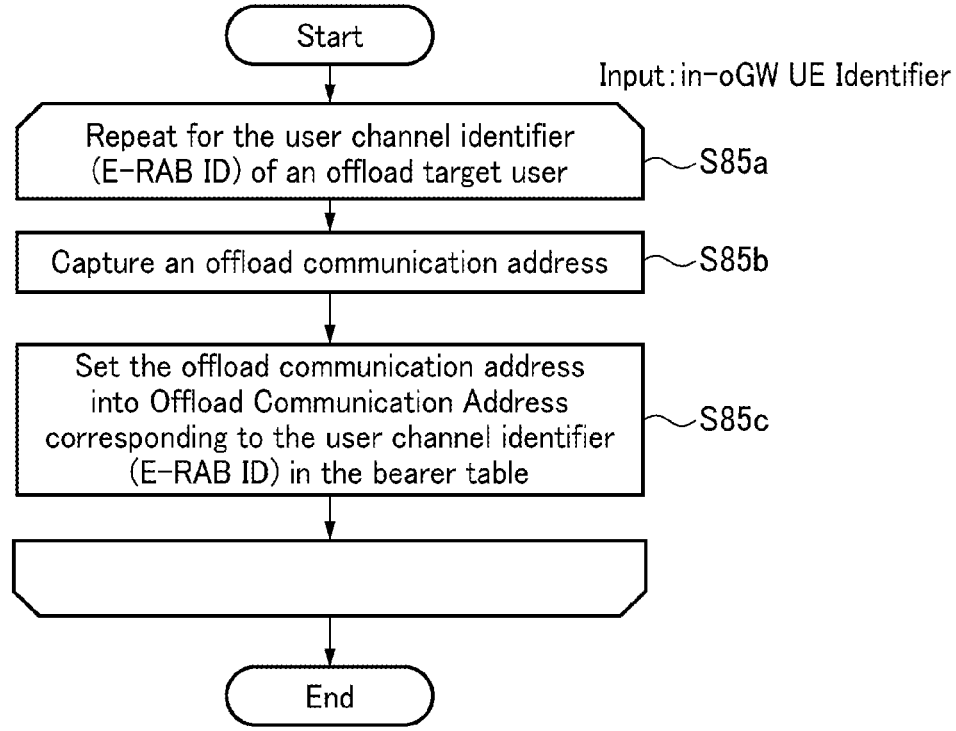
FIG. 33A is a diagram illustrating an example of offload communication address capturing processing (subroutine).

The target offload GW 70 (target oGW) (#C) of the handover target intercepts the Handover Request message, to execute processing as depicted in FIGS. 33, 33A (<5> in FIG. 6B).

[Operation 2-4]

By the interception of the Handover Request message, as depicted in FIGS. 45A to 45F, the target offload GW 70 (#C) registers the in-oGW UE identifier, the MME apparatus identifier, the eNB apparatus identifier, the user channel identifier, the uplink channel allocation information and the offload communication address (care of address) into a bearer use subscriber identification table 176A', to make them fixed.

[Operation 2-5]

Referring back to FIG. 6B, on receipt of the Handover Request message, the target base station 11 (11C) transmits a Handover Request Ack. message (FIG. 20) to the target MME 23 (#2) (<6> in FIG. 6B).

The target offload GW 70 (#C) intercepts the Handover Request Ack. message, to perform processing as depicted in FIG. 34 (<7> in FIG. 6B).

[Operation 2-6]

By the processing depicted in FIG. 34, the target offload GW 70 (#C) registers the downlink channel allocation information into the bearer table 176B' to make fixed, as depicted in FIGS. 45A to 45F.

[Operation 2-7]

Referring back to FIG. 6B, on receiving the Handover Request Ack. message, the target MME 23 (#2) transmits a Forward Relocation Response message to the source MME 23 (#1) (<8> in FIG. 6B).

Next, the source MME 23 (#1) transmits a Handover Command message (FIG. 21) to the source base station 11 (11A) (<9> in FIG. 6B).

The source offload GW 70 (#A) intercepts the Handover Command message, to perform processing as depicted in FIGS. 35, 35A (<10> in FIG. 6B).

[Operation 2-8]

By the execution of the processing depicted in FIGS. 35, 35A, the source offload GW 70 (#A) registers in-S-target cell UE identification information into the bearer use subscriber identification table 176A of the source offload GW 70 (#A), to make it fixed.

By this, the target ID, the S-target cell identification information and the in-S-target cell UE identification information in the bearer use subscriber identification table 176A of the source offload GW 70 (#A) match the eNB apparatus identifier, the T-target cell identification information and the in-T-target cell UE identification information in the bearer use subscriber identification table 176A' of the target offload GW 70 (#C). Thus, the in-oGW UE identifier (8000) of the mobile station 60 retained in the source offload GW 70 (#A) can be associated with an in-oGW UE identifier (8102) retained in the target offload GW 70 (#C) (S94 in FIG. 35).

[Operation 2-9]

Then, by the processing S95 depicted in FIG. 35, the source offload GW 70 (#A) transmits, to the target offload GW 70 (#C), the home address information etc. corresponding to the in-oGW UE identifier (8000) in the source offload GW 70 (#A) (<X> in FIG. 6B). The target offload GW 70 (#C) then duplicates the received home address information etc. into each item corresponding to the in-oGW UE identifier (8102) in each table.

Namely, as depicted in FIGS. 46A and 46B, the user channel identifier and the home address information corresponding to the in-oGW UE identifier (8000), which is registered in the user channel-by-channel home address registration table 177A1 of the source offload GW 70 (#A), are respectively duplicated into User Channel Identifier and Home Address information corresponding to the in-oGW UE identifier (8102) in the user channel-by-channel home address registration table 177A1' of the target offload GW 70 (#C).

Also, the user channel identifier and the communication destination information corresponding to the in-oGW UE identifier (8000), which is registered in the user channel-by-channel communication destination registration table 177A2 of the source offload GW 70 (#A), are respectively duplicated into User Channel Identifier and Communication Destination information corresponding to the in-oGW UE identifier (8102) in the user channel-by-channel home address registration table 177A1' of the target offload GW 70 (#C).

Further, the user channel identifier, the real UE connection information, the session state and the virtual UE connection information corresponding to the in-oGW UE identifier (8000), which is registered in the user channel-by-channel address-port conversion table 177A3 of the source offload GW 70 (#A), are respectively duplicated into User Channel Identifier, Real UE Connection information, Session State and Virtual UE Connection information corresponding to the in-oGW UE identifier (8102) in the user channel-by-channel address-port conversion table 177A3' of the target offload GW 70 (#C).

[Operation 2-10]

The target offload GW 70 (#C) comes to know home address information for each of traffic to be offloaded, and transmits Binding Update messages to the home agent 178 of the source offload GW 70 (#A), which manages the home address, and to the Web server 41, 42 of communication destination (<Y> and <Z> in FIG. 6B).

FIG. 47A illustrates an example of the home agent state management table 179A retained in the source offload GW 70 (#A), and FIG. 47B illustrates an example of the home agent state management table 179A' retained in the target offload GW 70 (#C), respectively.

The home agent 178 of the source offload GW 70 (#A) stores a communication address (care of address) on a link, on which the virtual UE is existent (link on the target offload GW 70 (#C) side), in the home agent state management table 179A, by associating the above communication address with the home address of the virtual UE. By the Binding Update message, the Web server 41, 42 also can know the movement destination of the virtual UE.

[Operation 2-11]

By this, as depicted in FIG. 48, in the S1-based handover accompanying the movement of the mobile station 60, a route is shifted into mobile station 60→target base station 11 (11C)→target offload GW 70 (#C)→offload network 52→Web server 41, 42, while the TCP connection is maintained intact.

Incidentally, as depicted in FIG. 47A, the source offload GW 70 (#A) retains a set of the home address and the care of address in the home agent state management table 179A. By this, the source offload GW 70 (#A) transmits offload traffic (FIG. 10B), destined to the home address, to the target offload GW 70 (#C) through an IP-in-IP tunnel established between the home agent 178 and the virtual UE (FIG. 13A). By processing described later, the Binding Update message is transmitted to the Web server 41, 42. However, the Web server 41, 42 does not know the care of address of the virtual UE before receiving the above message. Therefore, there may be a case that the Web server 41, 42 may transmit downlink data to the home address. The source offload GW 70 (#A) can transmit the downlink data destined to the home address, to the target offload GW 70 (#C) through the IP-in-IP tunnel, using the home agent state management table 179A.

In FIG. 6B, on completion of the processing for the Handover Request message, the target base station 11 (11C) transmits a Handover Notify message, that is, a completion message, to the target MME 23 (#2). By this, the destination base station 11 of the downlink data is changed from the source base station 11 (11A) to the target base station 11 (11C).

[Operation 2-12]

After the Binding Update message is transmitted to the home agent 178 and the Web server 41, 42, uplink data (<11> in FIG. 6B) transmitted from the mobile station 60 is transmitted in the following manner.

Namely, on receipt of data from the mobile station 60, the target base station 11 (11C) transmits a GTP-u packet (FIG. 8) to the target S-GW 22 (#2) (<12> in FIG. 6B).

On receiving the GTP-u packet, the target offload GW 70 (#C) at the distribution point performs processing as depicted in FIGS. 28A, 28B, so as to transmit an offload packet (TCP/IP packet: FIG. 11A) through the offload network 52 to the Web server 41, 42 (<13> in FIG. 6B).

[Operation 2-13]

Next, downlink data destined from the Web server 41, 42 through the offload network 52 to the mobile station 60 is transmitted in the following manner.

Namely, the Web server 41, 42 transmits an offload packet (FIG. 11B) to the care of address (<15> in FIG. 6B).

On receiving the offload packet, the target offload GW 70 (#C) performs processing as depicted in FIG. 29, to transmit a GTP-u packet (FIG. 9) to the target base station 11 (11C) (<17> in FIG. 6B).

Next, the target base station 11 (11C) transmits the downlink data to the mobile station 60 (<18> in FIG. 6B).

[Operation 2-14]

To release a resource secured for the mobile station 60, the source MME 23 (#1) transmits a UE Context Release Command message (FIG. 22) to the source base station 11 (11A) (<20> in FIG. 6B).

The source offload GW 70 (#A) intercepts the UE Context Release Command message, to perform processing as depicted in FIG. 36.

[Operation 2-15]

By the processing S101 to S103 depicted in FIG. 36, the source offload GW 70 (#A) deletes a record corresponding to the in-oGW UE identifier in the source offload GW 70 (#A), as depicted in FIGS. 49A to 49F and FIGS. 50A and 50B.

More specifically, the source offload GW 70 (#A) deletes each record in the bearer use subscriber identification table 176A, the bearer table 176B, the user channel-by-channel home address registration table 177A1, the user channel-by-channel communication destination registration table 177A2 and the user channel-by-channel address-port conversion table 177A3 of the source offload GW 70 (#A). Then, the source offload GW 70 (#A) releases a relevant resource in the source offload GW 70 (#A). Incidentally, FIGS. 51A and 51B respectively illustrate examples of the home agent state management tables 179A, 179A' after the handover is completed.

Figure 52:
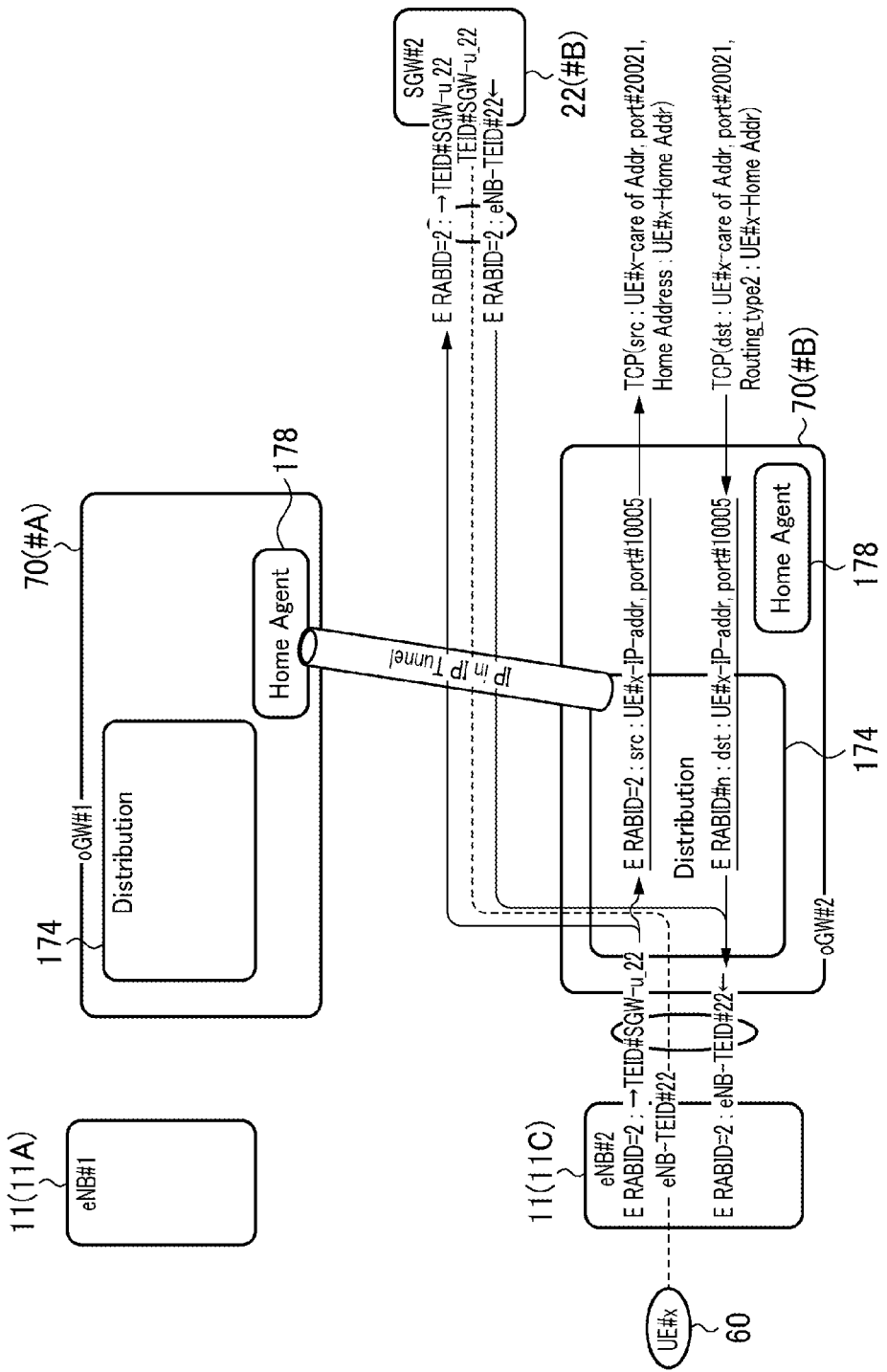
FIG. 52 is a diagram illustrating an example of an offload condition application state (a flow of traffic) at the completion of handover with a maintained TCP connection.

By this, as depicted in FIG. 52, for example, S1-based handover is performed while the TCP connection at the mobile station 60 is maintained intact.

Operation Example 3

Maintaining TCP Connection at X2-Based Handover

Next, a description will be given on the operation of a handover from the source base station 11 (11A) to the target base station 11 (11C), accompanying the movement of the mobile station 60, while the TCP communication of the mobile station 60 is maintained. FIG. 6C is a sequence diagram illustrating such the operation example. Hereafter the description will be given by reference to FIG. 6C.

[Operation 3-1]

As the mobile station (UE) 60 moves, when the source base station (source eNB) 11 (11A) starts an X2-based handover, the source base station 11 (11A) transmits an X2AP: Handover Request message (FIG. 23) to the target base station (target eNB) 11 (11C) (<1> in FIG. 6B). (<1> in FIG. 6C).

The source offload GW 70 (#A) intercepts the X2AP: Handover Request message, to perform processing as depicted in FIG. 37 (S111, S120, S121) (<2> in FIG. 6C).

[Operation 3-2]

By the processing depicted in FIG. 37, the source offload GW 70 (#A) identifies an in-eNB UE identifier (X2AP) in the bearer use subscriber identification table 176A (refer to FIGS. 53A to 53F).

[Operation 3-3]

Next, the target offload GW (oGW) 70 (#B) intercepts the X2AP: Handover Request message, to perform processing as depicted in FIG. 37 (S11-S119), FIG. 33 and FIG. 33A (<3> in FIG. 6C).

[Operation 3-4]

By the processing depicted in FIG. 37 (S117), the in-oGW UE identifier, the in-MME UE identifier, the MME apparatus identifier, the eNB apparatus identifier, the user channel identifier, the uplink channel allocation information and the offload communicate address (care of address) are fixed in the target offload GW 70 (#C), as depicted in FIGS. 53A to 53F.

[Operation 3-5]

Also, by the processing depicted in FIG. 37 (S117), the in-MME UE identifier in the bearer use subscriber identification table 176A' of the target offload GW 70 (#C) is fixed. By this, the in-MME UE identifier in the bearer use subscriber identification table 176A of the source offload GW 70 (#A) matches the in-MME UE identifier in the bearer use subscriber identification table 176A' of the target offload GW 70 (#C). Thus, the in-oGW UE identifier (8000) of the mobile station 60 in the source offload GW 70 (#A) can be associated with the in-oGW UE identifier (8102) of the mobile station 60 in the target offload GW 70 (#C).

[Operation 3-6]

Then, by the processing S118 depicted in FIG. 37, the source offload GW 70 (#A) transmits home address information etc. corresponding to the in-oGW UE identifier (8000) in the source offload GW 70 (#A), to the target offload GW 70 (#C) (<X'> in FIG. 6C). The target offload GW 70 (#C) then duplicates the received home address information etc. into each table item corresponding to the in-oGW UE identifier (8102).

Namely, as depicted in FIGS. 54A and 54B, the user channel identifier and the home address information corresponding to the in-oGW UE identifier (8000), which are registered in the user channel-by-channel home address registration table 177A1 of the source offload GW 70 (#A), are respectively duplicated into User Channel Identifier and Home Address information corresponding to the in-oGW UE identifier (8102) in the user channel-by-channel home address registration table 177A1' of the target offload GW 70 (#C).

Also, the user channel identifier and the communication destination information corresponding to the in-oGW UE identifier (8000), which are registered in the user channel-by-channel communication destination registration table 177A2 of the source offload GW 70 (#A), are respectively duplicated into User Channel Identifier and Communication Destination information corresponding to the in-oGW UE identifier (8102) in the user channel-by-channel home address registration table 177A1' of the target offload GW 70 (#C).

Further, the user channel identifier, the real UE connection information, the session state and virtual UE connection information corresponding to the in-oGW UE identifier (8000), which is registered in the user channel-by-channel address-port conversion table 177A3 of the source offload GW 70 (#A) are respectively duplicated into User Channel Identifier, Real UE Connection information, Session State and Virtual UE Connection information corresponding to the in-oGW UE identifier (8102) in the user channel-by-channel address-port conversion table 177A3' of the target offload GW 70 (#C).

[Operation 3-7]

Further, by the processing S119 (FIG. 35A) depicted in FIG. 37, the target offload GW 70 (#C) comes to know home address information for each of traffic to be offloaded. The target offload GW 70 (#C) transmits Binding Update messages to the home agent 178 of the source offload GW 70 (#A) which manages the home address and to the communication destination Web server 41, 42 (<Y'> and <Z'> in FIG. 6C).

FIG. 55A illustrates an example of the home agent state management table 179A in the source offload GW 70 (#A), and FIG. 55B illustrates an example of the home agent state management table 179A' in the target offload GW 70 (#C), respectively.

The home agent 178 of the source offload GW 70 (#A) stores, into the home agent state management table 179A, a communication address (care of address) on a link on which the virtual UE is existent (a link on the target offload GW 70 (#C) side), by associating the communication address with the home address of the virtual UE. By the Binding Update message, the communication destination Web server 41, 42 also can know the movement destination of the virtual UE.

[Operation 3-8]

Thereafter, the target base station 11 (11C) transmits an X2AP: Handover Request Ack. message. This message arrives at the source base station 11 (11A), via the target offload GW 70 (#C) and the source offload GW 70 (#A) (<4> in FIG. 6C).

Thereafter, the downlink data from the offload network 50 and the P-GW 21 arrives at the mobile station 60, via the source base station 11 (11A), the source offload GW 70 (#A), the target offload GW 70 (#C) and the target base station 11 (11C) (<5> in FIG. 6C).

Also, the uplink data from the mobile station 60 arrives at the offload network 50 or the P-GW 21, via the target base station 11 (11C) and the target offload GW 70 (#C) (<6> in FIG. 6C).

[Operation 3-9]

Next, the target offload GW 70 (#C) transmits a Path Switch Request message (FIG. 26) toward the MME 23 (<7> in FIG. 6C).

The target offload GW 70 (#C) intercepts the Path Switch Request message, to perform processing as depicted in FIG. 38 (<8> in FIG. 6C)

[Operation 3-10]

Next, in response to the Path Switch Request message, the MME 23 transmits a Path Switch Request Ack. message (FIG. 27) (<9> in FIG. 6C).

The target offload GW 70 (#C) intercepts the Path Switch Request Ack. message, to perform processing as depicted in FIGS. 39 (S135 and S136)

[Operation 3-11]

By the processing depicted in FIG. 39, "Uplink Channel Allocation information" corresponding to the in-oGW UE identifier (8102) in the bearer table 176B' of the target offload GW 70 (#C) is changed from "SGW#1" to "SGW#2".

Figure 56:
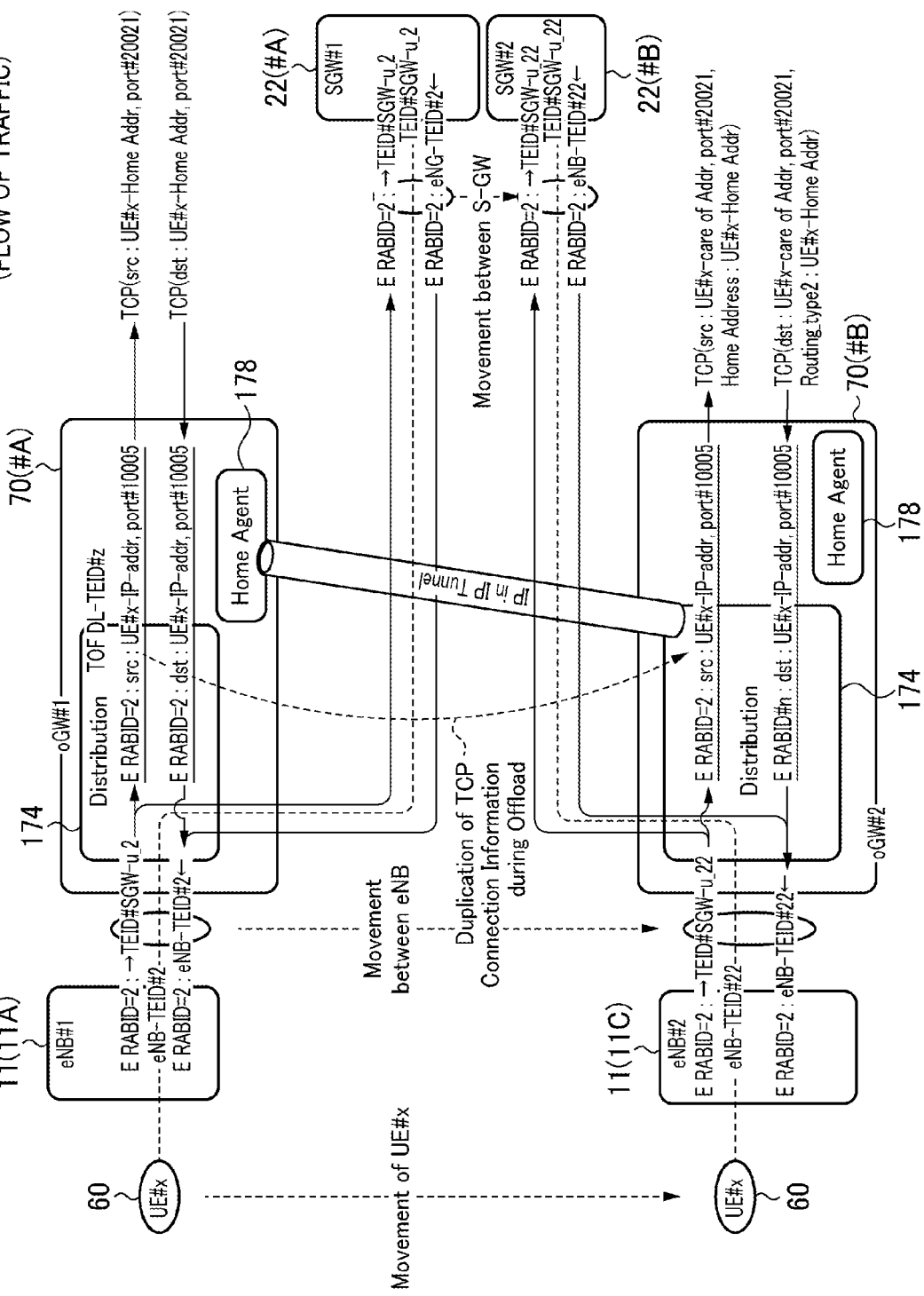
FIG. 56 is a diagram illustrating an example of handing over an offload condition application state (a flow of traffic) at an X2-based handover.

By this, as depicted in FIG. 56, in the X2-based handover accompanying the movement of the mobile station 60, a route is shifted into mobile station 60→target base station 11 (11C)→target offload GW 70 (#C)→Web server 41, 42, while the TCP connection is maintained intact.

[Operation 3-12]

After the Binding Update message is transmitted to the Web server 41, 42 and the route is changed over, uplink data destined from the mobile station 60 to the Web server 41, 42 is transmitted in the following manner.

Namely, when the base station 11 receives the uplink data from the mobile station 60, the base station 11 transmits a GTP-u packet (FIG. 8) toward the target S-GW 22 (#2) (<10> in FIG. 6C, <11> in FIG. 6C).

On receiving the GTP-u packet, the offload GW 70 (#B) at the distribution point performs processing as depicted in FIGS. 28A and 28B, to transmit an offload packet (FIG. 11A) through the offload network 50 to the Web server 41, 42 (<12> in FIG. 6C).

[Operation 3-13]

Next, downlink data destined from the Web server 41, 42 to the mobile station 60 is transmitted in the following manner.

Namely, the Web server 41, 42 transmits an offload packet (FIG. 11B) to the care of address (<13> in FIG. 6C).

On receiving the offload packet, the offload GW 70 (#B) performs processing as depicted in FIG. 29, to transmit a GTP-u packet (FIG. 9) to the base station 11 (11C) (<14> in FIG. 6C). On receiving the GTP-u packet, the base station 11 (11C) transmits the downlink data to the mobile station 60 (<15> in FIG. 6C).

[Operation 3-14]

Next, though not illustrated in FIG. 6C, the target base station 11 (11C) transmits an X2AP: UE Context Release message (FIG. 25) to the source base station 11 (11A).

Next, the source offload GW 70 (#A) intercepts the X2AP: UE Context Release message, to perform processing (S221-S124) depicted in FIG. 40.

[Operation 3-15]

By this, as depicted in FIGS. 49A to 49F and FIGS. 50A and 50B, each record corresponding to the in-oGW UE identifier (8000) is deleted from the bearer use subscriber identification table 176A and the bearer table 176B of the source offload GW 70 (#A). Also, each record corresponding to the in-oGW UE identifier (8000) is deleted from the user channel-by-channel home address registration table 177A1, the user channel-by-channel communication destination registration table 177A2 and the user channel-by-channel address-port conversion table 177A3. A relevant resource in the source offload GW 70 (#A) is released.

As such, the communication of the TCP connection is maintained, as depicted in FIG. 52.

Operation Example 4

Generating New TCP Connection after Handover

Next, while the mobile station 60 maintains the TCP connection, a description will be given on the generation of a new TCP connection after handover, by reference to FIGS. 57A to 60 etc.

[Operation 4-1]

When the mobile station 60 starts establishing a new connection with a website, a GTP-u packet (FIG. 8) is transmitted from the target base station 11 (11C) toward the target S-GW 22 (#2).

On receiving the GTP-u packet, the offload GW 70 (#B) performs processing as depicted in FIG. 28. The offload GW 70 (#B) transmits an offload packet (FIG. 11A) through the offload network 52 to the Web server 41, 42.

[Operation 4-2]

At this time, the offload GW 70 (#B) stores new TCP connection information corresponding to the in-oGW UE identifier and the user channel identifier, into the bearer use subscriber identification table 176A' (refer to FIGS. 57A to 57F).

[Operation 4-3]

Also, the offload GW 70 (#B) adds the address of the Web server 41, 42 to the user channel-by-channel communication destination registration table 177A2' (refer to FIGS. 58A and 58B). Further the target offload GW 70 (#C) stores the real UE connection information, the session state and the virtual UE connection information into the user channel-by-channel address-port conversion table 177A3' (refer to FIGS. 58A and 58B).

[Operation 4-4]

Next, when the offload packet arrives at the Web server 41, 42 through the offload network 52, an offload packet (FIG. 11B) transmitted from the Web server 41, 42 arrives at the offload GW 70 (#B) through the offload network 52. On receiving the offload packet, the offload GW 70 (#B) performs processing as depicted in FIG. 29.

[Operation 4-5]

Next, the offload GW 70 (#B) transmits a GTP-u packet (FIG. 6) toward the target base station 11 (11C). By this, as depicted in FIG. 60, a new TCP communication is established through the offload network 52. Incidentally, FIGS. 59A and 59B illustrate the home agent state management tables 179A, 179A' after the new TCP communication is established.

[Operation 4-6]

For the maintained TCP communication, there is no difference from the operation 2 and 3 in regard to uplink and downlink data transmission routes between the mobile station 60 and the Web server 41, 42, and processing at offload GWs 70 (#A, #B), and therefore, the description thereof will be omitted.

[Operation 4-7]

Now, uplink data from the mobile station 60 toward the Web server 41, 42 in the new TCP connection is transmitted in the following manner. Namely, the uplink data from the base station 11 (11C) forwarded to the S-GW 22 (#2) is transmitted by a GTP-u packet (FIG. 8). On receiving the GTP-u packet, the offload GW 70 (#B) performs processing as depicted in FIG. 28, to transmit an offload packet (FIG. 11A) through the offload network 50 to the Web server 41, 42.

On the other hand, downlink data from the Web server 41, 42 toward the mobile station 60 through the new TCP connection is transmitted in the following manner.

Namely, an offload packet (FIG. 11B) is transmitted from the Web server 41, 42 to the offload GW 70 (#B).

On receiving the offload packet, the offload GW 70 (#B) performs processing as depicted in FIG. 29, to transmit a GTP-u packet (FIG. 9) to the base station 11 (11C).

Operation Example 5

Disconnecting TCP Connection after Handover

Next, a description will be given on a case of disconnection of the TCP connection, after the mobile station 60 is handed over while maintaining the TCP connection. The description will be given by appropriately referring to FIGS. 61A to 64 etc.

When the mobile station 60 disconnects the TCP connection with the Web server 41, 42, a GTP-u packet (FIG. 8) is transmitted from the target offload GW 70 (#C) toward the target S-GW 22 (#2). On receiving the GTP-u packet, the target offload GW 70 (#C) performs processing as depicted in FIGS. 28A and 28B, to transmit an offload packet (FIG. 11A) through the offload network 52 to the Web server 41, 42.

Then, "Waiting for DL disconnection confirmation" is stored into "Session State" of the user channel-by-channel address-port conversion table 177A3' in the target offload GW 70 (#C), corresponding to the in-oGW UE identifier, the user channel identifier and the real UE connection information relative to the TCP connection, as depicted in FIGS. 62A and 62B.

When the offload packet arrives at the Web server 41, 42 through the offload network 52, an offload packet (FIG. 11B) is transmitted from the Web server 41, 42, and arrives at the target offload GW 70 (#C) through the offload network 52.

On receiving the offload packet, the target offload GW 70 (#C) performs processing as depicted in FIG. 29.

By this, a corresponding record to the TCP connection in the user channel-by-channel address-port conversion table 177A3' of the target offload GW 70 (#C), depicted in FIGS. 62A and 62B, is deleted.

Next, the offload GW 70 (#B) transmits a GTP-u packet (FIG. 9) toward the target base station 11 (11C). By this, TCP disconnection confirmation relative to the TCP connection is transmitted to the mobile station 60.

Figure 64:
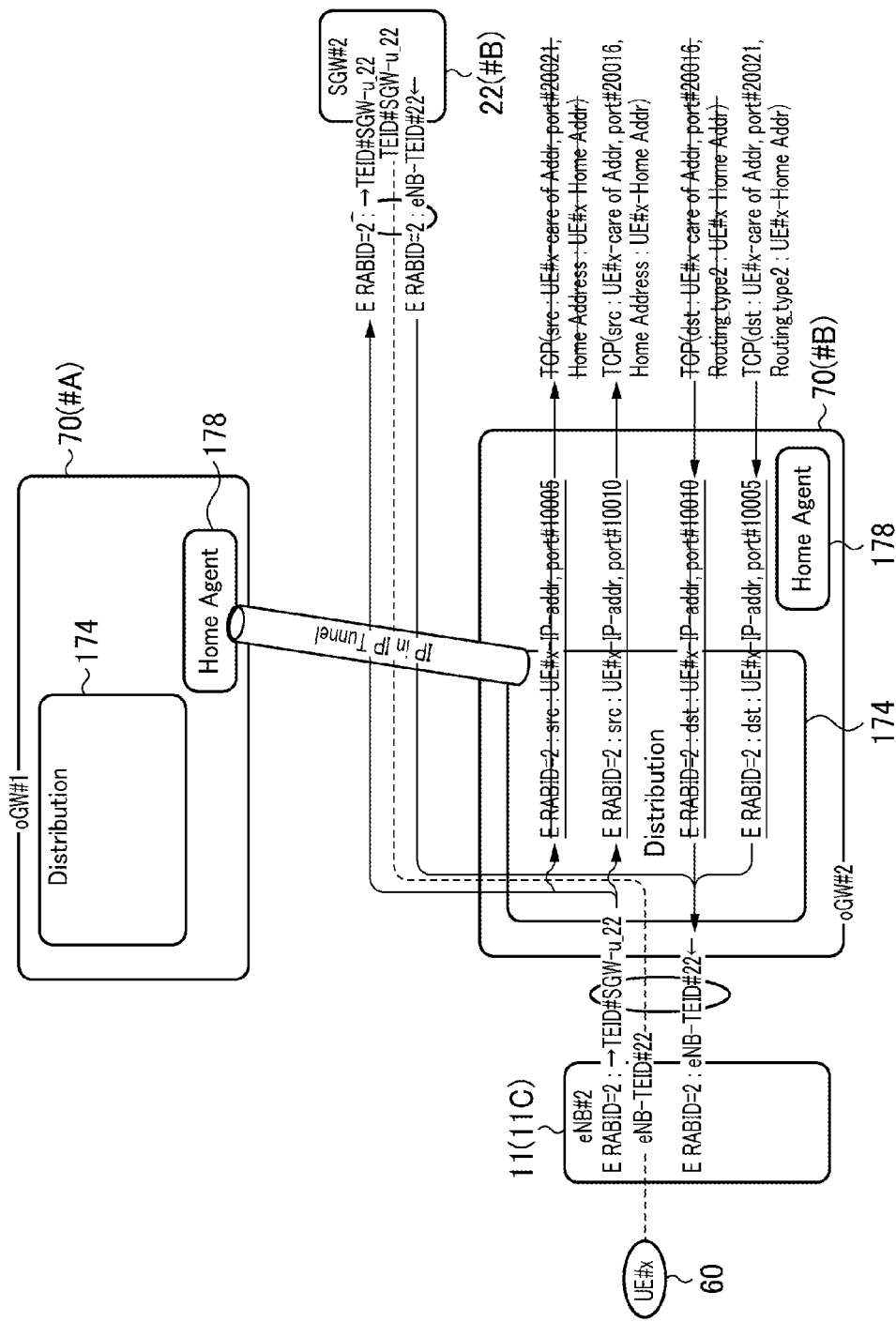
FIG. 64 is a diagram illustrating an example of an offload condition application state (a flow of traffic) after the disconnection of a TCP connection after handover.

By this, as depicted in FIG. 64, a route relative to the previous TCP connection is deleted. However, a route relative to the new TCP connection is maintained intact.

Incidentally, FIGS. 61A to 61F illustrate each example of the bearer use subscriber identification tables 176A, 176A' and the bearer tables 176B, 176B'. Also, FIG. 63 illustrates each example of the home agent state management tables 179A, 179A'.

<Function and Effect in the Second Embodiment>

At the movement of the mobile station 60, communication between the Web server 41, 42 and the target offload GW 70 (#B), which is installed at a junction point between the EPC 20 and a RAN (Radio Access Network: for example, LTE network 10 in FIG. 2), can be performed through a shortest route. Therefore, by the offload GW 70, the use of resources in the offload network 50 and the mobile transmission network (or core network) is optimized.

Also, at the movement of the mobile station 60, the source offload GW 70 (#A) transmits (or duplicates or hands over) the home address to the target offload GW 70 (#C). By this, for example, the target offload GW 70 (#C) can transmit traffic to the offload network 52, which is different from the offload network 51 used by the home address, using the address (i.e. the care of address) different from the home address.

Further, the target offload GW 70 (#C) transmits the home address and the care of address (Binding Update message) to the Web server 41, 42, which is the communication destination. By this, for example, the target offload GW 70 (#C) can notify the Web server 41, 42 of the home address and the care of address corresponding to the home address. Accordingly, the Web server 41, 42 can receive or transmit traffic which includes the home address and the care of address. In this case, the Web server 41, 42 can transmit and receive traffic through the offload network 52.

Thus, if the mobile station 60 is handed over, the uplink data and the downlink data exchanged between the Web server 41, 42 and the mobile station 60 do not flow through, for example, the core network (EPC network) 20, and therefore, it is possible to reduce traffic which flows in the core network.

Figure 66:
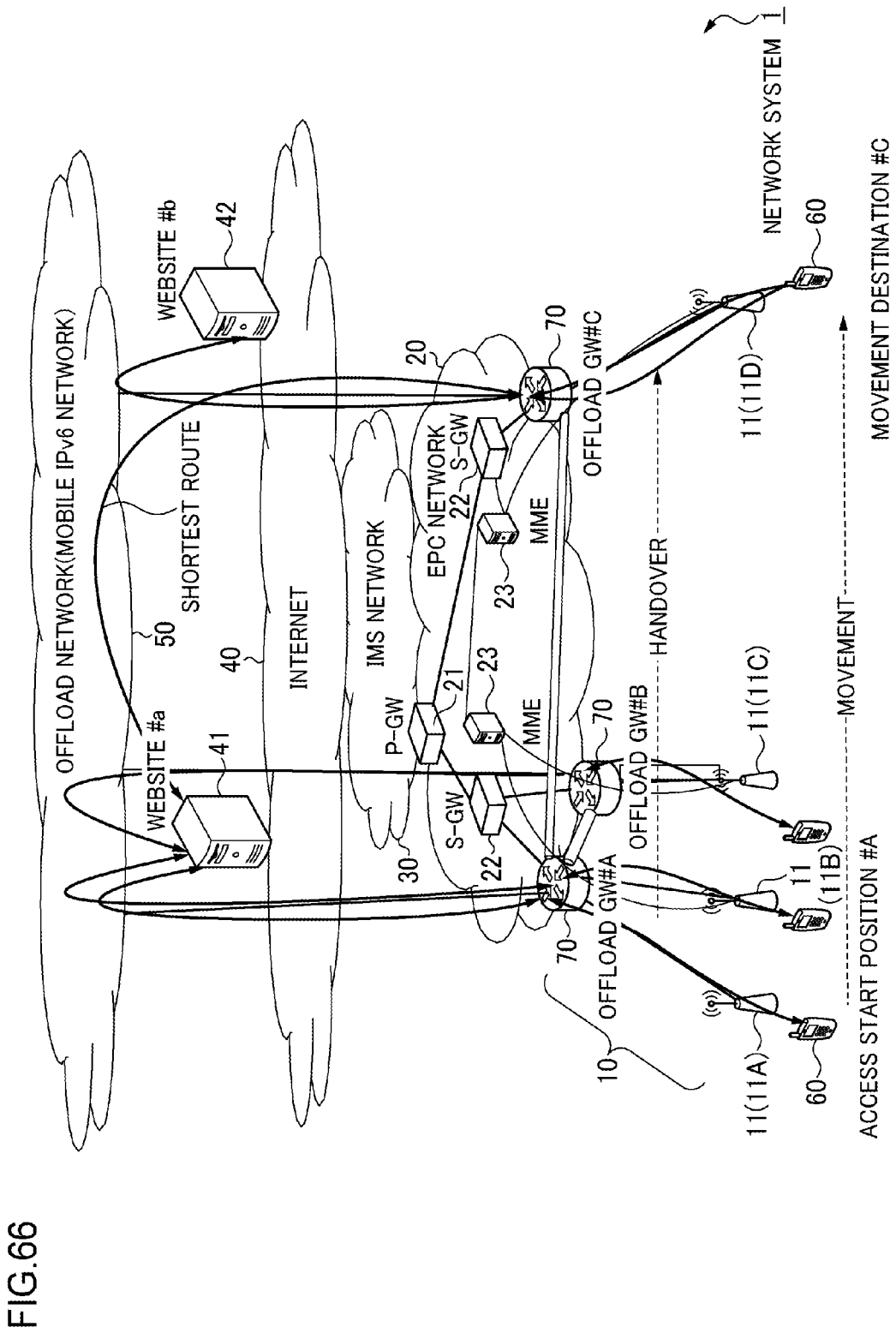
FIG. 66 is a diagram illustrating an example of a network system configuration.

FIG. 66 illustrates an exemplary configuration of a network system 1 as a solution. In FIG. 66, there is illustrated an example of a connection configuration of the offload network 50, which provides a Mobile Support IPv6 (RFC 6275) function independent of the mobile EPC network 20, between with the offload GW 70 and the Web server 41, 42. In this case also, after the mobile station 60 moves, for example, a portion of data exchanged between the mobile station 60 and the Web server 41, 42 does not flow through the EPC network 20, so that traffic which flows in the core network can be reduced.

By the present invention, it is possible to provide a network system, an offload apparatus and a traffic control method for the network system to reduce traffic in a core network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network system comprising:
   a first and second radio base station apparatuses which are connectable with a mobile station apparatus;
   a first network which accommodates the first and second radio base station apparatuses;
   a first offload apparatus which relays packet data transmitted between the first radio base station apparatus and the first network, and transmits to a second network a portion of packet data transmitted from the first radio base station apparatus after rewriting a first address of the mobile station apparatus with a second address, or transmits to the first radio base station apparatus packet data received from the second network after rewriting the second address with the first address; and
   a second offload apparatus, wherein
   the first offload apparatus includes a first control unit which transmits the second address to the second offload apparatus intervened between the second radio base station apparatus and the first network, when the mobile station apparatus changes over connection from the first radio base station apparatus to the second radio base station apparatus, and
   the second offload apparatus includes a second control unit which receives the second address.

2. The network system according to claim 1, wherein the second address is not changed even when the mobile station apparatus changes over connection from the first radio base station apparatus to the second radio base station apparatus.

3. The network system according to claim 1, wherein the first address is an IP (Internet Protocol) address and the second address is a home address.

4. The network system according to claim 1, wherein the second control unit transmits to a third network packet data transmitted from the second radio base station apparatus after rewriting the first address of the mobile station apparatus with a third address, or transmits to the second radio base station packet data received from the third network after rewriting the third address with the first address.

5. The network system according to claim 1, wherein
   the second control unit transmits to a third network the second address received from the first offload apparatus and a third address, and
   the second control unit uses the third address when transmitting packet data transmitted from the second radio base station apparatus to the third network after rewriting the first address with the third address, or uses the third address when transmitting packet data received from the third network to the second radio base station apparatus after rewriting the third address with the first address.

6. The network system according to claim 5, wherein the third address is used when the mobile station apparatus changes connection destination from the first base station apparatus to the second base station apparatus.

7. The network system according to claim 6, wherein the third address is a care of address.

8. The network system according to claim 1, wherein
   the second control unit transmits to a home server the second address received from the first offload apparatus, and the third address, and
   the second control unit uses the third address when transmitting packet data transmitted from the second radio base station apparatus to a third network after rewriting the first address with the third address, or uses the third address when transmitting packet data received from the third network to the second radio base station apparatus after rewriting the third address with the first address.

9. The network system according to claim 8, wherein the home server is included in the first offload apparatus.

10. The network system according to claim 8, wherein the third address is used when the mobile station apparatus changes connection destination from the first base station apparatus to the second base station apparatus.

11. The network system according to claim 1, wherein
    the first offload apparatus includes a first offload condition application state table which stores the second address, communication destination information, and TCP connection information in each a first identifier of the mobile station apparatus and a channel identifier identifiable in the first offload apparatus, and
    the first control unit transmits packet data to the second network or receives packet data from the second network, by using the offload condition application state table.

12. The network system according to claim 1, wherein
    the first and second control units intercept message relating to handover, which is transmitted and received when the mobile station apparatus changes over connection from the first radio base station apparatus to the second radio base station apparatus, identifies a second identifier of the mobile station apparatus which corresponds to the first identifier and is identifiable in the second offload apparatus, based on information included in the intercepted message, and duplicates the second address information into a record corresponding to the identified second identifier in a second offload condition application state table stored in the second offload apparatus.

13. An offload apparatus for relaying packet data transmitted between a radio base station apparatus connectable to a mobile station apparatus and a first network accommodated the radio base station apparatus, and transmitting a portion of packet data transmitted from the first radio base station apparatus, to a second network after rewriting a first address of the mobile station apparatus with a second address, or transmitting packet data received from the second network to the radio base station apparatus after rewriting the second address with the first address, the offload apparatus comprising:
    a control unit which transmits the second address to another offload apparatus intervened between another radio base station apparatus and the first network, when the mobile station apparatus changes over connection from the radio base station apparatus to the other radio base station apparatus.

14. An offload apparatus intervened between a radio base station apparatus connectable to a mobile station apparatus and a first network accommodated the radio base station apparatus, the offload apparatus comprising:
    a control unit which receives a second address from another offload apparatus, wherein
    the other offload apparatus relays packet data transmitted between the radio base station apparatus and the first network, and transmits to a second network a portion of packet data transmitted from the other radio base station apparatus after rewriting a first address of the mobile station apparatus with the second address, or transmits to the other radio base station apparatus packet data received from the second network after rewriting the second address with the first address.

15. A traffic control method in a network system including a first and second radio base station apparatuses connectable to a mobile station apparatus, a first network which accommodates the first and second radio base station apparatuses, a second offload apparatus, and a first offload apparatus which relays packet data transmitted between the first radio base station apparatus and the first network and transmits to a second network portion of packet data transmitted from the first radio base station apparatus after rewriting a first address of the mobile station apparatus with a second address, or transmits to the first radio base station apparatus packet data received from the second network after rewriting the second address with the first address, the traffic control method comprising:

transmitting the second address to the second offload apparatus which intervenes between the second radio base station apparatus and the first network, when the mobile station apparatus changes over connection from the first radio base station apparatus to the second radio base station apparatus, by the first offload apparatus; and receiving the second address, by the second offload apparatus.

\* \* \* \* \*